US012711341B2

(12) United States Patent
Endo et al.

(10) Patent No.: US 12,711,341 B2
(45) Date of Patent: Aug. 18, 2026

(54) IMAGE FORMING APPARATUS FOR CONTROLLING THE PREPARATORY OPERATIONS

(71) Applicant: CANON KABUSHIKI KAISHA, Tokyo (JP)

(72) Inventors: Hiroto Endo, Kanagawa (JP); Yuya Kojima, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 294 days.

(21) Appl. No.: 18/429,558

(22) Filed: Feb. 1, 2024

(65) Prior Publication Data

US 2024/0265221 A1 Aug. 8, 2024

(30) Foreign Application Priority Data

Feb. 8, 2023 (JP) ................................ 2023-017829
Apr. 10, 2023 (JP) ................................ 2023-063782

(51) Int. Cl.
*G06K 15/02* (2006.01)

(52) U.S. Cl.
CPC ..... *G06K 15/1807* (2013.01); *G06K 15/1809* (2013.01); *G06K 15/1823* (2013.01)

(58) Field of Classification Search
CPC .......... G06K 15/1807; G06K 15/1809; G06K 15/1823
See application file for complete search history.

(56) References Cited

FOREIGN PATENT DOCUMENTS

| | | | |
|---|---|---|---|
| JP | 2010-228334 | A | 10/2010 |
| JP | 2016-148723 | A | 8/2016 |

*Primary Examiner* — Nicholas Pachol
(74) *Attorney, Agent, or Firm* — VENABLE LLP

(57) ABSTRACT

An image forming apparatus receives input data including device data and settings data from an external device and forms an image on a recording medium. The apparatus includes a processing device to perform a print operation including conveying the recording medium and forming an image on the recording medium, and a control unit to control the processing device so that a first preparatory operation of the processing device is executed after analysis of the input data starts and before analysis of the settings data ends, a second preparatory operation of the processing device is executed after the analysis of the settings data ends, and the print operation is executed after the second preparatory operation ends. The control unit determines a timing at which the first preparatory operation is to be executed based on the device data.

13 Claims, 27 Drawing Sheets

200 EXTERNAL DEVICE

203

201 CONTROLLER

202 ENGINE CONTROL UNIT

204 SHEET CONVEYANCE CONTROL UNIT

205 OPTICAL CONTROL UNIT

206 FIXING TEMPERATURE CONTROL UNIT

207 IMAGE CONTROL UNIT

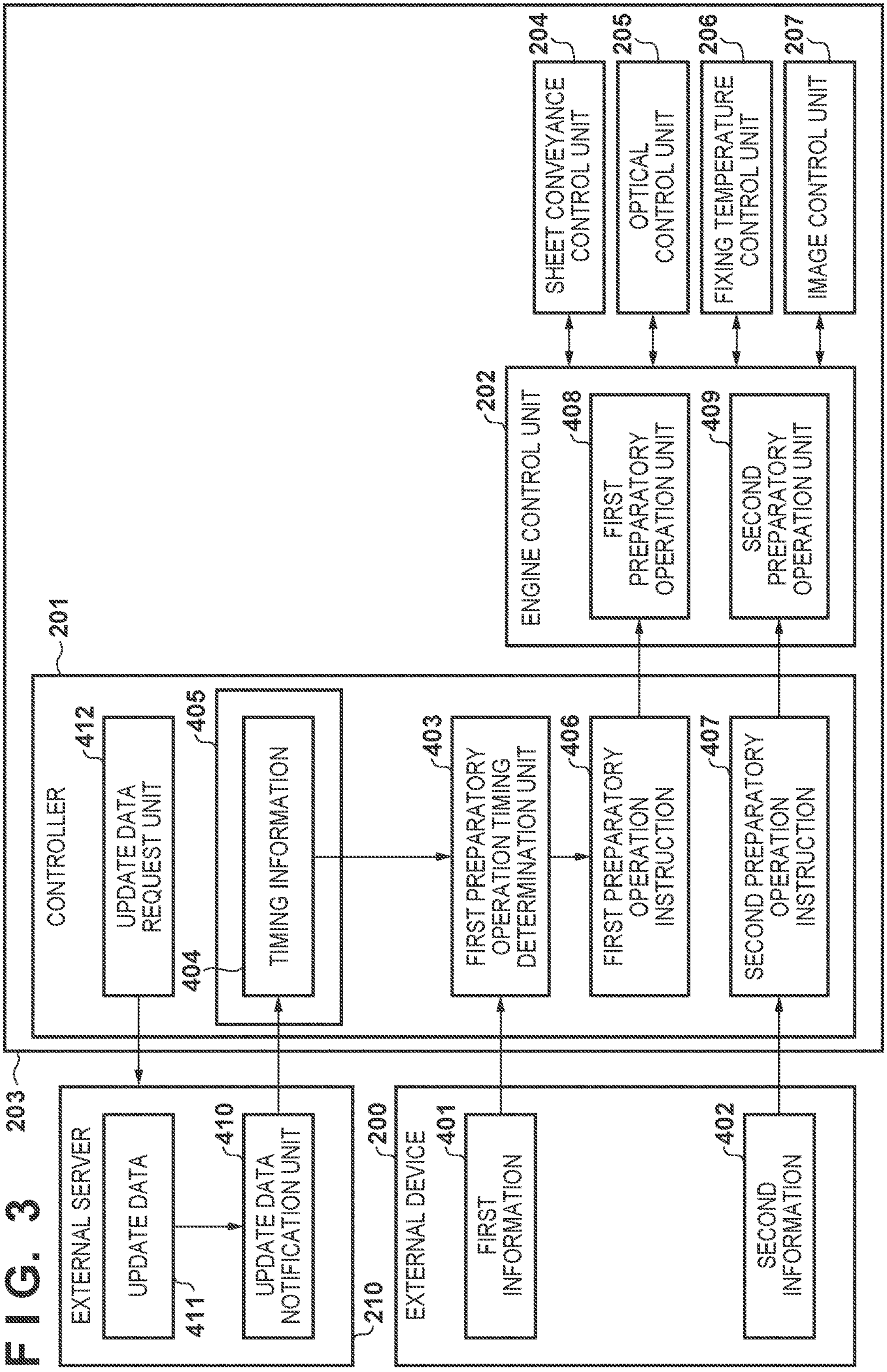

FIG. 3
203
CONTROLLER
201
412
UPDATE DATA REQUEST UNIT
404
405
TIMING INFORMATION
403
FIRST PREPARATORY OPERATION TIMING DETERMINATION UNIT
406
FIRST PREPARATORY OPERATION INSTRUCTION
407
SECOND PREPARATORY OPERATION INSTRUCTION
EXTERNAL SERVER
UPDATE DATA
411
410
UPDATE DATA NOTIFICATION UNIT
210
200
EXTERNAL DEVICE
401
FIRST INFORMATION
402
SECOND INFORMATION
202
ENGINE CONTROL UNIT
408
FIRST PREPARATORY OPERATION UNIT
409
SECOND PREPARATORY OPERATION UNIT
SHEET CONVEYANCE CONTROL UNIT
204
OPTICAL CONTROL UNIT
205
FIXING TEMPERATURE CONTROL UNIT
206
IMAGE CONTROL UNIT
207

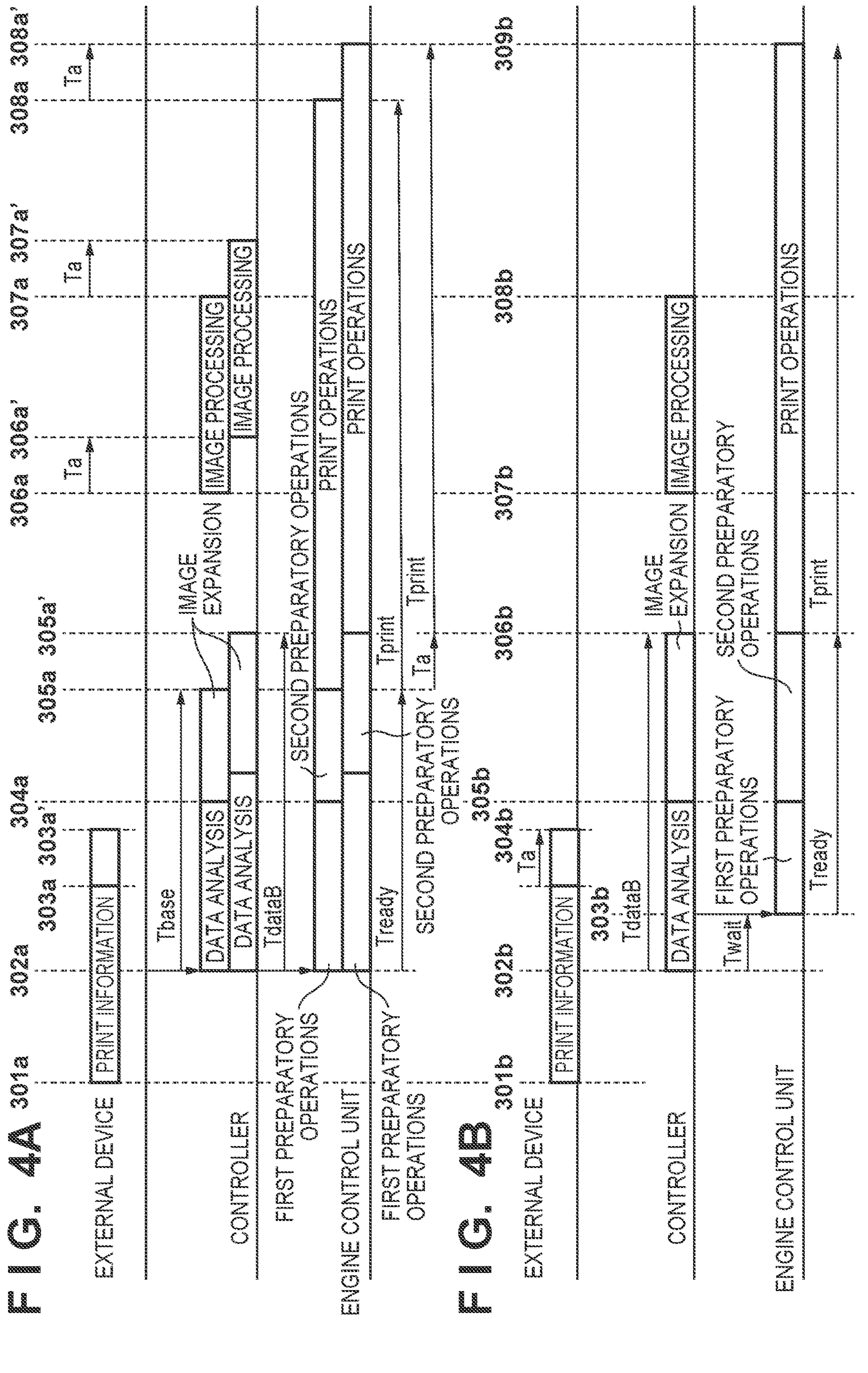

EXTERNAL DEVICE
CONTROLLER
FIRST PREPARATORY OPERATIONS
ENGINE CONTROL UNIT
FIRST PREPARATORY OPERATIONS
SECOND PREPARATORY OPERATIONS
SECOND PREPARATORY OPERATIONS
PRINT INFORMATION
DATA ANALYSIS
DATA ANALYSIS
IMAGE EXPANSION
IMAGE PROCESSING
IMAGE PROCESSING
PRINT OPERATIONS
PRINT OPERATIONS
Tbase
TdataB
Tready
Tprint
Tprint
Ta
301a 302a 303a 303a' 304a 305a 305a' 306a 306a' 307a 307a' 308a 308a'

EXTERNAL DEVICE
CONTROLLER
ENGINE CONTROL UNIT
PRINT INFORMATION
DATA ANALYSIS
IMAGE EXPANSION
IMAGE PROCESSING
FIRST PREPARATORY OPERATIONS
SECOND PREPARATORY OPERATIONS
PRINT OPERATIONS
Twait
TdataB
Tready
Tprint
Ta
301b 302b 303b 304b 305b 306b 307b 308b 309b

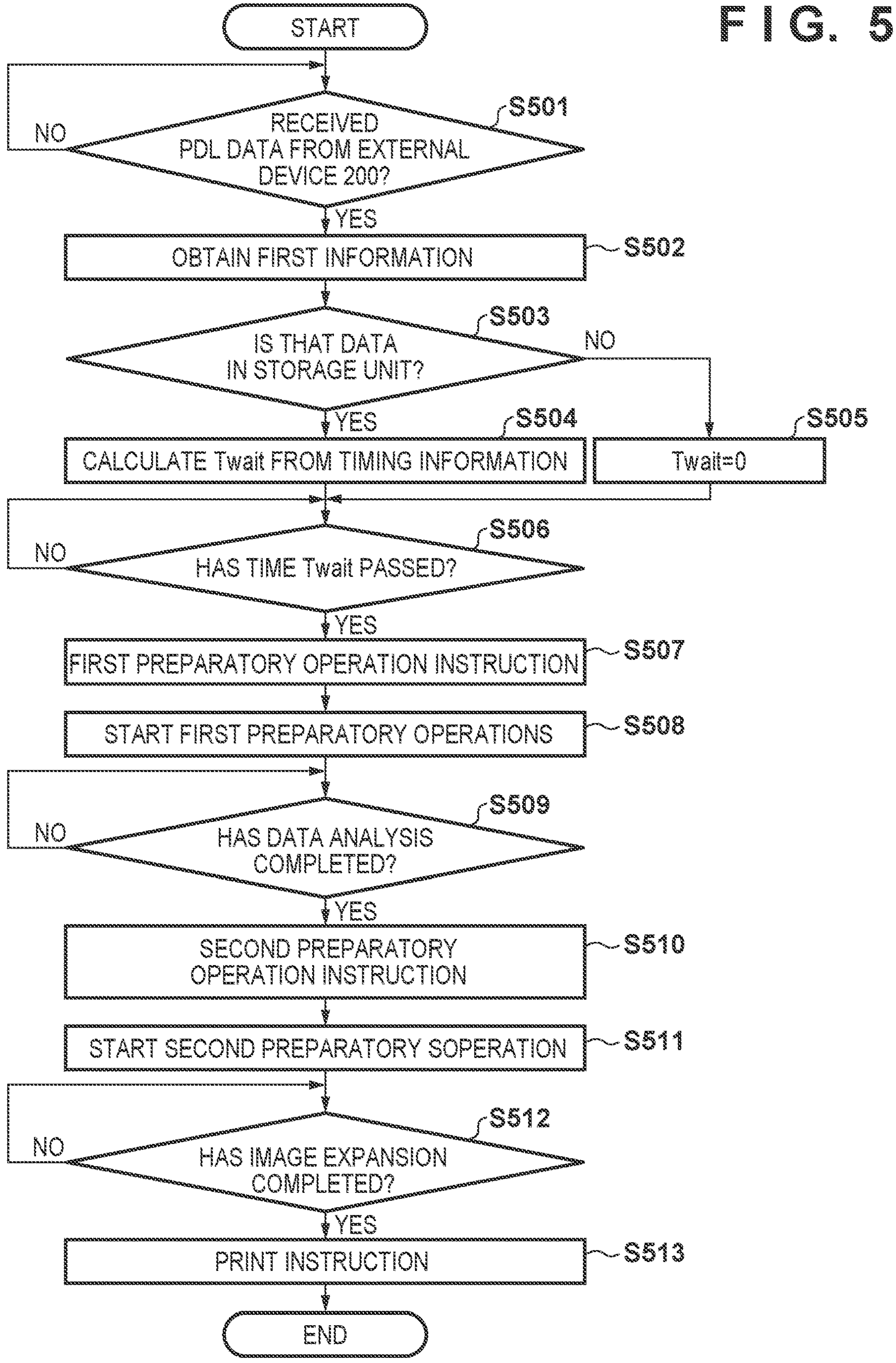

FIG. 5
START
RECEIVED PDL DATA FROM EXTERNAL DEVICE 200?
S501
NO
YES
OBTAIN FIRST INFORMATION
S502
IS THAT DATA IN STORAGE UNIT?
S503
NO
YES
CALCULATE Twait FROM TIMING INFORMATION
S504
Twait=0
S505
HAS TIME Twait PASSED?
S506
NO
YES
FIRST PREPARATORY OPERATION INSTRUCTION
S507
START FIRST PREPARATORY OPERATIONS
S508
HAS DATA ANALYSIS COMPLETED?
S509
NO
YES
SECOND PREPARATORY OPERATION INSTRUCTION
S510
START SECOND PREPARATORY SOPERATION
S511
HAS IMAGE EXPANSION COMPLETED?
S512
NO
YES
PRINT INSTRUCTION
S513
END

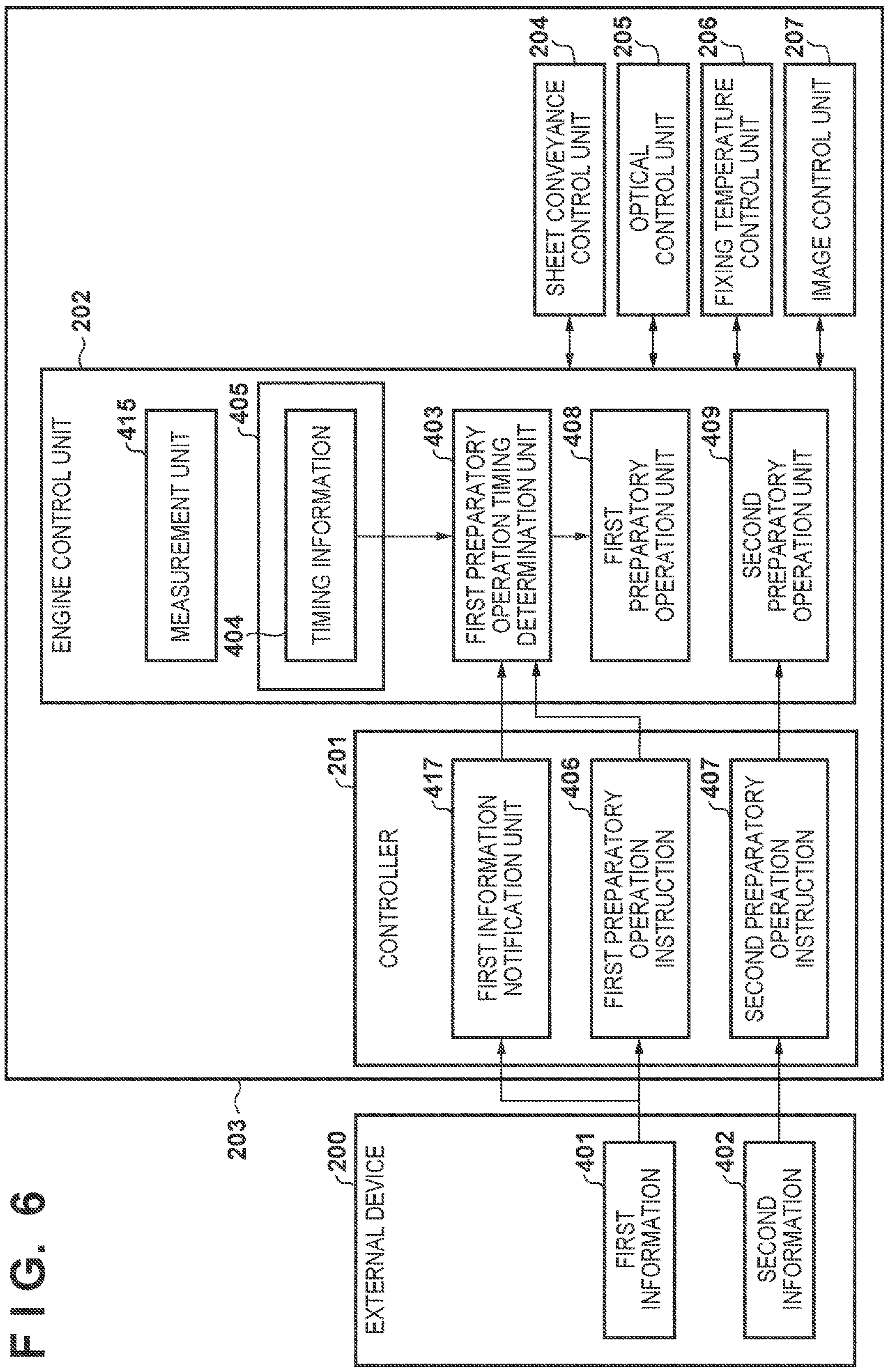

FIG. 6
203
200
EXTERNAL DEVICE
401
FIRST INFORMATION
402
SECOND INFORMATION
201
CONTROLLER
417
FIRST INFORMATION NOTIFICATION UNIT
406
FIRST PREPARATORY OPERATION INSTRUCTION
407
SECOND PREPARATORY OPERATION INSTRUCTION
202
ENGINE CONTROL UNIT
415
MEASUREMENT UNIT
404
405
TIMING INFORMATION
403
FIRST PREPARATORY OPERATION TIMING DETERMINATION UNIT
408
FIRST PREPARATORY OPERATION UNIT
409
SECOND PREPARATORY OPERATION UNIT
204
SHEET CONVEYANCE CONTROL UNIT
205
OPTICAL CONTROL UNIT
206
FIXING TEMPERATURE CONTROL UNIT
207
IMAGE CONTROL UNIT

EXTERNAL DEVICE
CONTROLLER
ENGINE CONTROL UNIT
301b
702b
703b
304b
305b
706b
307b
308b
309b
Ta
PRINT INFORMATION
Tbase
TdataB
DATA ANALYSIS
IMAGE EXPANSION
IMAGE PROCESSING
FIRST PREPARATORY OPERATIONS
SECOND PREPARATORY OPERATIONS
PRINT OPERATIONS
Twait
Tready
Tprint
Tanalysis

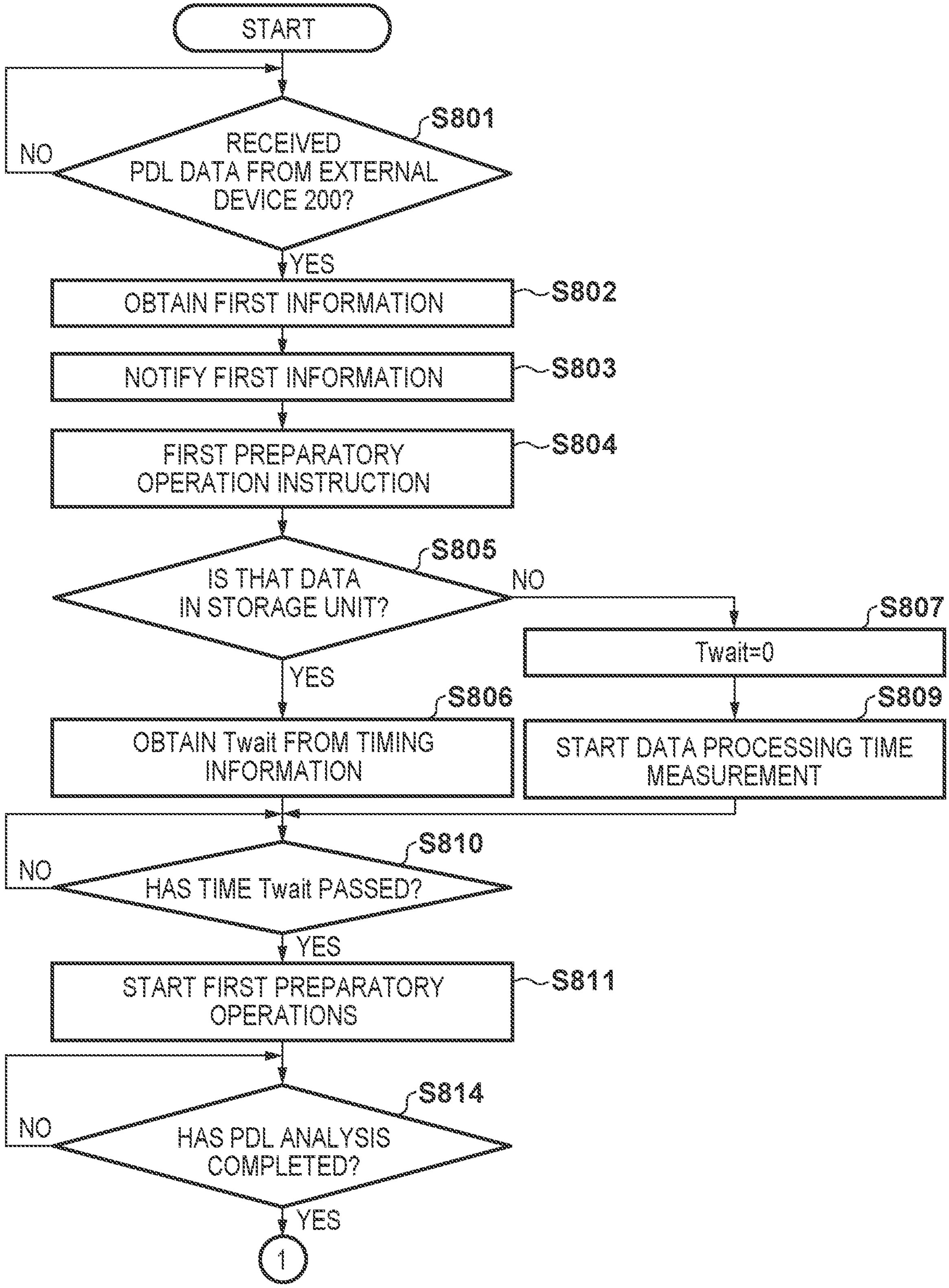

F I G. 8A
START
S801
RECEIVED PDL DATA FROM EXTERNAL DEVICE 200?
NO
YES
OBTAIN FIRST INFORMATION
S802
NOTIFY FIRST INFORMATION
S803
FIRST PREPARATORY OPERATION INSTRUCTION
S804
S805
IS THAT DATA IN STORAGE UNIT?
NO
YES
S807
Twait=0
S806
OBTAIN Twait FROM TIMING INFORMATION
S809
START DATA PROCESSING TIME MEASUREMENT
S810
HAS TIME Twait PASSED?
NO
YES
START FIRST PREPARATORY OPERATIONS
S811
S814
HAS PDL ANALYSIS COMPLETED?
NO
YES
1

FIG. 9

| OS TYPE | OS VERSION | DATA ANALYSIS TIME [ms] Tdata | |
|---|---|---|---|
| OS A | 1 | 100 | Tbase |
| OS A | 2 | 300 | |
| OS A | 3 | 300 | |
| OS A | 4 | 500 | |
| OS A | 5 | 500 | |
| OS B | 1 | 100 | |
| OS B | 2 | 500 | |
| OS B | 3 | 500 | |
| OS B | 4 | 1000 | |
| OS B | 5 | 1000 | |
| | | | |
| | | | |

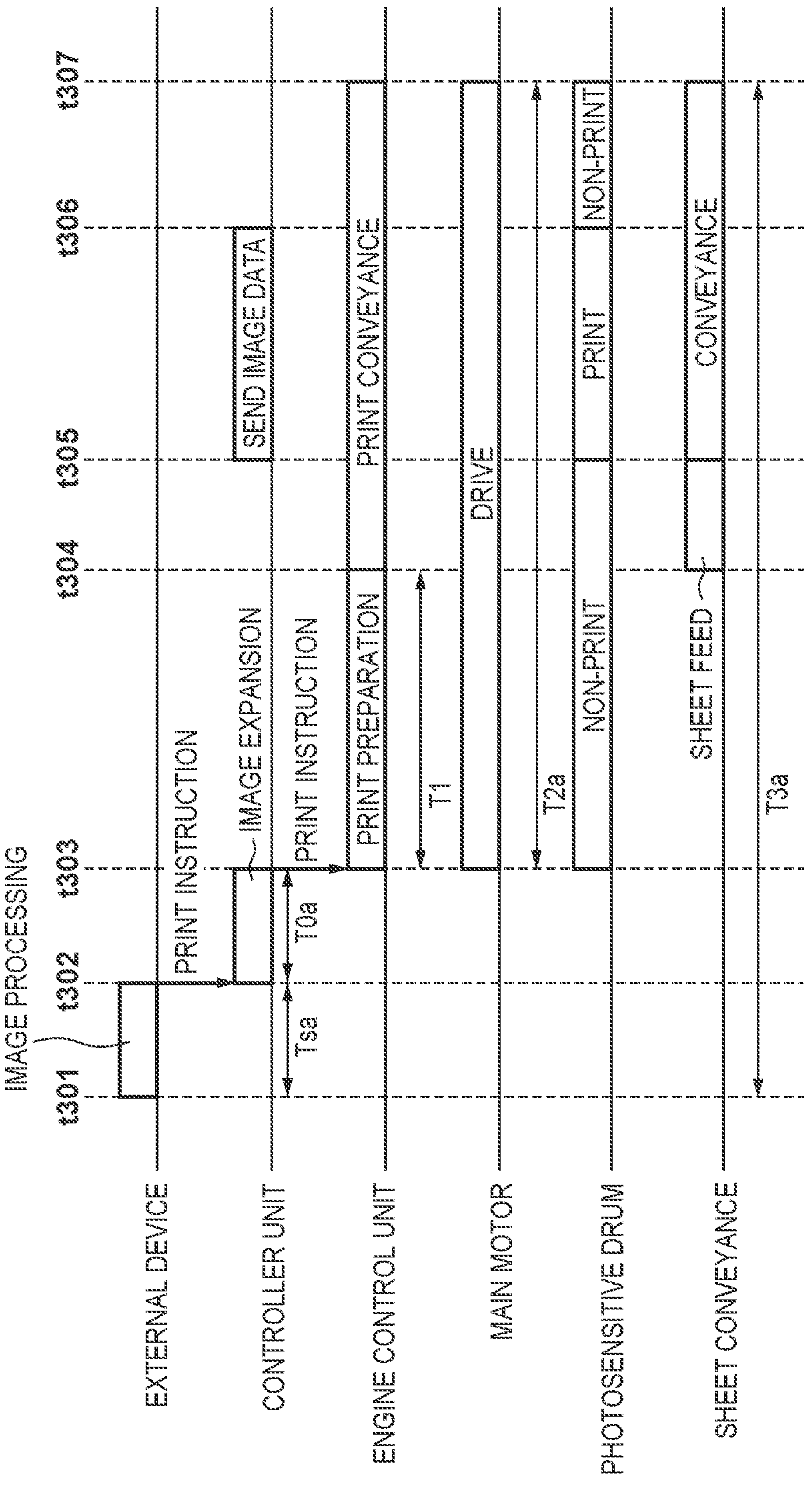
F I G. 12A
t301
t302
t303
t304
t305
t306
t307
EXTERNAL DEVICE
CONTROLLER UNIT
ENGINE CONTROL UNIT
MAIN MOTOR
PHOTOSENSITIVE DRUM
SHEET CONVEYANCE
IMAGE PROCESSING
PRINT INSTRUCTION
IMAGE EXPANSION
PRINT INSTRUCTION
SEND IMAGE DATA
PRINT PREPARATION
PRINT CONVEYANCE
DRIVE
NON-PRINT
PRINT
NON-PRINT
SHEET FEED
CONVEYANCE
Tsa
T0a
T1
T2a
T3a

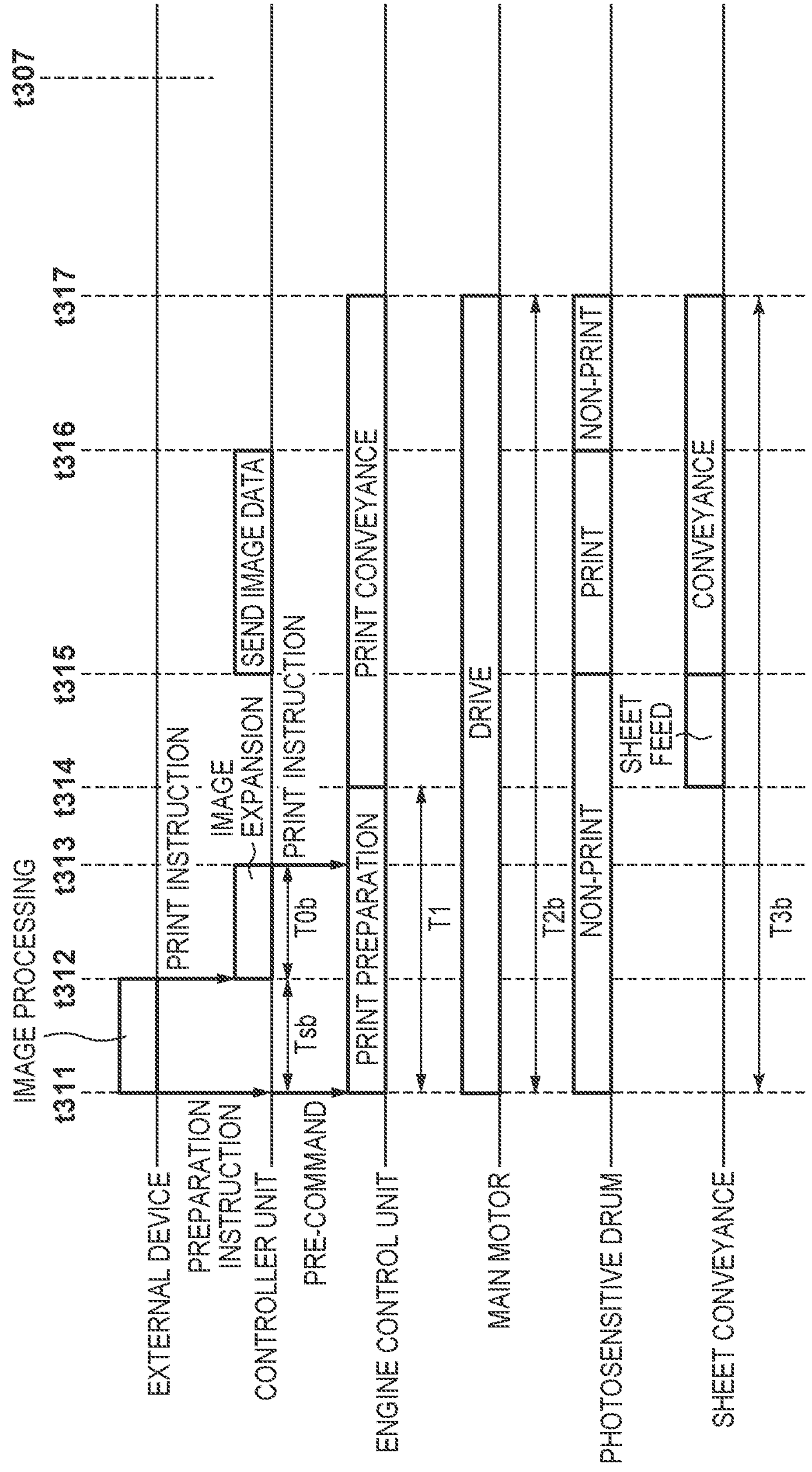
F I G. 12B
EXTERNAL DEVICE
PREPARATION INSTRUCTION
CONTROLLER UNIT
PRE-COMMAND
ENGINE CONTROL UNIT
MAIN MOTOR
PHOTOSENSITIVE DRUM
SHEET CONVEYANCE
t311
t312
t313
t314
t315
t316
t317
t307
IMAGE PROCESSING
PRINT INSTRUCTION
IMAGE EXPANSION
PRINT INSTRUCTION
SEND IMAGE DATA
Tsb
T0b
PRINT PREPARATION
PRINT CONVEYANCE
T1
DRIVE
T2b
NON-PRINT
PRINT
NON-PRINT
SHEET FEED
CONVEYANCE
T3b EXTERNAL DEVICE
PREPARATION INSTRUCTION
CONTROLLER UNIT
PRE-COMMAND
ENGINE CONTROL UNIT
MAIN MOTOR
PHOTOSENSITIVE DRUM
SHEET CONVEYANCE
t321
t322
t323
t324
t325
t326
t317
t327
t307
IMAGE PROCESSING
PRINT INSTRUCTION
IMAGE EXPANSION
SEND IMAGE DATA
PRINT INSTRUCTION
Tsc
T0c
PRINT PREPARATION
WAIT
PRINT CONVEYANCE
T1
DRIVE
T2c
NON-PRINT
PRINT
NON-PRINT
SHEET FEED
CONVEYANCE
T3c

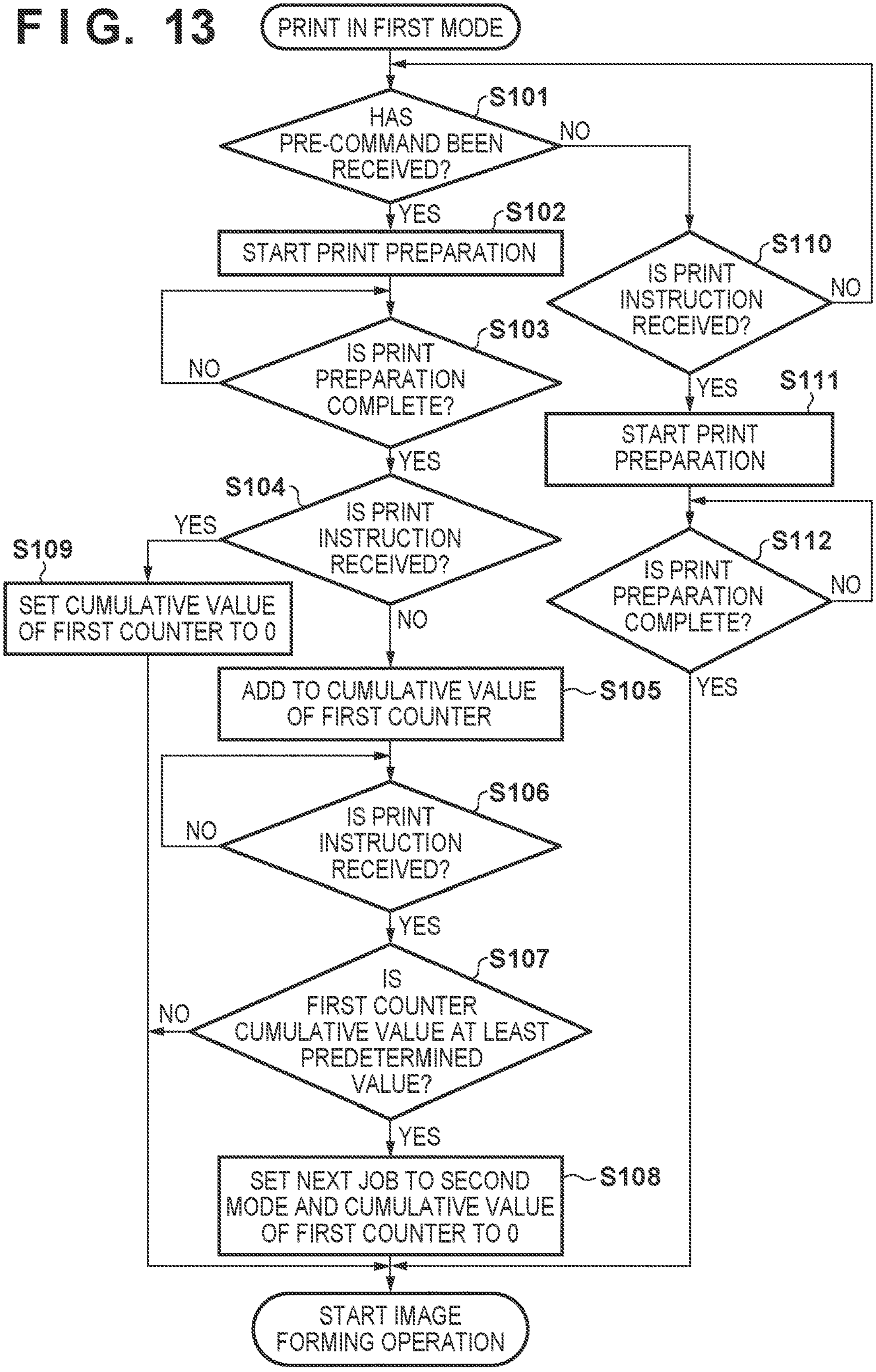

FIG. 13
PRINT IN FIRST MODE
S101
HAS PRE-COMMAND BEEN RECEIVED?
NO
YES
S102
START PRINT PREPARATION
S103
IS PRINT PREPARATION COMPLETE?
NO
YES
S104
IS PRINT INSTRUCTION RECEIVED?
YES
NO
S109
SET CUMULATIVE VALUE OF FIRST COUNTER TO 0
S105
ADD TO CUMULATIVE VALUE OF FIRST COUNTER
S106
IS PRINT INSTRUCTION RECEIVED?
NO
YES
S107
IS FIRST COUNTER CUMULATIVE VALUE AT LEAST PREDETERMINED VALUE?
NO
YES
S108
SET NEXT JOB TO SECOND MODE AND CUMULATIVE VALUE OF FIRST COUNTER TO 0
S110
IS PRINT INSTRUCTION RECEIVED?
NO
YES
S111
START PRINT PREPARATION
S112
IS PRINT PREPARATION COMPLETE?
NO
YES
START IMAGE FORMING OPERATION

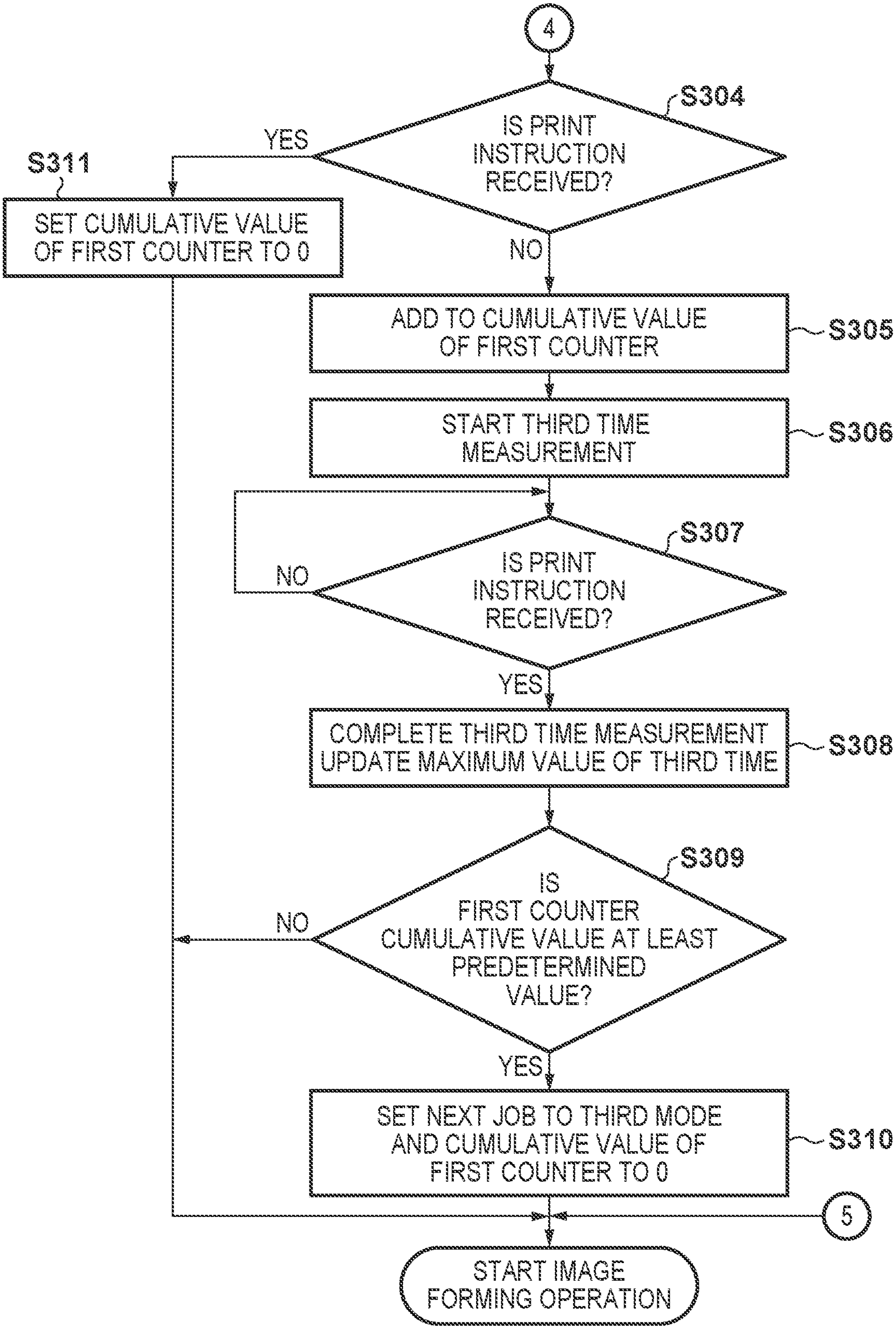

F I G. 16B
4
S304
IS PRINT INSTRUCTION RECEIVED?
YES
NO
S311
SET CUMULATIVE VALUE OF FIRST COUNTER TO 0
ADD TO CUMULATIVE VALUE OF FIRST COUNTER
S305
START THIRD TIME MEASUREMENT
S306
S307
IS PRINT INSTRUCTION RECEIVED?
NO
YES
COMPLETE THIRD TIME MEASUREMENT UPDATE MAXIMUM VALUE OF THIRD TIME
S308
S309
IS FIRST COUNTER CUMULATIVE VALUE AT LEAST PREDETERMINED VALUE?
NO
YES
SET NEXT JOB TO THIRD MODE AND CUMULATIVE VALUE OF FIRST COUNTER TO 0
S310
5
START IMAGE FORMING OPERATION

F I G. 17A
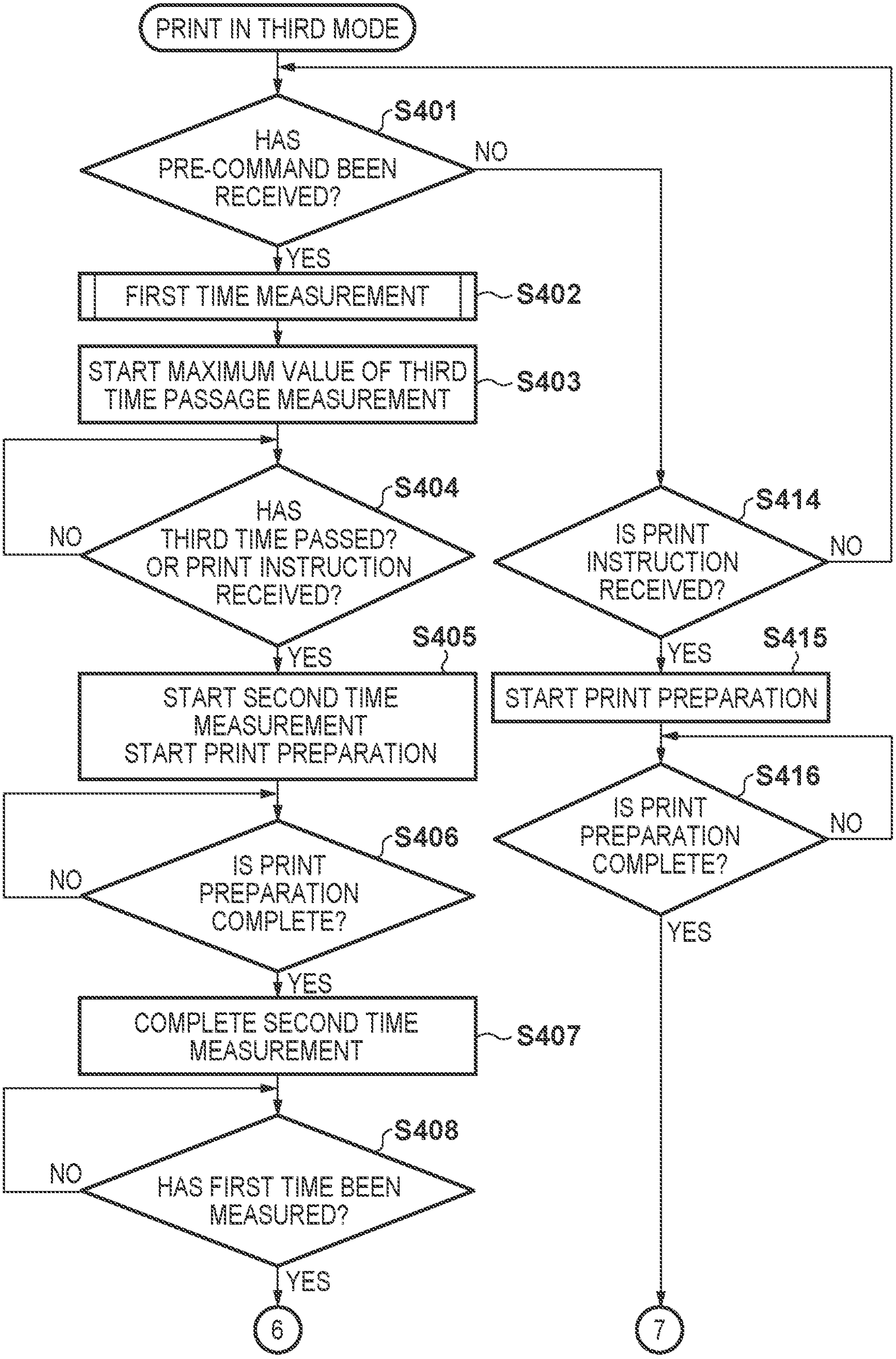

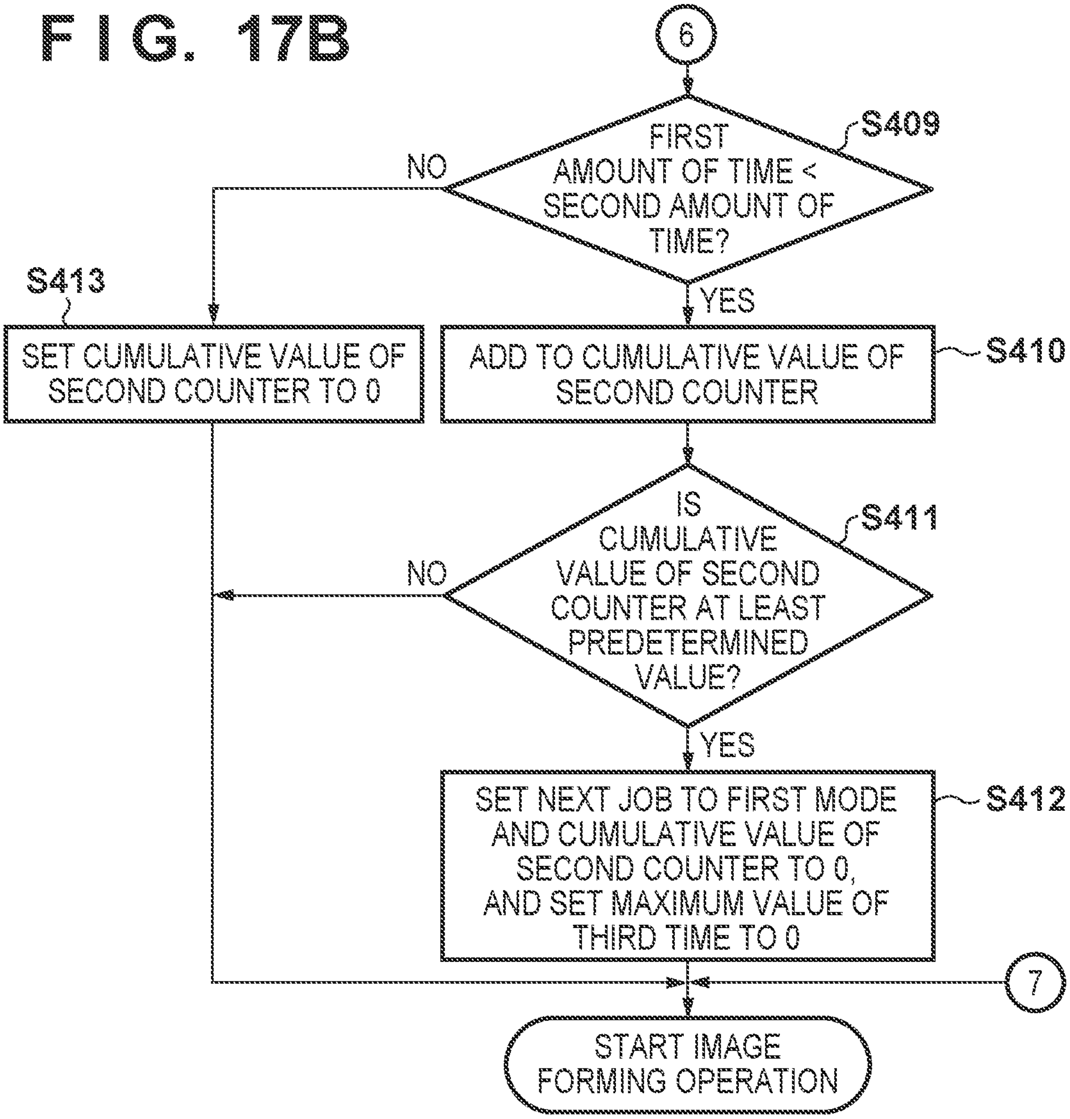
F I G. 17B
6
S409 FIRST AMOUNT OF TIME < SECOND AMOUNT OF TIME?
NO
YES
S413 SET CUMULATIVE VALUE OF SECOND COUNTER TO 0
S410 ADD TO CUMULATIVE VALUE OF SECOND COUNTER
S411 IS CUMULATIVE VALUE OF SECOND COUNTER AT LEAST PREDETERMINED VALUE?
NO
YES
S412 SET NEXT JOB TO FIRST MODE AND CUMULATIVE VALUE OF SECOND COUNTER TO 0, AND SET MAXIMUM VALUE OF THIRD TIME TO 0
7
START IMAGE FORMING OPERATION
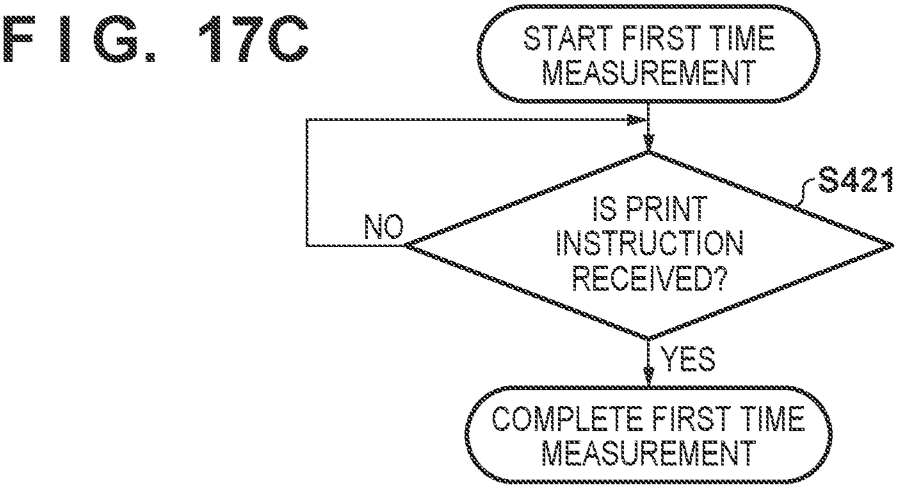
F I G. 17C F I G. 20B
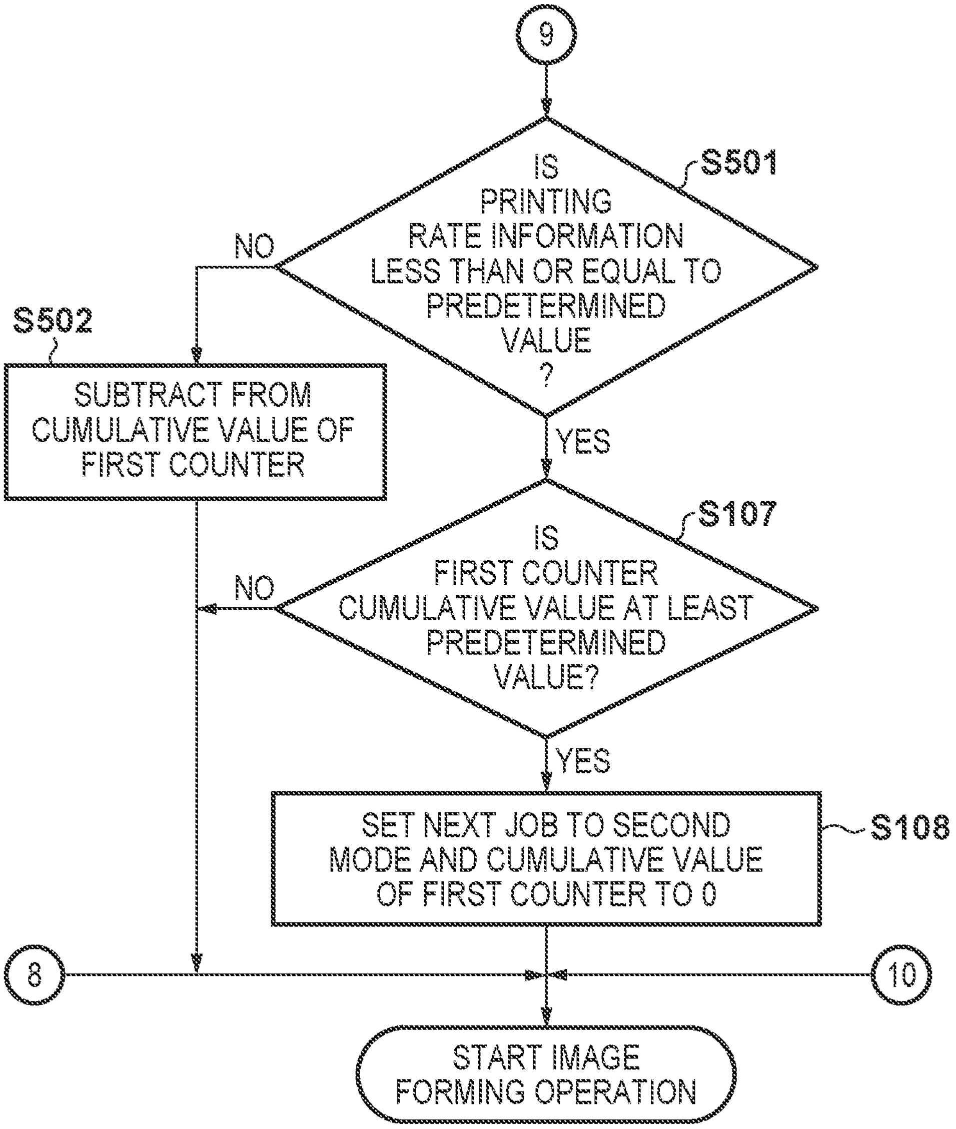

IMAGE FORMING APPARATUS FOR CONTROLLING THE PREPARATORY OPERATIONS

BACKGROUND OF THE INVENTION

Field of the Invention

The present invention relates to an image forming apparatus that forms an image on a recording sheet.

Description of the Related Art

Electrophotographic laser beam printers, copiers, facsimile devices, and the like are known as examples of image forming apparatuses. A technique has been proposed in such an image forming apparatus for shortening a first printout time ("FPOT", hereinafter), which is a time from when a printing instruction is made to when the printing on the first recording sheet is completed (Japanese Patent Laid-Open No. 2016-148723).

In Japanese Patent Laid-Open No. 2016-148723, the image forming apparatus accumulates and stores excess driving time arising when the time for loading image data is extended. Avoiding loading the image data and starting up the image forming unit simultaneously when the excess driving time reaches a permissible amount has been proposed as a way to both shorten the FPOT and extend the lifespan of the apparatus.

The technique disclosed in Japanese Patent Laid-Open No. 2016-148723 has an issue in that the operation for shortening the FPOT itself ceases to be performed as the frequency at which the time for loading the image data is extended increases.

The loading time for image data varies depending on the operating system ("OS", hereinafter) of the external terminal being used, the software, the type of printer driver, hardware specifications such as the memory size, and the like. OS and printer driver versions in particular are being updated more frequently in recent years.

There are cases where the amount of added information increases due to OS and printer driver upgrades (updates), resulting in a longer loading time for the image data.

The FPOT is also determined according to the time required for a controller unit of the image forming apparatus to perform processing for preparing image data, and the time required for the image forming apparatus to perform preparatory operations for starting the image forming operations, as well as the image forming operations themselves, under the control of an engine control unit of the image forming apparatus. In the preparatory operations, a drive source, a high-voltage power source, a scanner, a fixer, and the like are started up.

A method which starts the preparatory operations at the same time as the start of processing for preparing the image data and executes these in parallel (also called "preparatory parallel operations" here) is known as a method for shortening the FPOT.

However, if the processing for preparing the image data takes a long time, the image forming unit will continue to drive needlessly until the processing for preparing the image data is complete, even after the preparatory operations are complete.

Accordingly, Japanese Patent Laid-Open No. 2010-228334 discloses the following method. The difference between a length of time that has passed from when the preparatory operations are started to when image formation (also called "printing" here), and a predetermined length of time, is calculated. Then, whether or not to execute the preparatory parallel operations is selected according to a cumulative value of the difference. According to this method, when there are many jobs where the processing time for preparing image data is longer than the time for preparatory operations, situations where the lifespans of components in the image forming apparatus, such as components in the fixer, decrease due to increases in the time from when the preparatory operations end to when the image forming operations start (also called "excess rotation time" here) can be suppressed.

Processing through which the controller unit of the image forming apparatus prepares image data includes processing through which the controller unit receives the image data from an external device (a host computer, a device, or the like) and processing for converting (developing) the image data into a data format for sending to the engine control unit. The external device also performs processing for converting the image data into a data format for sending to the controller unit, and the time required for this processing varies depending on factors of the external device, such as the operating system (OS) and the like. In other words, the time required for processing through which the controller unit receives the image data from the external device varies depending not only on the content of the image data itself (the printing rate of the image and the like), but also on the configuration of the external device.

The length of time required for the preparatory parallel operations described above will also increase if, for example, the configuration of the external device is changed due to an OS update or the like and the length of time required for the controller unit to prepare the image data increases as a result. The excess rotation time will therefore increase with each job regardless of the content of the image data itself, which may shorten the lifespan of the components of the image forming apparatus, such as components of the fixer.

Here, for example, if the configuration of the external device (the OS or the like) has changed and excess rotation time arises in each subsequent job, control based on the above-described cumulative value of the difference (which corresponds to the excess rotation time) will increase the excess rotation time in each job until the cumulative value of the difference exceeds a predetermined threshold.

SUMMARY OF THE INVENTION

An object of the present invention is to prevent or suppress excessive driving of an image forming apparatus while shortening the FPOT in the image forming apparatus.

According to one aspect of the present invention, there is provide an image forming apparatus configured to receive input data including device data and settings data from an external device and form an image on a recording medium, the image forming apparatus comprising: a processing device configured to perform a print operation including conveying the recording medium and forming an image on the recording medium; and a control unit configured to control the processing device so that (i) a first preparatory operation of the processing device is executed after analysis of the input data starts and before analysis of the settings data ends, (ii) a second preparatory operation of the processing device is executed after the analysis of the settings data ends, and (iii) the print operation is executed after the second preparatory operation ends, wherein the control unit is configured to determine a timing at which the first preparatory operation is to be executed based on the device data.

Another object of the present invention is to make it possible to suppress an increase in excess rotation time caused by a change in the configuration of an external device or the like in a configuration in which preparatory parallel operations can be executed.

According to another aspect of the present invention, there is provided an image forming apparatus that executes a job for forming an image on a recording material in accordance with an instruction from a controller that processes image data, the image forming apparatus comprising: an image forming unit for forming the image on the recording material; and a control unit configured to control the image forming unit to start a preparatory operation of the image forming unit after a first instruction has been received from the controller, and start an image forming operation of the image forming unit when the preparatory operation is complete and a second instruction is received from the controller, wherein the control unit: controls so as to execute the job while switching an operation mode between a first mode and a second mode, the first mode being an operation mode in which, when the first instruction has been received, the preparatory operation is started before the second instruction is received, and the second mode being an operation mode in which, when the first instruction has been received, the preparatory operation is not started until the second instruction is received; and in a case of execution in the first mode, controls to switch the operation mode from the first mode to the second mode based on information pertaining to the number of jobs in which the image forming operation has been started in response to the second instruction after the preparatory operation has been completed.

According to still another object of the present invention, there is provided an image forming apparatus that executes a job for forming an image on a recording material in accordance with an instruction from a controller that processes image data, the image forming apparatus comprising: an image forming unit for forming the image on the recording material; and a control unit configured to control the image forming unit to start a preparatory operation of the image forming unit after a first instruction has been received from the controller, and start an image forming operation of the image forming unit when the preparatory operation is complete and a second instruction is received from the controller, wherein the control unit: controls so as to execute the job while switching an operation mode between a first mode and a third mode, the first mode being an operation mode in which, when the first instruction has been received, the preparatory operation is started at a first timing before the second instruction is received, and the third mode being an operation mode in which, when the first instruction has been received, the preparatory operation is started at a second timing which is after the first timing, before the second instruction is received, and after a predetermined length of time has passed after the first instruction has been received; and in a case of execution in the first mode, controls to switch the operation mode from the first mode to the third mode based on information pertaining to the number of jobs in which the image forming operation has been started in response to the second instruction after the preparatory operation has been completed.

According to yet another aspect of the present invention, there is provided an image forming apparatus that executes a job for forming an image on a recording material in accordance with an instruction from a controller that processes image data, the image forming apparatus comprising: an image forming unit for forming the image on the recording material; and a control unit that controls the image forming unit to start a preparatory operation of the image forming unit after a first instruction has been received from the controller, and start an image forming operation of the image forming unit when the preparatory operation is complete and a second instruction has been received from the controller, wherein the control unit: controls so as to execute the job while switching an operation mode between a first mode and a second mode, the first mode being an operation mode in which, when the first instruction has been received, the preparatory operation is started before the second instruction is received, and the second mode being an operation mode in which, when the first instruction has been received, the preparatory operation is not started until the second instruction is received; and in a case of execution in the second mode, controls to switch the operation mode from the second mode to the first mode based on information pertaining to the number of jobs for which a second time is longer than a first time, the first time being a time from when the first instruction is received to when the second instruction is received, and the second time being a time from when the preparatory operation is started to when the preparatory operation is completed.

According to still another aspect of the present invention, there is provided an image forming apparatus that executes a job for forming an image on a recording material in accordance with an instruction from a controller that processes image data, the image forming apparatus comprising: an image forming unit for forming the image on the recording material; and a control unit that controls the image forming unit to start a preparatory operation of the image forming unit after a first instruction has been received from the controller, and start an image forming operation of the image forming unit when the preparatory operation is complete and a second instruction has been received from the controller, wherein the control unit: controls so as to execute the job while switching an operation mode between a first mode and a third mode, the first mode being an operation mode in which, when the first instruction has been received, the preparatory operation is started at a first timing before the second instruction is received, and the third mode being an operation mode in which, when the first instruction has been received, the preparatory operation is started at a second timing which is after the first timing, before the second instruction is received, and after a predetermined length of time has passed after the first instruction has been received; and in a case of execution in the third mode, controls to switch the operation mode from the third mode to the first mode based on information pertaining to the number of jobs for which a second time is longer than a first time, the first time being a time from when the first instruction is received to when the second instruction is received, and the second time being a time from when the preparatory operation is started to when the preparatory operation is completed.

Further features of the present invention will become apparent from the following description of exemplary embodiments with reference to the attached drawings.

BRIEF DESCRIPTION OF THE DRAWINGS

FIG. 3 is a data block diagram illustrating the control system according to the first embodiment.

FIGS. 4A and 4B show timing charts according to the first embodiment.

FIG. 5 is a flowchart according to the first embodiment.

FIG. 6 is a block diagram illustrating a sequence performed when updating data according to the first embodiment.

FIGS. 8A and 8B illustrate a flowchart according to the second embodiment.

FIG. 9 is a schematic diagram illustrating timing information according to the first and second embodiments.

FIG. 12A is a timing chart illustrating operations of various units when an engine control unit does not receive a pre-command and does not execute preparatory parallel operations.

FIG. 12B is a timing chart illustrating operations of various units when the engine control unit receives a pre-command and executes preparatory parallel operations.

FIG. 13 is a flowchart illustrating a sequence of startup operations according to the third embodiment.

FIGS. 16A and 16B illustrate a flowchart illustrating startup operations according to the fourth embodiment.

FIGS. 17A to 17C illustrate a flowchart illustrating startup operations according to the fourth embodiment.

FIGS. 20A and 20B illustrate a flowchart illustrating a sequence of startup operations according to the fifth embodiment.

DESCRIPTION OF THE EMBODIMENTS

Figure 1:
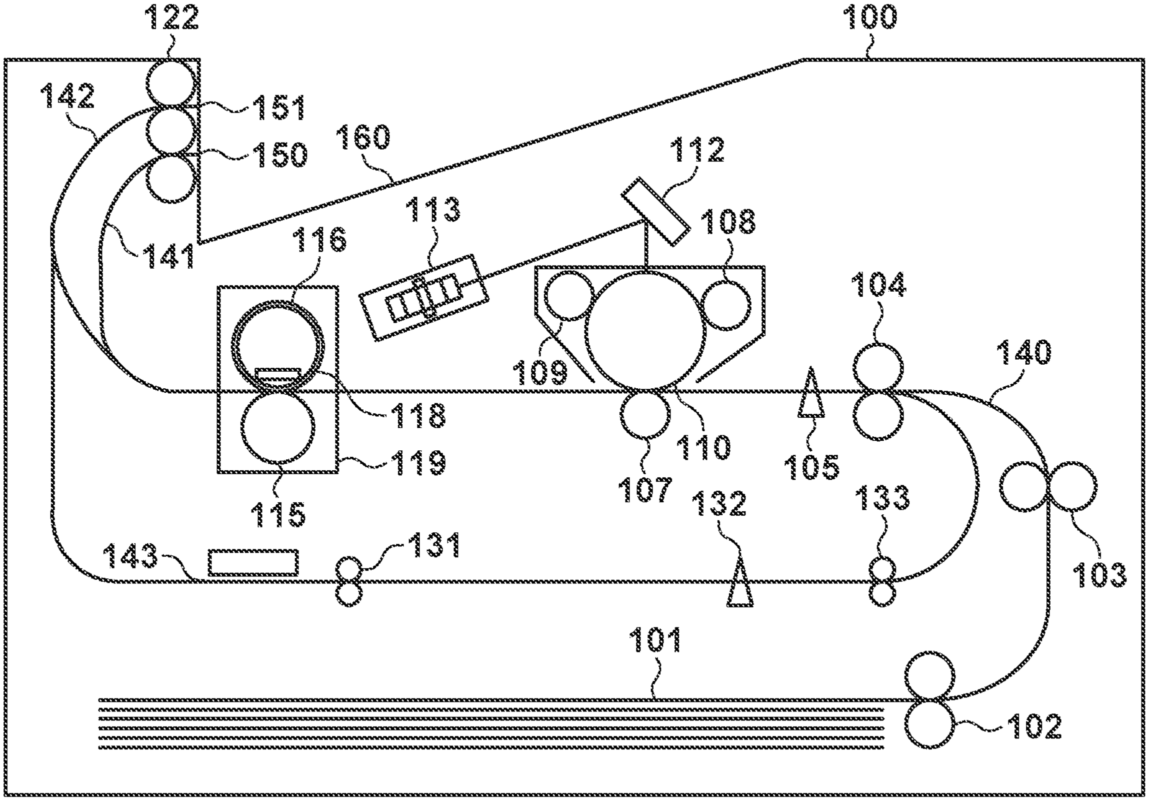
FIG. 1 is a cross-sectional view illustrating an example of an image forming apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

First Embodiment

An example in which the invention according to a first embodiment is applied in a laser beam printer serving as an image forming apparatus will be described hereinafter.

Configuration of Image Forming Apparatus

FIG. 1 is a cross-sectional view of an image forming apparatus 100 according to the present embodiment. In FIG. 1, a photosensitive drum 110, which serves as an image carrier, has a surface formed from an organic photosensitive material or an amorphous silicon photosensitive material, and is rotationally driven at a predetermined circumferential speed (process speed). The surface of the photosensitive drum 110 is uniformly charged to a predetermined polarity and potential by a charging roller 109.

The image forming apparatus 100 includes, as an exposure device, a scanner having a laser optics box 113 and a laser beam reflecting mirror 112. A laser beam output from the laser optics box 113 is reflected by the laser beam reflecting mirror 112 and irradiates the surface of the photosensitive drum 110, forming an electrostatic latent image corresponding to image information on the surface of the photosensitive drum 110. The timing at which the laser beam output is started, the timing at which the laser beam is turned on and off, and the like are determined based on the image information input from an external device 200 (described later). Note that the photosensitive drum 110 may be exposed by an exposure device having a light-emitting diode.

The electrostatic latent image formed on the surface of the photosensitive drum 110 is developed by a developing roller 108, and a toner image is formed on the photosensitive drum 110.

Next, a recording sheet is fed from a sheet feed cassette 101 to a printing conveyance path 140 by sheet feed rollers 102, and is conveyed by conveyance rollers 103 and registration rollers 104. Note that the image forming apparatus 100 may include a plurality of sheet feed cassettes 101. Alternatively, recording sheets may be fed from a sheet feed unit that is different from the sheet feed cassette 101, such as what is known as a “manual feed tray” or the like. A part that holds recording sheets subject to print operations, such as the sheet feed cassette 101, a manual feed tray, or the like, can be called a “sheet feed unit”.

The recording sheet is further fed to a transfer part formed between the photosensitive drum 110 and a transfer roller 107 via a registration sensor 105. The toner image on the photosensitive drum 110 is transferred to the recording sheet at the transfer part.

The toner image is transferred from the photosensitive drum 110 to the recording sheet by applying a predetermined voltage to the transfer roller 107.

The parts that perform image formation, for forming an image (a toner image) on the recording sheet, can be called an “image forming unit”. In the present embodiment, the image forming unit includes the photosensitive drum 110, the developing roller 108, and the transfer roller 107. The image forming unit may include other parts as well.

The recording sheet onto which the toner image has been transferred is fed to a fixing device 119. The recording sheet and the toner image are heated by a heater 118, a fixing film 116, and a compression roller 115, and the toner image is fixed to the recording sheet.

When discharging the recording sheet onto which the toner image has been fixed, the recording sheet is conveyed to an FD sheet discharge conveyance path 141, and is discharged from an opening 150 to an FD tray 160 by a roller group 122.

When double-sided printing is performed on the recording sheet, the recording sheet onto one side of which the toner image has been fixed is conveyed to an inverting conveyance path 142, and is conveyed from an opening 151 to a position at which part of the recording sheet protrudes.

An FD flapper (not shown) is provided at a branch point between the FD sheet discharge conveyance path 141 and the double-sided inverting conveyance path 142, and switches the conveyance direction between the FD sheet discharge conveyance path 141 and the double-sided inverting conveyance path 142. The recording sheet conveyed to the double-sided inverting conveyance path 142 is conveyed by the roller group 122 from the opening 151 to a position at which part of the recording sheet protrudes. When the rotation direction of the roller group 122 is switched, the recording sheet is conveyed toward a double-sided conveyance path 143.

The roller group 122 includes three rollers. When rotating forward, the roller group 122 conveys the recording sheet toward the opening 150 and conveys the recording sheet in the double-sided inverting conveyance path 142 toward the double-sided conveyance path 143. When rotating backward, the roller group 122 conveys the recording sheet in a direction from the double-sided inverting conveyance path 142 toward the opening 151.

The roller group 122 need not be constituted by three rollers as illustrated in the drawings. For example, the roller group 122 may be constituted by a roller pair for inverting the recording sheet, disposed near the opening 151, and a roller pair for discharging the recording sheet, disposed near the opening 150.

The recording sheet conveyed to the double-sided inverting conveyance path 142 by the roller group 122 is sent out again to the printing conveyance path 140 via double-sided conveyance path rollers 131, a double-sided sensor 132, and refeed rollers 133, and an image is then formed on the second surface.

Furthermore, the driving of the double-sided conveyance path rollers 131 can be turned on/off by a double-sided drive clutch (not shown), and at least one recording sheet can be held in the double-sided conveyance path 143. An image can also be formed on a second recording sheet by conveying the second recording sheet to the printing conveyance path 140 while the first recording sheet remains in the double-sided conveyance path 143.

Each of the rollers, such as the sheet feed rollers 102 and the conveyance rollers 103, is driven by at least one motor (not illustrated). In the present embodiment, the rollers and the photosensitive drum 110 are driven by a single motor. It is desirable for the double-sided conveyance path rollers 131 to be driven such that the recording sheet can remain within the double-sided conveyance path 143.

Controller Configuration

Figure 2:
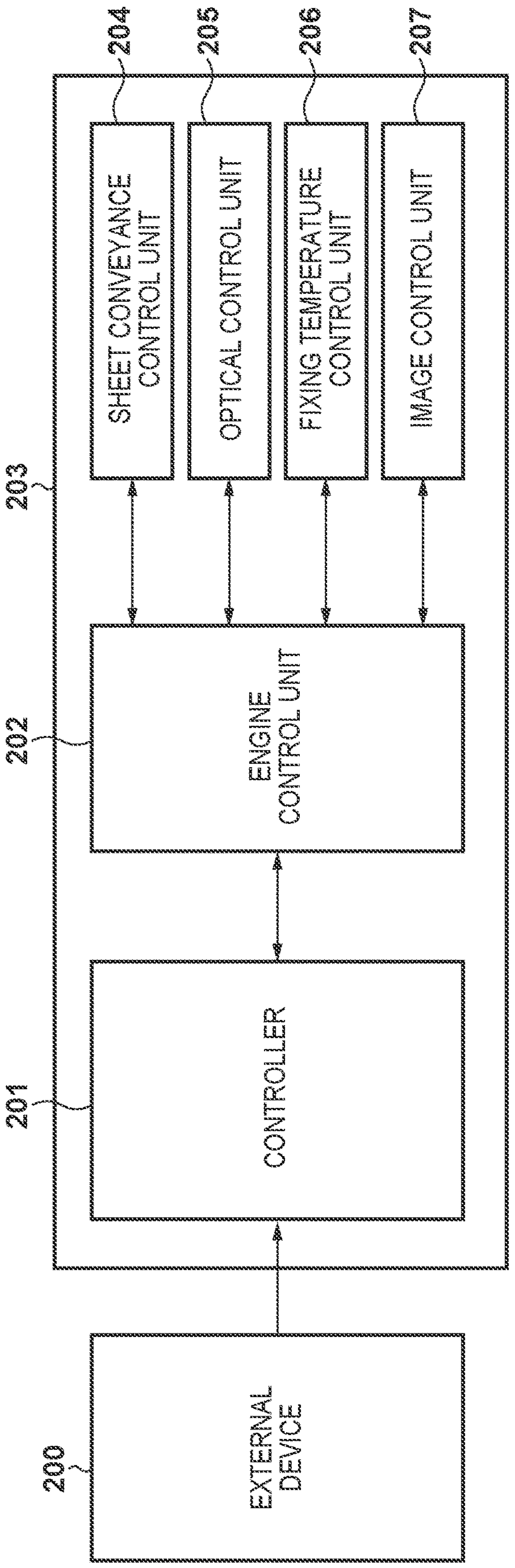
FIG. 2 is a block diagram illustrating a control system according to a first embodiment.

FIG. 2 is a block diagram illustrating a control system that controls the operations of the image forming apparatus 100 described above.

The image forming apparatus 100 includes a printer control unit 203. The printer control unit 203 includes a central processing unit (CPU), a read-only memory (ROM), and a random access memory (RAM). A control program executed by the CPU, data, and the like are stored in the ROM. The RAM is a memory used by the control program executed by the CPU to temporarily store information.

The printer control unit 203 includes a controller 201 and an engine control unit 202. The controller 201 and the engine control unit 202 may each include a CPU, a ROM, and a RAM. The printer control unit 203 may include a microcomputer having a ROM, a RAM, and a microprocessor serving as a CPU. The controller 201 and the engine control unit 202 may also include different microcomputers. The engine control unit 202 and the controller 201 exchange information with each other through serial communication, for example.

The external device 200 may be an information processing device such as a host computer, a mobile terminal such as a smartphone or a tablet, or the like. The external device 200 is connected to the controller 201 of the printer control unit 203 by a wire or wirelessly. The controller 201 of the external device 200 and the printer control unit 203 may be connected by a network device.

The controller 201 of the printer control unit 203 is configured to analyze page description language (PDL) data as input data sent from the external device 200. When a print operation is performed for a recording sheet, the controller 201 receives the PDL data sent from the external device 200. The controller 201 performs processing for expanding the PDL data into bitmap data (image data) required for printing. In other words, the controller 201 converts the PDL data into image data, or generates image data based on the PDL data. This processing may be performed by a conversion unit (not shown) provided in the controller 201.

Additionally, the image forming apparatus 100 includes processing devices for performing print operations including conveying a recording sheet and forming an image on the recording sheet. The processing devices include components involved in at least one of conveying the recording sheet and forming an image on the recording sheet, a drive source that drives the components, a power source that applies a predetermined voltage to the components, and a power source that supplies power to the drive source.

For example, the processing devices include a conveyance device that conveys the recording sheet, such as the sheet feed rollers 102 and the conveyance rollers 103, as well as the image forming unit, the exposure device, and the fixing device 119. The processing devices also include a drive source that drives these items.

The engine control unit 202 controls the operations of the processing devices in accordance with instructions from the controller 201. The operations of the processing devices include forming a latent image on the photosensitive drum 110, developing the latent image using toner, transferring and fixing the toner image onto a recording sheet, and conveying the recording sheet. The engine control unit 202 communicates internal information indicating the status of the various parts of the processing devices and the like to the controller 201.

A sheet conveyance control unit 204, an image control unit 207, an optical control unit 205, and a fixing temperature control unit 206 control corresponding targets for control based on instructions from the engine control unit 202.

The sheet conveyance control unit 204 controls the rotation and stopping of the sheet feed rollers 102, the conveyance rollers 103, and the like that convey the recording sheet. The image control unit 207 controls the output of high voltages (hundreds to thousands of volts) for charging, developing, and transferring. The optical control unit 205 controls the driving/stopping of a scanner motor provided in the exposure device, the lighting of the laser, and the like.

The fixing temperature control unit 206 controls the temperature of the heater 118 such that a target temperature specified by the engine control unit 202 is maintained.

The PDL data sent from the external device 200 includes external device data (device data) and print settings data (settings data). After analyzing the external device data and the print settings data, the controller 201 performs image expansion that generates image data based on the PDL data. An image is formed on the recording sheet based on the generated image data.

In the present embodiment, the external device data includes information such as the type of OS, the version of the OS, and the like as information on the software used in the external device 200. The print settings data includes information such as the sheet feed port, the printing mode, the color, the sheet size, and the like.

The devices controlled by the sheet conveyance control unit 204, the optical control unit 205, the fixing temperature control unit 206, and the image control unit 207 (e.g., heaters and motors) are operated in preparatory operations according to printing instructions, and in printing operations that follow thereafter. Note that it is not necessary for all of these devices to be operated during the preparatory operations. The preparatory operations will be described in detail below.

Preparatory Operations

It takes a certain length of time to reach a state in which print operations can be performed from a state in which the processing devices are stopped. Accordingly, when print operations are performed on a recording sheet, the processing devices execute preparatory operations based on instructions from the printer control unit 203.

In the present embodiment, the preparatory operations include first preparatory operations (first start-up operations) and second preparatory operations (second start-up operations) executed after the first preparatory operations. After the second preparatory operations are executed, print operations are started on a recording sheet (conveying the recording sheet and forming an image on the recording sheet).

Note that it is not necessary for all the processing devices to be subject to the preparatory operations. In other words, it is not necessary for all of the processing devices to be started up in the preparatory operations. For example, only some of the processing devices may be started up during print operations. In the present embodiment, in the preparatory operations (the first preparatory operations and second preparatory operations), at least one of the conveyance device that conveys the recording sheet, the fixing device 119 that heats the recording sheet, the image forming unit, and the exposure device that exposes the photosensitive drum 110 is started.

The following will describe the parts of the processing devices subject to the preparatory operations with respect to the preparatory operations of the processing device (the first preparatory operations and the second preparatory operations).

In the preparatory operations, after the processing devices are started up, the processing devices are controlled to be in the same operating state as when print operations are executed.

In the first preparatory operations, the target processing devices are started up by the sheet conveyance control unit 204, the optical control unit 205, the fixing temperature control unit 206, and the image control unit 207. The operations of the processing devices in the first preparatory operations are tentative, and may be different from the operations of the processing devices in the print operations. Accordingly, in the first preparatory operations, the processing devices may operate in a predetermined operation mode (in the present embodiment, operations assuming default settings applied at the time the apparatus is shipped), without using the print settings data.

The operations of the processing devices in the second preparatory operations are preferably equivalent to the operations of the processing devices in the print operations. Accordingly, the second preparatory operations are performed based on the print settings data. In other words, the printer control unit 203 determines the conditions for the second preparatory operations in accordance with the print settings data.

If the operation mode for the first preparatory operations is the same as the operation mode used when performing print operations, the operations of the processing devices in the first preparatory operations may be the same as the operations of the processing devices in the second preparatory operations. If the operation mode for the first preparatory operations is different from the operation mode used when performing print operations, the operations of the processing devices in the first preparatory operations are different from the operations of the processing devices in the second preparatory operations.

In this manner, when the print operations are performed on the recording sheet, the printer control unit 203 receives the PDL data sent from the external device 200 and starts analyzing the PDL data.

The printer control unit 203 executes the first preparatory operations, the second preparatory operations, and the print operations by controlling the processing devices. Specifically, the first preparatory operations of the processing devices are executed after the start of the analysis of the PDL data and before the end of the analysis of the print settings data. The second preparatory operations of the processing devices are executed after the end of the analysis of the PDL data, and more specifically, after the end of the analysis of the settings data. The print operations are executed after the end of the second preparatory operations and after the end of the expansion of the image data.

Control Block Diagram

FIG. 3 is a block diagram illustrating data and control functions pertaining to control performed by the image forming apparatus 100 according to the present embodiment. First information 401, which serves as the external device data, is data added to the PDL data sent from the external device 200 to the controller 201.

The first information 401 includes software data (software information) related to the software running on the external device 200. In the present embodiment, the first information 401 includes information related to at least one of the type and version of the software running on the external device 200. More specifically, the first information 401 includes the OS and the version thereof used by the external device 200, an application and the version thereof, a printer driver and the version thereof, or the like.

The following will describe a case where the first information 401 includes the OS type and the OS version as an example.

The PDL data input from the external device 200 may be referred to as "document description data" or "input data". The document description data or input data may be content to be printed, such as text, images, graphics, and the like. Alternatively, because the PDL data input includes a printing instruction, the PDL data may be called a "print job".

Second information 402 is data added to the PDL data sent from the external device 200 to the controller 201, and is information including the print settings data and the image data to be printed. The print settings data is data that includes information related to the sheet feed unit, the printing mode (printing speed), the printing color (color or black and white), the size of the recording sheet, the type of the recording sheet, and the like used in the print operations.

Timing information 404 is information pertaining to the timing at which a first preparatory operation instruction 406 (described later) will be executed, provided in matrix form (see the schematic diagram in FIG. 9). The timing information 404 is stored in a storage unit 405.

In the present embodiment, the controller 201 holds a data processing time Tdata for each OS type and OS version in the first information 401 as the timing information 404, as illustrated in FIG. 9.

The data processing time Tdata is a time from when the controller 201 starts analyzing the PDL data to when the first page is printed under the OS corresponding to the first information 401. For example, the data processing time Tdata may be a total value of the time from the start of the analysis of the PDL data to the completion of the expansion of the image data. The data processing time Tdata can be referred to as the time required to analyze the PDL data and generate the image data in accordance with the software (e.g., the OS) of the external device 200.

The time required for data analysis may be in units of pages, for example, and the time required for image expansion may be in units of pages or in units of bands into which pages are divided along lines. The data processing time also varies depending on the amount of data and the type of data, and thus the data processing time for predetermined sample data (also called simply a "processing time") may be used as Tdata.

One piece of the information included in the timing information 404 can be used as reference information, and the data processing time Tdata in the reference information can be used as a reference time Tbase. In other words, the reference time Tbase can be one selected piece of Tdata included in the timing information 404. Note that the reference time Tbase may be set separately from the timing information 404.

Although the processing devices perform the preparatory operations before performing the print operations, preparatory operations beyond the required amount are referred to as excess rotation (excess driving, excess operations).

It is desirable to select information including the data processing time Tdata in which no excess rotation arises in the processing devices as the reference information. For example, the printer control unit 203 starts up the processing devices at the same time as starting the analysis of the PDL data received from the external device 200, and performs the preparatory operations. It is desirable that no excess rotation arises when the print operations are started at the same time as when the expansion of the image data is completed. In other words, it is desirable that the reference time Tbase be a time closer to the time required for the preparatory operations of the processing devices. The reference time Tbase may be determined in advance.

In addition, the data structure of the timing information 404 need not be the same as that described in the present embodiment, as long as the type of software in the external device 200 instructing the printing and the differences in data processing times for each type can be identified.

The timing information 404 in the present embodiment includes information related to at least one of the type and version of the software (e.g., the OS) of the external device 200. Tdata can be called the time required to analyze the PDL data and generate the image data in accordance with that information.

The timing information 404 may be stored in a non-volatile memory of the controller 201 as updateable information, or may be stored as software code in a ROM in the one-chip microcomputer. If the timing information 404 is stored as updateable information, a medium that can be rewritten, such as a memory, may be used as the storage unit 405.

A first preparatory operation timing determination unit 403 obtains Twait (described later). When the print operations are performed, the first preparatory operation timing determination unit 403 sets the time of a difference between the data processing time Tdata corresponding to the first information 401 received from the external device 200, and the reference time Tbase, to Twait. The data processing time Tdata corresponding to the first information 401 is the data processing time Tdata associated with the type and version of the OS included in the received first information 401 in the timing information 404 illustrated in FIG. 9. The first preparatory operation timing determination unit 403 measures time immediately after the time Twait is calculated.

After the time Twait determined by the first preparatory operation timing determination unit 403 has passed, the controller 201 sends the first preparatory operation instruction 406 to the engine control unit 202.

The controller 201 sends the first preparatory operation instruction 406 to the engine control unit 202 after the PDL data is received from the external device 200 (after the PDL data analysis is started). The first preparatory operation instruction 406 is sent before the analysis of the print settings data is complete.

A first preparatory operation unit 408 tentatively starts up at least some of the control units of the processing devices (the sheet conveyance control unit 204, the optical control unit 205, the fixing temperature control unit 206, and the image control unit 207) in response to the first preparatory operation instruction 406.

The controller 201 sends a second preparatory operation instruction 407 to the engine control unit 202 at the timing at which the analysis of the print settings data in the PDL data received from the external device 200 is complete.

A second preparatory operation unit 409 causes the control units of the processing devices (the sheet conveyance control unit 204, the optical control unit 205, the fixing temperature control unit 206, and the image control unit 207) to operate based on the print settings data, in response to the second preparatory operation instruction 407.

The image forming apparatus 100 is connected to an external server 210 so as to be capable of communicating therewith over a network. In the present embodiment, by uploading update data 411 to the external server 210, a business operator who provides the image forming apparatus 100 can provide the update data 411 for the firmware of the controller 201 from the external server 210.

For example, if the version of the OS included in the first information 401 is upgraded (updated), the business operator provides the update data 411 for updating the first information 401 to the external server 210. The update data 411 includes update information for the timing information 404 with the type and new version of the OS to be upgraded, and the data processing time Tdata when printing using the new version, as a set. Through the update processing, the update data 411 is downloaded to the image forming apparatus 100, and the update information included therein is added to the timing information 404.

The image forming apparatus 100 periodically inquires with the external server 210 as to whether the update data 411 is available using an update data request unit 412. If there is update data that the inquiring apparatus does not have, the external server 210 notifies the controller 201 of the corresponding update data 411 using an update data notification unit 410. The controller 201 stores the received update data 411 in the timing information 404.

In this manner, the update information of the timing information 404 may be obtained from outside the image forming apparatus 100 and stored.

Timing Chart

FIGS. 4A and 4B illustrate timing charts according to the present embodiment and a comparative example. FIG. 4A indicates a timing chart according to the comparative example, and FIG. 4B indicates a timing chart according to the present embodiment.

Operations performed when not using the timing information 404 will be described as the comparative example. Operations before and after the OS type and version are changed are indicated from top to bottom in the part of the comparative example indicating the operations of the controller and the engine control unit.

First, a situation in which the time required to analyze the PDL data and expand the image data is substantially equal to the reference time Tbase will be described.

Timing 301*a* is the timing at which printing is instructed in the external device 200 and an application within the external device 200 starts converting to PDL. Timing 302*a* is the timing at which the external device 200 starts sending PDL data to the controller 201. The controller 201 starts analyzing the PDL data at the timing at which the PDL data is received from the external device 200.

In the comparative example, the controller 201 issues the first preparatory operation instruction 406 to the engine control unit 202 at the timing at which the PDL data is received (the timing at which the PDL data analysis is started).

Having received the first preparatory operation instruction 406, the engine control unit 202 starts the first preparatory operations of the processing devices using the first preparatory operation unit 408. The analysis of the PDL data is not complete at this timing, and thus the print settings data is unknown. Accordingly, the engine control unit 202 starts the processing devices in a predetermined operation mode (in the present embodiment, operations assuming default settings applied at the time the apparatus is shipped).

The timing 303*a* is the timing at which the sending of the PDL data from the external device 200 to the controller 201 is complete. Timing 304*a* is the timing at which the controller 201 completes the data analysis of the PDL data sent from the external device 200.

The controller 201 analyzes the PDL data, sends the second information 402 to the engine control unit 202, and starts the expansion of the image data. The controller 201 furthermore sends the second preparatory operation instruction 407 to the engine control unit 202. The engine control unit 202 performs the second preparatory operations using the second preparatory operation unit 409, based on the print settings data in the second information 402 sent from the controller 201. The analysis of the PDL data is complete at this timing, and thus the operations of the processing devices are switched from the mode started by the first preparatory operation unit 408 to an operation mode based on the analyzed print settings data.

Timing 305*a* is the timing at which the controller 201 completes the expansion of the image data. After the image expansion is complete, the controller 201 issues a print instruction to the engine control unit 202. The engine control unit 202 can start the print operations after receiving the print instruction from the controller 201.

Then, the engine control unit 202 starts feeding the recording sheet. Timing 306*a* is the timing at which a predetermined length of time has passed after the recording sheet fed at timing 305*a* has reached the registration sensor 105. At timing 306*a*, the controller 201 instructs the latent image and toner image formation on the photosensitive drum 110, after which the toner image is transferred to the recording sheet.

Timing 307*a* is the timing at which the formation of a toner image on the photosensitive drum 110 and the transfer to the recording sheet are complete.

Timing 308*a* is the timing at which the recording sheet is discharged to the FD tray 160 and the various parts of the image forming apparatus 100 stop. The image forming apparatus 100 takes a time equivalent to Tprint from when the recording sheet begins being conveyed until the recording sheet is discharged to the FD tray 160.

If the time required to analyze the PDL data and expand the image data is substantially equal to the reference time Tbase, the timing at which the preparatory operations are complete and the timing of the print instruction will be about the same. As such, excess rotation does not occur or only occurs for a short time.

The following descriptions use a case where the OS of the external device 200 has been upgraded to version 4 of OS A as an example. Timing 303*a*' is the timing to which the completion of the sending of the PDL data from the external device 200 to the controller 201 is extended when the version of OS A reaches 4. Timing 305*a*' is the timing at which the controller 201 completes the expansion of the image data when the version of OS A reaches 4.

Assume that Tbase is the time required to analyze the PDL data and expand the image before the OS of the external device 200 is upgraded. Assume that TdataB is the time required to analyze the PDL data and develop the image after the OS of the external device 200 has been upgraded to version 4 of OS A.

The data processing time increases by TdataB−Tbase=Ta due to the OS upgrade. This delays the start of the second preparatory operations by the processing devices and the expansion of the image data. As a result, the image forming apparatus 100 performs print operations with a time delay of Ta compared to before the OS was upgraded. The first preparatory operations are therefore performed by the processing devices in excess by the time Ta.

Due to the OS version upgrade, timing 306*a*, timing 307*a*, and timing 308*a* are also delayed by the time Ta, becoming timing 306*a*', timing 307*a*', and timing 308*a*', respectively.

Operations performed when using the timing information 404 of the present embodiment are illustrated in FIG. 4B.

The operations of the image forming apparatus 100 according to the comparative example and the operations of the image forming apparatus 100 according to the present embodiment are the same before the OS of the external device 200 is upgraded. Therefore, FIG. 4B illustrates only a case where the OS type of the external device 200 has been upgraded to version 4 of OS A.

Timing 302*b* is the timing at which the external device 200 starts sending PDL data to the controller 201. The controller 201 analyzes the PDL data and obtains the OS type and version information of the external device 200 based on the first information 401.

The first preparatory operation timing determination unit 403 obtains Tdata from the timing information 404 based on the OS type and version information of the external device 200.

Then, the first preparatory operation timing determination unit 403 calculates Twait=TdataB−Tbase, which is the difference from the reference time Tbase in the timing information 404, using Tdata as TdataB. Twait=Ta in the present embodiment.

In FIGS. 4A and 4B, Tready is the time required from the start to the end of the preparatory operations, and the reference time Tbase may be selected to be approximately equal to the time Tready.

To describe in detail with reference to FIG. 9, when the reference time Tbase=100 ms and the OS type of the external device 200 is version 4 of OS A, Tdata obtained from the timing information 404 is Tdata=500 ms. Twait=Tdata−Tbase, and thus 500 ms−100 ms=400 ms is set as the waiting time (standby time) for Twait.

Timing 303*b* is the timing at which the time Twait has passed from timing 302*b*. The controller 201 issues the first preparatory operation instruction 406 to the engine control unit 202 at timing 303*b*. Having received the first preparatory operation instruction 406, the engine control unit 202 starts the preparatory operations of the processing devices using the first preparatory operation unit 408.

In other words, the first preparatory operations by the processing devices start after the standby time (Twait) has passed following the start of PDL data analysis. At this time, the printer control unit 203 determines the length of Twait based on the external device data (the first information 401) in the PDL data.

The image forming apparatus 100 then performs the print operations. In this manner, the image forming apparatus 100 waits for the time Twait before starting the first preparatory operations by the amount by which the data processing time is extended, which makes it possible to prevent excess rotation in the processing devices.

Flowchart

FIG. 5 is a flowchart illustrating processing executed by the controller 201 when changing the start timing of the first preparatory operations according to the OS type and version of the external device 200 according to the present embodiment.

The controller 201 includes a processor and a memory, and the processing by the controller 201 may be performed by the processor executing a program stored in the memory. However, the operations by the first preparatory operation unit 408 and the second preparatory operation unit 409 are mainly performed by the engine control unit 202.

The controller 201 waits to receive PDL data (step S501). When printing, the external device 200 sends PDL data, including the OS type and OS version, to the controller 201 as the first information 401. Upon receiving the PDL data sent from the external device 200 (step S501—YES), the controller 201 analyzes the PDL data to obtain the first information 401 (step S502).

The controller 201 determines whether the timing information 404 includes the OS type and version indicated by the first information 401 obtained in step S502 (step S503). If the OS version corresponding to the first information 401 is found in step S503, the difference between Tdata, which is the timing information 404 for that version stored in the storage unit 405, and the reference time Tbase is calculated, and the calculated difference is set as the waiting time Twait (step S504). If the corresponding version cannot be found in step S503, the waiting time Twait is set to 0 (step S505).

The controller 201 waits for the time Twait to pass using a timer or the like (step S506). After the time Twait has passed, the controller 201 sends the first preparatory operation instruction 406 to the engine control unit 202 (step S507). Upon receiving the first preparatory operation instruction 406, the engine control unit 202 performs the first preparatory operations of the processing devices using the first preparatory operation unit 408 in a predetermined operation mode (step S508).

After completing the analysis of the PDL data sent from the external device 200 (step S509), the controller 201 sends the second information 402 and the second preparatory operation instruction 407 to the engine control unit 202 (step S510). The engine control unit 202 executes the second preparatory operations based on the second information 402.

In the present embodiment, the first preparatory operations are performed using default settings. The default settings are setting values set assuming, for example, A4 size plain paper. If, for example, heavy paper is specified in the second information 402, other operations are performed according to the second information 402, such as switching the speed of the conveyance device to a lower speed, in the second preparatory operations (step S511).

Once the image expansion is complete (step S512—YES), the image can be formed on the recording sheet, and thus the controller 201 issues a print instruction to the engine control unit 202 (step S513). Once the print instruction is received, the engine control unit 202 starts the print operations, conveys the recording sheet, and forms the image on the recording sheet.

Note that the unit by which the analysis is completed in step S509 and the unit by which the image expansion is completed in step S512 need not be the entire print job. In view of the fact that the image forming apparatus 100 performs the printing processing in units of pages, the stated unit may be units of pages instead, for example. Furthermore, if the image data generated from the input PDL data is raster data, the generated image data for each band is sent to the processing devices and is subject to image formation. Accordingly, in step S512 in particular, the image expansion (or image generation or image conversion) may be determined in units of bands into which the pages are divided along lines.

Although the foregoing describes Twait as the difference between Tdata and Tbase, Twait may be determined for each OS type and version of the external device 200, for example. In this case, Twait is stored in the timing information 404 for each OS type and version of the external device 200.

Twait can also be determined based on the time for analyzing the PDL data sent from the external device 200 running a predetermined OS (a reference analysis time). In other words, the difference between the time for analyzing the PDL data sent from the external device 200 running the upgraded OS and the reference analysis time may be taken as Twait. In this case, the time for analyzing the PDL data is stored in the timing information 404 for each OS type and version of the external device 200.

As described above, the printer control unit 203 of the image forming apparatus 100 determines the timing at which the first preparatory operations are to be executed based on the device data (the first information 401) of the external device 200. In the present embodiment, the printer control unit 203 obtains the standby time Twait from the timing at which the PDL data is received and the analysis of the PDL data is started as the timing at which the first preparatory operations are to be executed.

The device data preferably includes software data related to the software used in the external device 200. The printer control unit 203 determines the timing at which the first preparatory operations are to be executed based on the software data sent from the external device 200.

The software data preferably includes information related to at least one of the type of the software and the version of the software. The software data also preferably includes information related to the type and version of the OS of the external device 200.

The printer control unit 203 adjusts the start timing of the preparatory operations by the processing devices of the image forming apparatus 100 based on the external device data sent from the external device 200. This makes it possible to prevent excess rotation in the image forming apparatus 100. Even after the apparatus has been shipped as a product, excess rotation in the image forming apparatus 100 can be prevented when the software of the external device 200 has been upgraded by updating the timing information 404.

Second Embodiment

Description of Image Forming Apparatus

In a second embodiment, descriptions of the image forming apparatus as a whole are the same as those in the first embodiment and will therefore be omitted; furthermore, identical constituent elements will be given the same reference numerals. The object of the second embodiment is the same as that of the first embodiment. The difference from the first embodiment is that the engine control unit 202 includes the storage unit 405 for the timing information 404, and makes the determination for the timing at which the first preparatory operations are to start. Furthermore, in the present embodiment, the timing information 404 is updated based on a result of measurement by the engine control unit 202.

Block Diagram

FIG. 6 is a block diagram illustrating the image forming apparatus according to the present embodiment. The controller 201 includes a first information notification unit 417. The first information notification unit 417 analyzes the PDL data received from the external device 200, and notifies the engine control unit 202 of the first information 401 after the first information 401 is obtained. The controller 201 sends the first preparatory operation instruction 406 to the engine control unit 202 at the same time as the notification of the first information 401 by the first information notification unit 417.

The engine control unit 202 includes the storage unit 405 that stores the timing information 404. The engine control unit 202 also includes a measurement unit 415 that measures Tanalysis, which is the time from when the first preparatory operation instruction 406 is received during a print to the completion of the image expansion by the controller 201. After the first preparatory operation instruction 406 is received from the controller 201, the engine control unit 202 determines the timing of the first preparatory operation instruction 406 by comparing the first information 401 notified by the first information notification unit 417 with the timing information 404 stored in the storage unit 405. The controller 201 issues the first preparatory operation instruction 406 once the timing determined by the first preparatory operation timing determination unit 403 is reached. The first preparatory operations are executed as a result.

Like the first embodiment, the timing information 404 also includes the time Tdata associated with the type and version of the OS. Like the first embodiment, the timing information 404 may include update data provided by the external server 210.

In the present embodiment, when updating the timing information 404, the time Tanalysis and the first information 401 (OS type and version) sent from the first information notification unit 417 can be added as a set. The time Tanalysis is the time from the start of the preparatory operations by the first preparatory operation unit 408 to the completion of the image expansion by the controller 201, measured by the engine control unit 202. The configuration is such that when updating the timing information 404, such a set of information is additionally stored in the storage unit 405. Note that the time Tanalysis added to the timing information 404 may be stored and handled as the time Tdata.

Timing Chart

Figure 7:
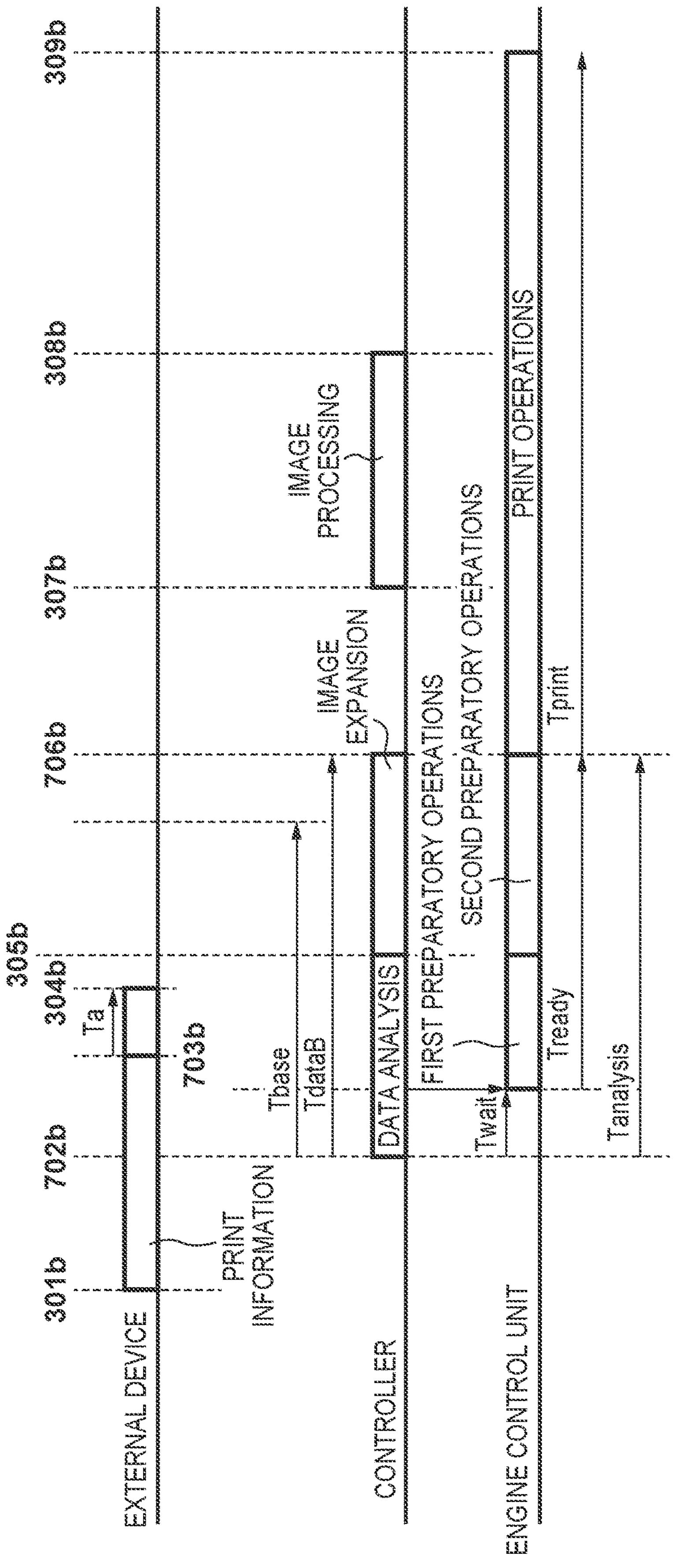
FIG. 7 is a timing chart illustrating a control system according to a second embodiment.

FIG. 7 is a timing chart according to the present embodiment. Only the differences from FIGS. 4A and 4B will be described here. Timing 702*b* is the timing at which the controller 201 starts receiving the PDL data from the external device 200, and the controller 201 starts analyzing the PDL data. After the analysis of the first information 401 included in the PDL data is complete, the controller 201 notifies the engine control unit 202 of the first information 401 using the first information notification unit 417, and issues the first preparatory operation instruction 406.

Once the engine control unit 202 receives the first preparatory operation instruction 406, the first preparatory operation timing determination unit 403 obtains the type and version of the OS of the external device 200 based on the first information 401 received from the controller 201.

The engine control unit 202 determines whether data corresponding to the type and version of the OS of the external device 200 is included in the timing information 404.

If the timing information 404 includes data corresponding to the type and version of the OS of the external device 200, the first preparatory operation timing determination unit 403 calculates Twait.

Specifically, the first preparatory operation timing determination unit 403 calculates the difference between the corresponding data processing time Tdata and the reference time Tbase as Twait. Furthermore, the first preparatory operation timing determination unit 403 measures time and waits for the execution of the first preparatory operations until the time Twait has passed.

If the timing information 404 does not include data corresponding to the type and version of the OS of the external device 200, the first preparatory operation timing determination unit 403 starts measuring the time Tanalysis. The time Tanalysis is the time from when the first preparatory operation instruction 406 is received to when the controller 201 completes the image expansion. In this case, the first preparatory operations may be started immediately, using zero for Twait.

Timing 703*b* is the timing at which the time Twait has passed from the timing 302*b*, and at this timing, the engine control unit 202 starts the preparatory operations using the first preparatory operation unit 408.

Timing 705*b* is the timing at which the controller 201 completes the image expansion, and is the timing at which the print instruction is issued to the engine control unit 202. After receiving the print instruction, the engine control unit 202 ends the measurement of the time Tanalysis, and adds the type of OS and the version thereof in the first information 401, as well as the measured Tanalysis, to the timing information 404.

Flowchart

Figure 8B:
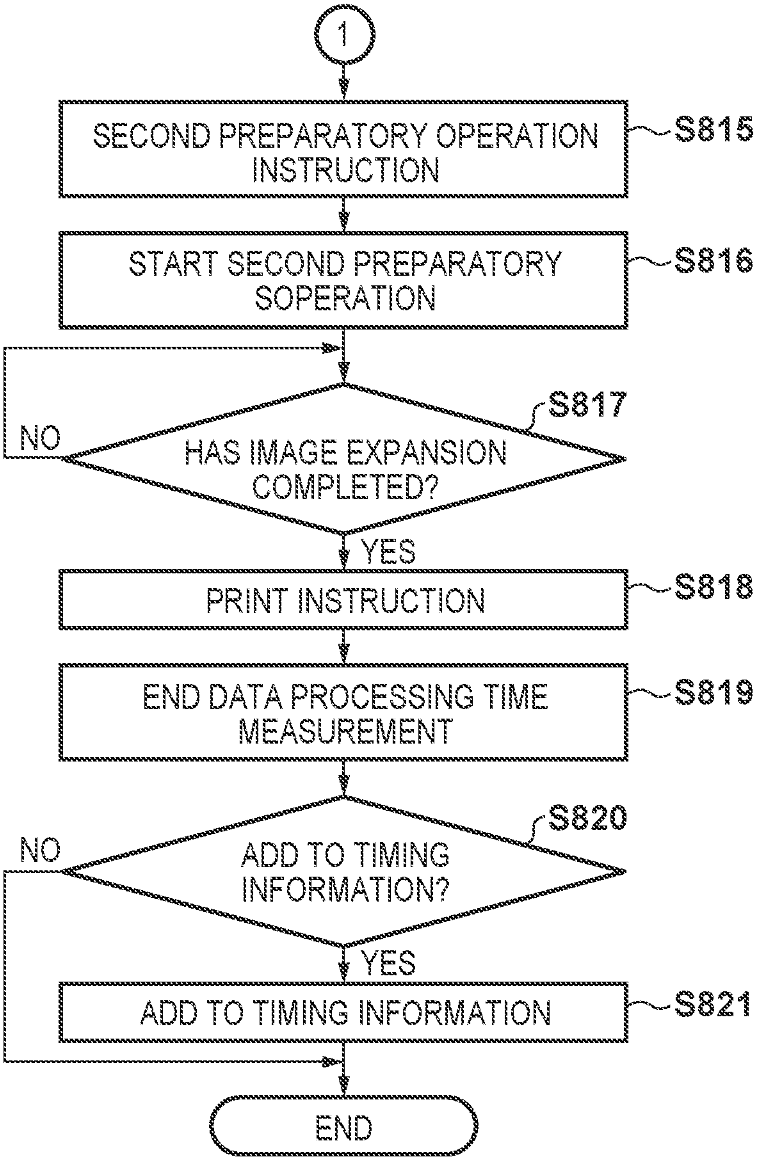

FIGS. 8A and 8B show a flowchart according to the present embodiment. The sequence illustrated in FIGS. 8A and 8B is executed by the controller 201 and the engine control unit 202. The controller 201 waits to receive PDL data (step S801). When printing, the external device 200 adds the OS type and OS version to the PDL data and sends the PDL data to the controller 201 as the first information. The controller 201 analyzes the PDL data sent from the external device 200 and obtains the first information (step S802).

The controller 201 sends the first information 401 to the engine control unit 202 using the first information notification unit 417 (step S803). At the same time as step S803, the controller 201 sends the first preparatory operation instruction 406 to the engine control unit 202 (step S804).

The engine control unit 202 verifies the first information 401 sent from the controller 201 against a list of the timing information 404 stored in the storage unit 405, and determines whether the corresponding OS version is present (step S805). If the corresponding registered information can be found in step S805, the corresponding time Tdata is obtained from the timing information 404 stored in the storage unit 405, and the difference from the reference time Tbase is then obtained and set as the waiting time Twait (step S806).

If the registration information cannot be found in step S805, the waiting time Twait is set to 0 (step S807). The engine control unit 202 then continues to measure the data processing time Tanalysis (step S809).

The engine control unit 202 waits for the time Twait to pass (step S810). Once the time Twait has passed, the engine control unit 202 starts the preparatory operations using the first preparatory operation unit 408 (step S811).

The controller 201 begins to expand the image data after the analysis of the PDL data sent from the external device 200 is complete (step S814). The controller 201 also sends the second information 402 and the second preparatory operation instruction 407 to the engine control unit 202 after the analysis of the PDL data is complete (step S815).

In response to the second preparatory operation instruction 407, the engine control unit 202 starts the second preparatory operations in order to enter an operation mode based on the second information (step S816). The engine control unit 202 waits for the controller 201 to complete the expansion of the image data (step S817).

Once the image data expansion is complete, the controller 201 issues a print instruction to the engine control unit 202 in order to start forming an image on the recording sheet (step S818).

If the time Tanalysis is being measured, the engine control unit 202 ends the measurement of the data processing time Tanalysis upon receiving the print instruction (step S819). If the data processing time Tanalysis is being measured by the engine control unit 202 (step S820), the measured time is additionally stored in the timing information 404 (step S821).

As described thus far, in the present embodiment, the timing information can be updated by measuring the data processing time Tanalysis corresponding to the OS version. The updating of the timing information according to the present embodiment is particularly effective when the image forming apparatus 100 is not connected to the external server 210 over a network capable of communication.

In the present embodiment, Twait can also be determined based on the time for analyzing the PDL data (the reference analysis time). In other words, the difference between the time for analyzing the PDL data sent from the external device 200 running the upgraded OS and the reference analysis time may be taken as Twait. That is, the time Tanalysis may be the time for analyzing the PDL data sent from the external device 200 running the upgraded OS.

Other Embodiments

The present invention can be implemented by processing of supplying a program for implementing one or more functions of the above-described embodiment to a system or apparatus via a network or storage medium, and causing one or more processors in a computer of the system or apparatus to read out and execute the program. The present invention can also be implemented by a circuit (for example, an ASIC) for implementing one or more functions.

An image forming apparatus according to the present invention will be described in further detail hereinafter with reference to the drawings.

Third Embodiment

Figure 10:
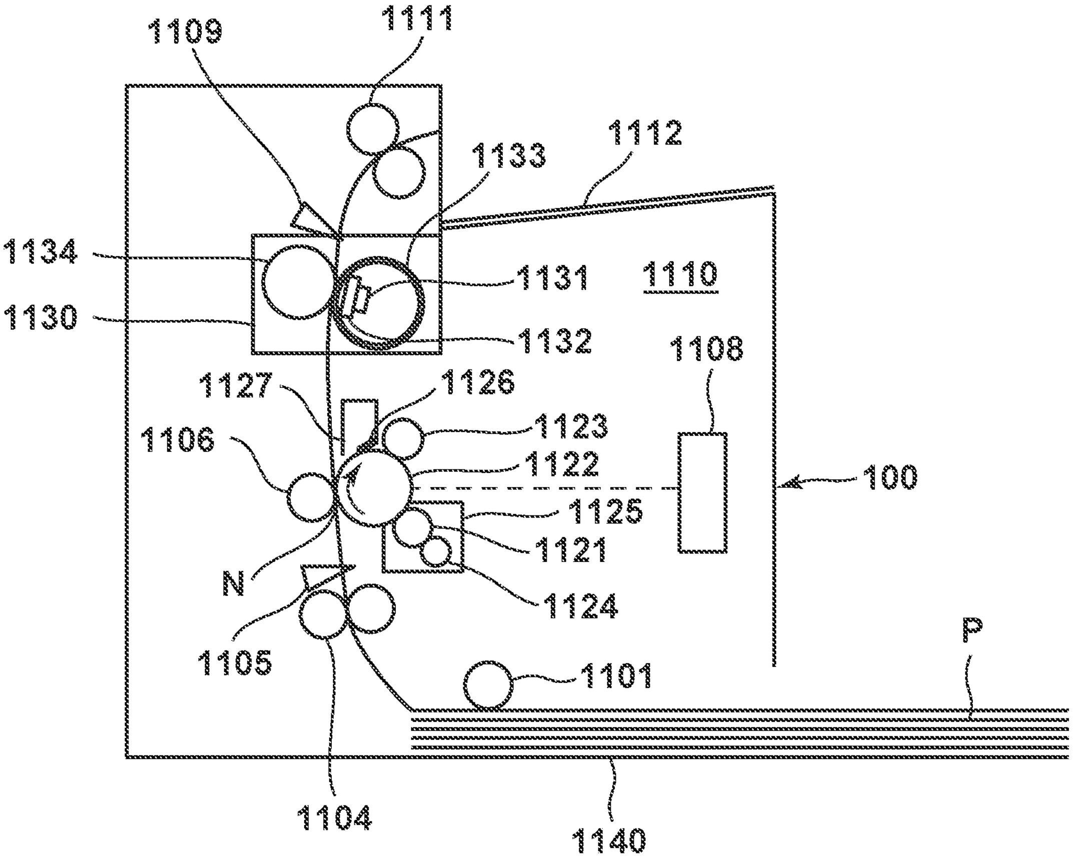
FIG. 10 is a schematic cross-sectional view of an image forming apparatus.

Overall Configuration of Image Forming Apparatus FIG. 10 is a schematic cross-sectional view of the image forming apparatus 100 according to the present embodiment. In the present embodiment, the image forming apparatus 100 is a laser beam printer capable of forming a monochromatic image on recording material P using the electrophotographic method.

The image forming apparatus 100 includes a photosensitive drum 1122, which is a rotatable drum-shaped (cylindrical) photosensitive member (an electrophotographic photosensitive member) configured using an organic photosensitive material, an amorphous silicon photosensitive material, or the like as an image carrier. The photosensitive drum 1122 is rotationally driven at a predetermined circumferential speed (process speed) in the direction of the arrow in the drawing (the clockwise direction). The surface (outer circumferential surface) of the photosensitive drum 1122 is uniformly charged to a predetermined potential of a predetermined polarity (negative, in the present embodiment) by a charging roller 1123, which is a roller-type charging member serving as a charging unit. The charging roller 1123 contacts the photosensitive drum 1122 and rotates by being driven by the rotation of the photosensitive drum 1122. During the charging, a charging voltage (charging bias), which is a DC voltage having the same polarity as the charging polarity of the photosensitive drum 1122 (negative, in the present embodiment), is applied to the charging roller 1123.

The charged photosensitive drum 1122 is irradiated with a laser beam output from a scanner (a laser scanner device) 1108 serving as an exposure unit, and an electrostatic latent image (electrostatic image) is formed on the photosensitive drum 1122. The scanner 1108 modulates (turns on/off) the laser beam in response to a time-series digital pixel signal based on image data input from an external device (an image signal generation device) 200 (FIG. 11), such as an image reading device, a host computer, or the like connected to the image forming apparatus 100. The scanner 1108 then exposes the surface of the photosensitive drum 1122 in a sub scanning direction (a direction of the movement of the photosensitive drum 1122) by repeatedly irradiating the surface of the photosensitive drum 1122 with this laser beam while scanning in a main scanning direction (a direction of the rotational axis of the photosensitive drum 1122). The timing at which the scanning exposure in the sub scanning direction is to be started is communicated to a controller unit 201 (FIG. 11; described later) by the engine control unit 202 (FIG. 11; also described later), using a sub scanning direction synchronization signal.

An electrostatic latent image formed on the photosensitive drum 1122 is developed using toner, which serves as a developing agent, supplied by a developer 1125, which serves as a developing unit, and a toner image (developer image) is formed on the photosensitive drum 1122. The toner is held in the developer 1125, and a developing roller 1121 serving as a developing agent carrier and a supply roller 1124 serving as a supply member are provided therein. A voltage is applied to the developing roller 1121 and the supply roller 1124, which are each rotationally driven at a uniform potential. As a result, the developing roller 1121 receives the supply of toner from the supply roller 1124, and supplies the toner to the surface of the photosensitive drum 1122 in accordance with the electrostatic latent image on the photosensitive drum 1122. In the present embodiment, the developing roller 1121 in the image forming apparatus 100 is substantially always in contact with the photosensitive drum 1122. In this manner, the electrostatic latent image formed on the photosensitive drum 1122 corresponding to the desired image is developed by a developing roller 1121 to which a voltage has been applied. During the developing, a developing voltage (developing bias), which is a DC voltage having the same polarity as the charging polarity of the photosensitive drum 1122 (negative, in the present embodiment), is applied to the developing roller 1121. Also, during the developing, a supply voltage (supply bias), which has an absolute value greater than the developing voltage and which is the same polarity as the charging polarity of the photosensitive drum 1122 (negative, in the present embodiment), is applied to the supply roller 1124. In the present embodiment, toner charged with the same polarity as the charging polarity of the photosensitive drum 1122 (negative, in the present embodiment) adheres to the exposed part (the image part) on the photosensitive drum 1122, for which the absolute value of the potential has dropped due to being exposed after being uniformly charged. In the present embodiment, the normal charging polarity of the toner, which is the main charging polarity of the toner during the developing, is negative.

The image forming apparatus 100 is provided with a sheet feed tray 1140, which serves as a feed unit (sheet feed port) in which a recording material (recording medium, paper, sheet) P, such as paper, is held (placed). Although the recording material P may be referred to as paper here, a material other than paper, such as a plastic film or synthetic paper, or a material containing a component other than paper, can also be used as the recording material P.

The recording material P is fed from the sheet feed tray 1140 by a sheet feed roller 1101, which serves as a feed member, and is sent to registration rollers 1104, which serves as a conveyance member. A registration sensor 1105, which serves as a recording material detection unit, also detects that the recording material P has reached the registration rollers 1104. The recording material P is then conveyed to a transfer part N (described later) by the registration rollers 1104.

A transfer roller 1106, which is a roller-type transfer member serving as a transfer unit, is disposed opposite the photosensitive drum 1122. The transfer roller 1106 is pressed toward the photosensitive drum 1122, and forms the transfer part N, which is a point of contact between the photosensitive drum 1122 and the transfer roller 1106. The toner image formed on the photosensitive drum 1122 is transferred onto the recording material P, which is a transfer target pinched between the photosensitive drum 1122 and a transfer roller 1106 and conveyed in that state, at the transfer part N. A toner image that is a mirror image of the toner image formed on the surface of the photosensitive drum 1122 is formed on the recording material P as a result. During the transfer, a transfer voltage (transfer bias), which is a DC voltage having a polarity opposite from the normal charging polarity of the toner (positive, in the present embodiment), is applied to the transfer roller 1106. The transfer roller 1106 supplies a charge having a polarity opposite from the normal charging polarity of the toner from the back surface of the recording material P. Toner that remains on the photosensitive drum 1122 without being transferred onto the recording material P (residual transfer toner) is scraped from the surface of the rotating photosensitive drum 1122 by a cleaning blade 1126 serving as a cleaning member and collected into a waste toner container 1127.

The recording material P onto which the toner image has been transferred is separated from the photosensitive drum 1122 and conveyed to a fixer 1130 serving as a fixing unit. The fixer 1130 fixes (melts and hardens) the toner image onto the recording material P by heating and compressing the recording material P carrying the unfixed toner image. The fixer 1130 includes a thermistor 1131, a heater 1132, a fixing film 1133, and a pressure roller 1134. The fixer 1130 heats and compresses the recording material P while pinching and conveying the recording material P at a fixing nip part formed by the fixing film 1133, which is heated by the heater 1132, and the pressure roller 1134, which is pressed against the fixing film 1133. The heating of the fixing film 1133 by the heater 1132 is controlled based on the result of the thermistor 1131 detecting the temperature.

The recording material P to which the toner image has been fixed is detected to have passed through the fixer 1130 correctly by a fixing/discharge sensor 1109 serving as a recording material detection unit. The recording material P that has passed through the fixer 1130 is conveyed by discharge rollers 1111 serving as discharge members, and is discharged (ejected, output), with the image surface facing downward, onto a discharge tray 1112 serving as a discharge unit provided in an upper part of the apparatus body of the image forming apparatus 100.

System Configuration of Image Forming Apparatus

Figure 11:
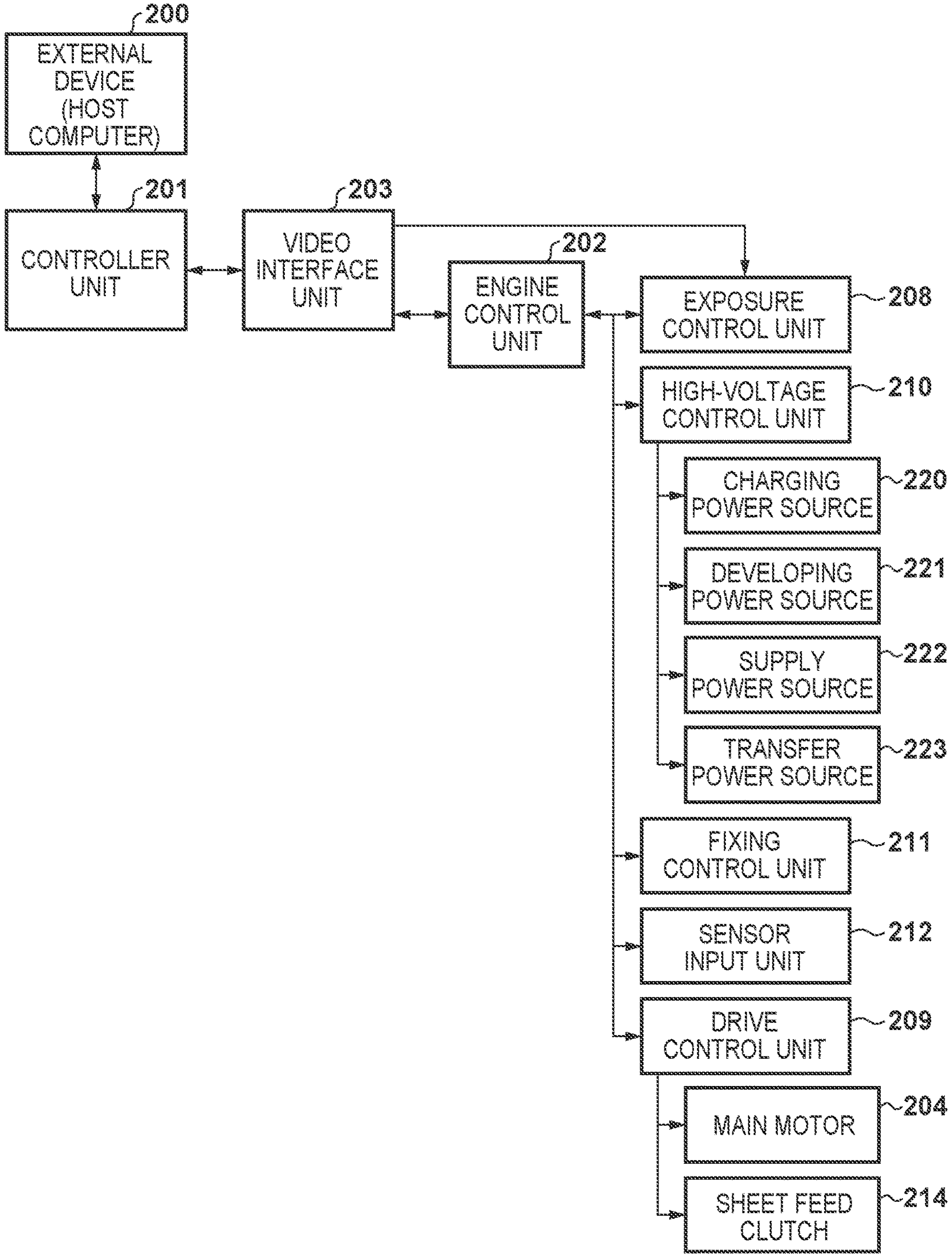
FIG. 11 is a block diagram illustrating the system configuration of an image forming apparatus according to third and fourth embodiments.

The system configuration of the image forming apparatus 100 will be described next. FIG. 11 is a block diagram illustrating the system configuration of the image forming apparatus 100 according to the present embodiment. The image forming apparatus 100 includes the controller unit 201 and the engine control unit 202. The controller unit 201 is capable of communicating with the external device (a host computer, in the present embodiment) 200, and is also capable of communicating with the engine control unit 202 via a video interface unit 203.

The external device 200 sends, to the controller unit 201 of the image forming apparatus 100, print conditions, image data (image information, image signals) of the image to be printed (formed), and print instructions (print commands). The controller unit 201 converts (expands) the image data received from the external device 200 into exposure data, which is image data necessary for image formation in the image forming apparatus 100, and generates print reservation information for each piece of recording material P based on the received print conditions. The print reservation information includes information on, for example, a sheet feed port indicating the supply source of the recording material P (the sheet feed tray 1140 or the like), the size of the recording material P, the print mode, and the like.

The controller unit 201 sends the print reservation information (a print reservation instruction) for that page to the engine control unit 202 through the video interface unit 203. Once the conversion from image data to exposure data is complete, the controller unit 201 sends a print instruction (print start instruction, image forming start instruction) to the engine control unit 202 through the video interface unit 203. Once the print instruction is received from the controller unit 201, the engine control unit 202 starts the image forming operations. The exposure data converted by the controller unit 201 is sent to an exposure control unit 208 as a digital pixel signal through the video interface unit 203. Note that the "image forming operations" are a series of operations including feeding the recording material P from the feed unit, forming an electrostatic latent image and toner image on the photosensitive drum 1122, transferring the toner image onto the recording material P, fixing the toner image onto the recording material P, and discharging the recording material P from the image forming apparatus 100. Additionally, in the present embodiment, an image forming unit 1110, which serves as an image formation unit, is constituted by the various rollers that convey the recording material P, such as the sheet feed roller 1101, as well as the photosensitive drum 1122, the charging roller 1123, the scanner 1108, the developer 1125, the fixer 1130, a drive source that drives the various parts, a power source that applies voltages to the various parts, and the like.

A drive control unit 209 controls a main motor 204, which serves as a drive source for rotationally driving the photosensitive drum 1122, the various rollers, and the like, in response to instructions from the engine control unit 202. The main motor 204 rotationally drives the sheet feed roller 1101, the registration rollers 1104, the photosensitive drum 1122, the transfer roller 1106, the pressure roller 1134, and the discharge rollers 1111. The main motor 204 and the sheet feed roller 1101 are connected by a sheet feed clutch 214. When the recording material P is fed from the sheet feed tray 1140, the sheet feed clutch 214 engages for a predetermined length of time, and the sheet feed roller 1101 is rotationally driven.

The exposure control unit 208 controls the rotation of a scanner motor (not shown) provided in the scanner 1108, the correction of the exposure amount of a light-emitting element (not shown) provided in the scanner 1108, and the like in response to an instruction from the engine control unit 202. Additionally, the exposure control unit 208 controls the irradiation of the photosensitive drum 1122 with the laser beam based on the exposure data received from the controller unit 201, in response to an instruction from the engine control unit 202.

A high-voltage control unit 210 controls high-voltage power sources, such as a charging power source 220, a developing power source 221, a supply power source 222, a transfer power source 223, and the like, in response to instructions from the engine control unit 202. The charging power source 220, the developing power source 221, the supply power source 222, and the transfer power source 223 apply the charging voltage, the developing voltage, the supply voltage, and the transfer voltage, which are DC voltages, to the charging roller 1123, the developing roller 1121, the supply roller 1124, and the transfer roller 1106, respectively.

A fixing control unit 211 detects the surface temperature of the heater 1132 using the thermistor 1131, and controls the supply of power to the heater 1132, in response to an instruction from the engine control unit 202.

A sensor input unit 212 obtains detection information from the registration sensor 1105 and the fixing/discharge sensor 1109, and outputs the information to the engine control unit 202.

Preparatory Operations and Image Forming Operations

Preparatory operations and image forming operations by the image forming apparatus 100 of the present embodiment will be described next.

Figure 12C:
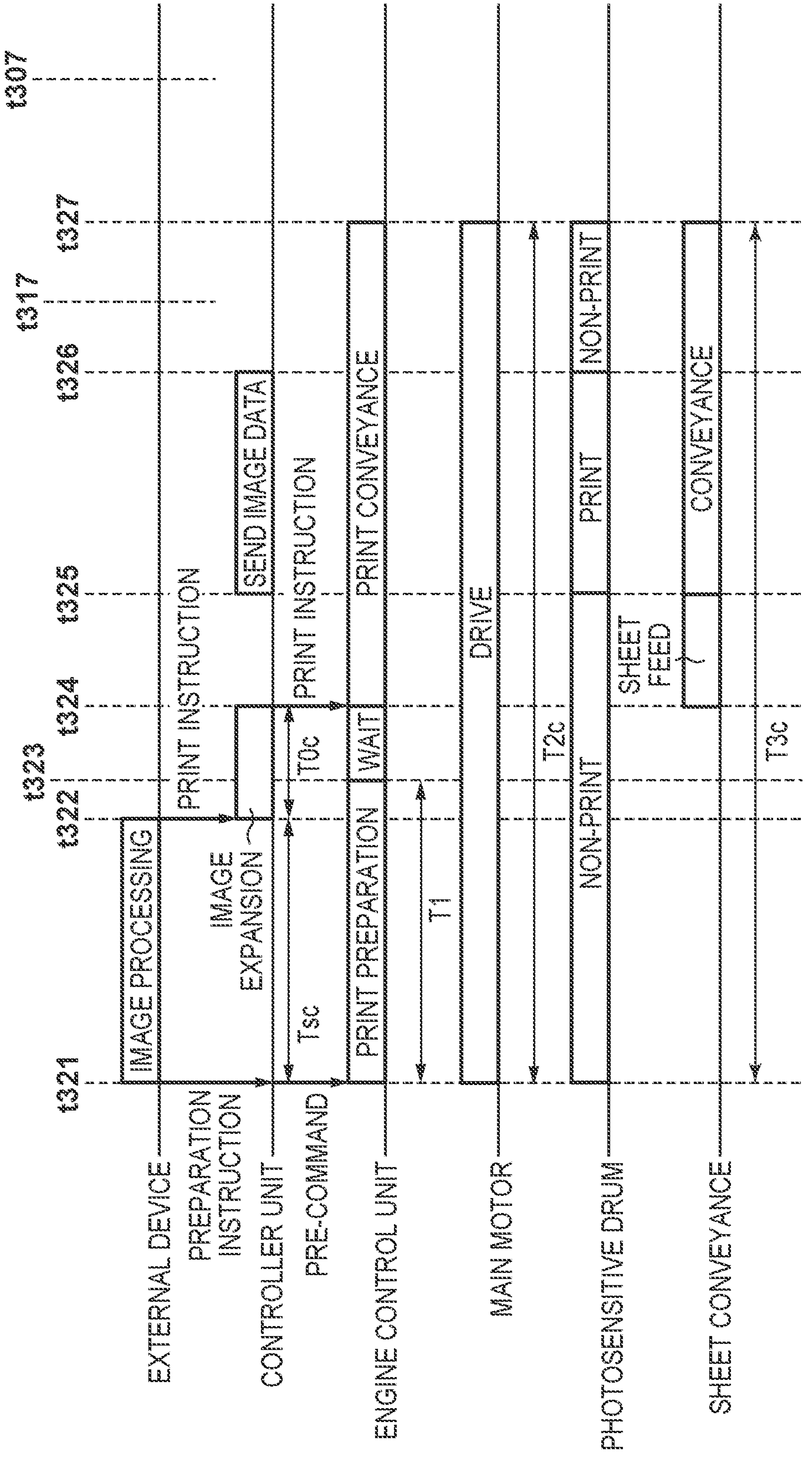
FIG. 12C is a timing chart illustrating operations of various units when (i) the engine control unit receives a pre-command and executes preparatory parallel operations and (ii) a time required for processing for preparing image data is long.
Figure 12D:
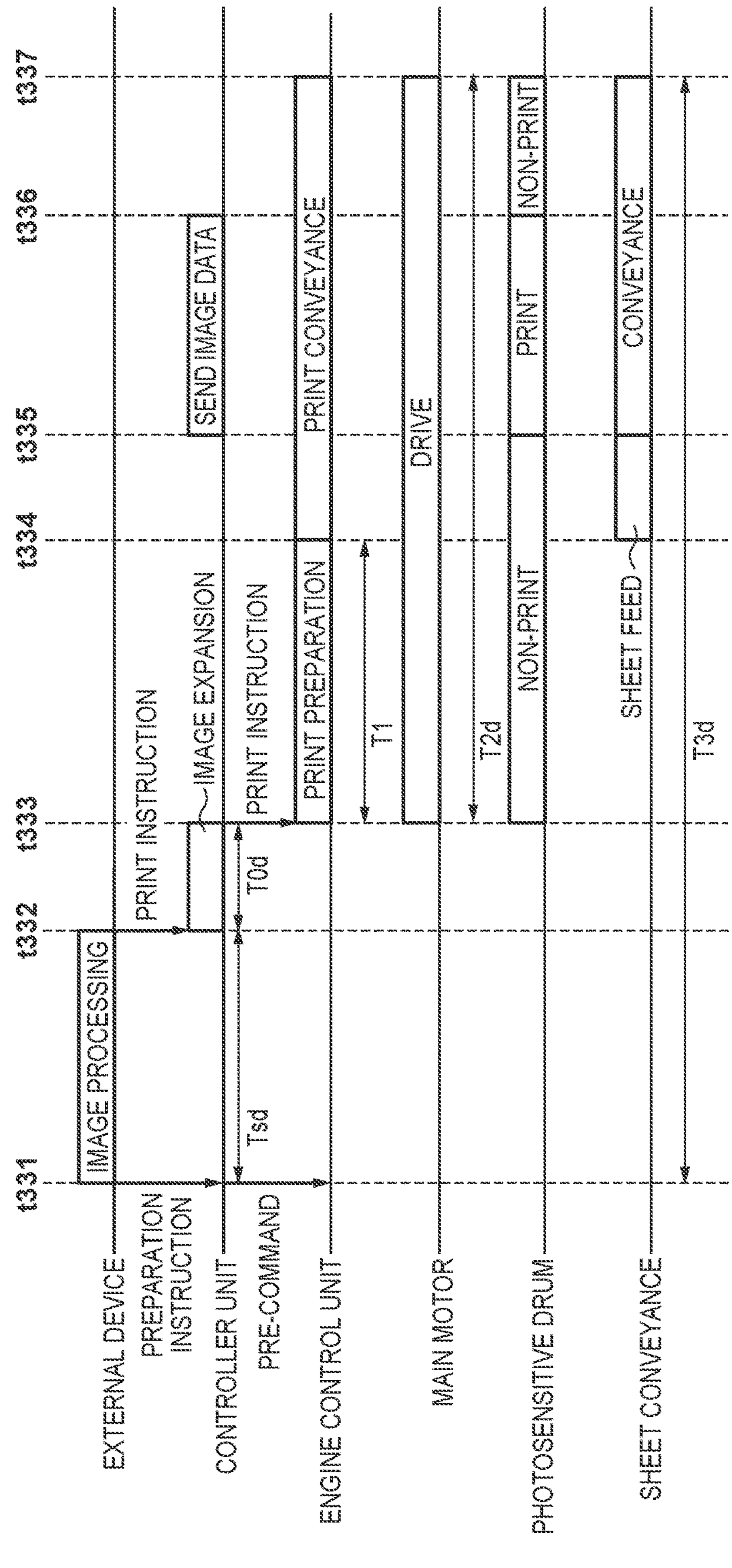
FIG. 12D is a timing chart illustrating operations of various units when the engine control unit does not execute preparatory parallel operations despite receiving a pre-command.

FIGS. 12A, 12B, and 12C are timing charts illustrating differences in the timings of operations by the various units in a job according to whether preparatory parallel operations are executed. FIG. 12A is a timing chart illustrating a case where the engine control unit 202 does not receive a pre-command (described later) and does not execute preparatory parallel operations. FIG. 12B is a timing chart illustrating a case where the engine control unit 202 receives a pre-command (described later) and executes preparatory parallel operations. FIG. 12C is a timing chart illustrating a case where the engine control unit 202 receives a pre-command (described later) and executes preparatory parallel operations, and where the external device 200 executes image processing for a longer period of time than in the case illustrated in FIG. 12B. FIGS. 12A, 12B, and 12C illustrate an example in which a single piece of the recording material P is printed onto. FIG. 12D is a timing chart illustrating a case where the engine control unit 202 does not execute preparatory parallel operations despite receiving a pre-command (described later), but this will be described later. Note that "job" refers to a series of operations in which an image is formed onto a single piece or multiple pieces of the recording material P and output, started by a single start instruction.

Operations of the respective parts during a job in which the engine control unit 202 does not receive a pre-command (described later) and does not execute the preparatory parallel operations will be described with reference to FIG. 12A. The external device 200 starts the image processing (t301), and communicates a print instruction to the controller unit 201 along with the image data upon the image processing being completed (t302). Note that the external device 200 starts the image processing pertaining to the image to be printed in response to, for example, an operator, such as a user, inputting a print instruction through application software. Once the print instruction is received, the controller unit 201 starts image expansion processing for expanding the image data into the bitmap data (exposure data) (t302), and communicates the print instruction to the engine control unit 202 upon the image expansion processing being completed (t303). The time taken by the external device 200 for the image processing at this time is represented by "Tsa", and the time taken by the controller unit 201 for the image expansion processing is represented by "T0*a*". Once the print instruction is received, the engine control unit 202 starts preparatory operations for preparing to execute the image forming operations (print preparations) (t303). In the preparatory operations, the engine control unit 202 drives the main motor 204, causes the charging roller 1123 to charge the surface of the photosensitive drum 1122, and causes the supply roller 1124 to supply toner to the developing roller 1121. In addition, in the preparatory operations, the engine control unit 302 starts energizing the fixing heater 1132 as an operation for starting up the fixer 1130. In this manner, the drive sources, the high-voltage power sources, and the fixer 1130 are started up in the preparatory operations. The scanner 1108 may also be started up (the scanner motor may be rotated) and the like in the preparatory operations. In the present embodiment, the length of time required for the preparatory operations is determined by the length of time required to start up the fixer 1130. The engine control unit 202 takes the preparatory operations as being complete when a predetermined length of time T1 has passed following the start of the startup operations of the fixer 1130 (t304). Once the preparatory operations are complete, the engine control unit 202 starts the image forming operations (print conveyance) (t304). In other words, the engine control unit 202 drives the sheet feed clutch 214 such that the recording material P is fed from the sheet feed tray 1140 (t304). The engine control unit 202 outputs the sub scanning direction synchronization signal serving as a reference timing for the output of the digital pixel signal (exposure data) to the controller unit 201 at a predetermined timing after the leading edge of the recording material P passes the registration sensor 1105 (t305). As a result, the controller unit 201 starts sending the image data (exposure data) to the exposure control unit 208 (t305). The engine control unit 202 controls the scanner 1108 to expose the surface of the photosensitive drum 1122 and form an electrostatic latent image on the photosensitive drum 1122 by the exposure control unit 208 controlling the scanner 1108 in accordance with the digital pixel signal received from the controller unit 201. As a result, the toner supplied from the developing roller 1121 adheres to the electrostatic latent image formed on the photosensitive drum 1122, and a toner image is formed on the photosensitive drum 1122. The engine control unit 202 also causes the transfer voltage to be applied to the transfer roller 1106, and causes the toner image on the photosensitive drum 1122 to be transferred onto the recording material P. The recording material P is separated from the photosensitive drum 1122 and then conveyed to the fixer 1130. Then, after the image has been fixed in the fixer 1130, the recording material P is discharged onto the discharge tray 1112 by the discharge rollers 1111. After the sending of the image data (exposure data) by the controller unit 201 is complete (t306), the engine control unit 202 stops driving the main motor 204 at the timing at which the recording material P passes the discharge rollers 1111, and ends the image forming operations (print conveyance) (t307). Here, the driving time of the main motor 204 at this time is represented by "T2*a*", in the section from t303 to t307, and the FPOT time is represented by "T3*a*", in the section from t301 to t307.

Operations of the respective parts during a job in which the engine control unit 202 receives a pre-command (described later) and executes the preparatory parallel operations will be described with reference to FIG. 12B. FIG. 12B corresponds to a first mode (described later). Descriptions of processing that is the same as in FIG. 12A will be omitted as appropriate. The external device 200 starts the image processing, communicates a preparation instruction to the controller unit 201 (t311), and communicates a print instruction to the controller unit 201 along with the image data upon the image processing being completed (t312). Once the preparation instruction is received, the controller unit 201 communicates a pre-command indicating the start of the preparatory operations (a first instruction) to the engine control unit 202 (t311). Once the print instruction is received, the controller unit 201 starts image expansion processing for expanding the image data into bitmap data (exposure data) (t312), and communicates a print instruction (a second instruction) to the engine control unit 202 upon the image expansion processing being completed (t313). At this time, the time required for the external device 200 to perform the image processing is represented by "Tsb" and the time required for the controller unit 201 to perform the image expansion processing is represented by "T0*b*", and in this case, Tsb is equal to Tsa (Tsb=Tsa) and T0*b* is equal to T0*a* (T0*b*=T0*a*) in the case of FIG. 12A. On the other hand, once the pre-command is received, the engine control unit 202 starts preparatory operations similar to those in the case of FIG. 12A (t311), and once the predetermined length of time T1 has passed, the preparatory operations are taken as being complete (t314). Because the engine control unit 202 has received the print instruction at t313, the sheet feed clutch 214 is driven at t314 such that the recording material P is fed from the sheet feed tray 1140 (the image forming operations are started). Thereafter, the controller unit 201 sends the image data (exposure data) in the same manner as in FIG. 12A (t315 to t316). After the recording material P is discharged into the discharge tray 1112, the engine control unit 202 stops driving the main motor 204 and ends the image forming operations (t317). At this time, the driving time of the main motor 204 is represented by "T2*b*" in the section from t311 to t317, and T2*b* is equal to T2*a* (T2*b*=T2*a*) in the case of FIG. 12A. In addition, the FPOT time at this time is represented by "T3*b*" in the section from t311 to t317, and T3*b* is equal to T2*b* (and T2*a*, in the case of FIG. 12A) (T3*b*=T2*b*, T3*b*=T2*a*). In addition, because T3*a* is longer than T2*a* in the case of FIG. 12A, T3*b* is shorter than T3*a* in the case of FIG. 12A (T3*b*<T3*a*). Therefore, in the case of FIG. 12B, the FPOT can be made shorter than in the case of FIG. 12A. Note that for purposes of comparison, FIG. 12B also indicates the timing of t307 in FIG. 12A.

Operations performed by the respective units during the job, when the engine control unit 202 receives a pre-command and executes the preparatory parallel operations and the external device 200 executes the image processing for a longer period of time than in the case illustrated in FIG. 12B, will be described with reference to FIG. 12C. FIG. 12C corresponds to a case where excess rotation time (the time from when the preparatory operations are completed to when the image forming operations are started) occurs in the first mode (described later). One of the features of the present embodiment is that operations for switching between the first mode and a second mode (described later) are executed to avoid a situation such as that illustrated in FIG. 12C to the greatest extent possible. However, as will be described later, the conditions for switching between the first mode and the second mode can be set as appropriate and are therefore not limited to a case where the FPOT is to be prioritized. In the case of FIG. 12C, the external device 200 executes the image processing for a longer period of time than in the case of FIG. 12B, but the controller unit 201 executes the image expansion processing for the same amount of time. Descriptions of processing that is the same as in FIGS. 12A and 12B will be omitted as appropriate. The external device 200 starts the image processing, communicates a preparation instruction to the controller unit 201 (t321), and once the image processing is complete, communicates a print instruction to the controller unit 201 along with the image data (t322). Once the preparation instruction is received, the controller unit 201 communicates a pre-command indicating the start of the preparatory operations (a first instruction) to the engine control unit 202 (t321). Additionally, once the print instruction is received, the controller unit 201 starts the image expansion processing for expanding the image data into bitmap data (exposure data)

(t322). On the other hand, once the pre-command is received, the engine control unit 202 starts preparatory operations similar to those in the case of FIGS. 12A and 12B (t321), and once the predetermined length of time T1 has passed, the preparatory operations are taken as being complete (t323). In this case, at the point in time when the engine control unit 202 completes the preparatory operations (t323), the controller unit 201 is performing the image expansion processing, and the controller unit 201 has not yet communicated a print instruction (the second instruction) to the engine control unit 202. Accordingly, the engine control unit 202 waits for the print instruction without performing the sheet feed operations at the point in time when the preparatory operations are complete (t323). The controller unit 201 communicates the print instruction to the engine control unit 202 upon the image expansion processing being completed (t324). At this time, the time required for the external device 200 to perform the image processing is represented by Tsc and the time required for the controller unit 201 to perform the image expansion processing is represented by T0*c*, and in this case, Tsc is longer than Tsb (Tsc>Tsb) and T0*c* is equal to T0*b* (T0*c*=T0*b*) in the case of FIG. 12B. Once the print instruction is received, the engine control unit 202 drives the sheet feed clutch 214 such that the recording material P is fed from the sheet feed tray 1140 (the image forming operations are started) (t324). Thereafter, the controller unit 201 sends the image data (exposure data) in the same manner as in FIGS. 12A and 12B (t325 to t326). After the recording material P is discharged into the discharge tray 1112, the engine control unit 202 stops driving the main motor 204 and ends the image forming operations (t327). At this time, the driving time of the main motor 204 is represented by T2*c* in the section from t321 to t327, and T2*c* is longer than T2*b* in the case of FIG. 12B, longer than T2*a* in the case of FIG. 12A, and the like (T2*c*>T2*b*, T2*c*>T2*a*). In addition, the FPOT time at this time is represented by "T3*c*" in the section from t321 to t327, and T3*c* is equal to T2*c*. The time from when the preparatory operations are started (t321) to when the sheet is fed (t324) (Tsc+T0*c*) is shorter than the time from when the external device 200 starts the image processing (t301) to when the sheet is fed (t304) in the case of FIG. 12A (Tsa+T0*a*+T1). Therefore, in the case of FIG. 12C, the FPOT can be made shorter than in the case of FIG. 12A.

On the other hand, the driving time of the main motor 204 increases by an amount equivalent to the excess rotation time compared to the cases of FIGS. 12A and 12B, and the time thereof is the time from t323 to t324 ((Tsc+T0*c*)−T1). Note that for purposes of comparison, FIG. 12C also indicates the timings of t307 in FIG. 12A and t317 in FIG. 12B.

In other words, for example, when the configuration of the external device 200 (such as the OS) is changed such that the image processing time Tsb in FIG. 12B becomes the image processing time Tsc in FIG. 12C, excess rotation time arises in each subsequent job. The lifespan of components of the image forming apparatus 100, such as components in the fixer 1130, may be shortened as a result. Recent years have seen a trend towards shortening the time required for preparatory operations, and such problems have become more likely as a result. It is also possible that the configuration of the external device 200 (the OS or the like) will be changed again, and the image processing time will be shortened (e.g., Tsc returns to Tsb).

Accordingly, in the present embodiment, preparatory parallel operations are restricted, or the restriction is canceled, such that excess rotation time does not occur regularly in subsequent jobs, e.g., when the configuration of the external device 200 is changed. This method will be described in more detail hereinafter.

Switching Operation Modes

Figure 14A:
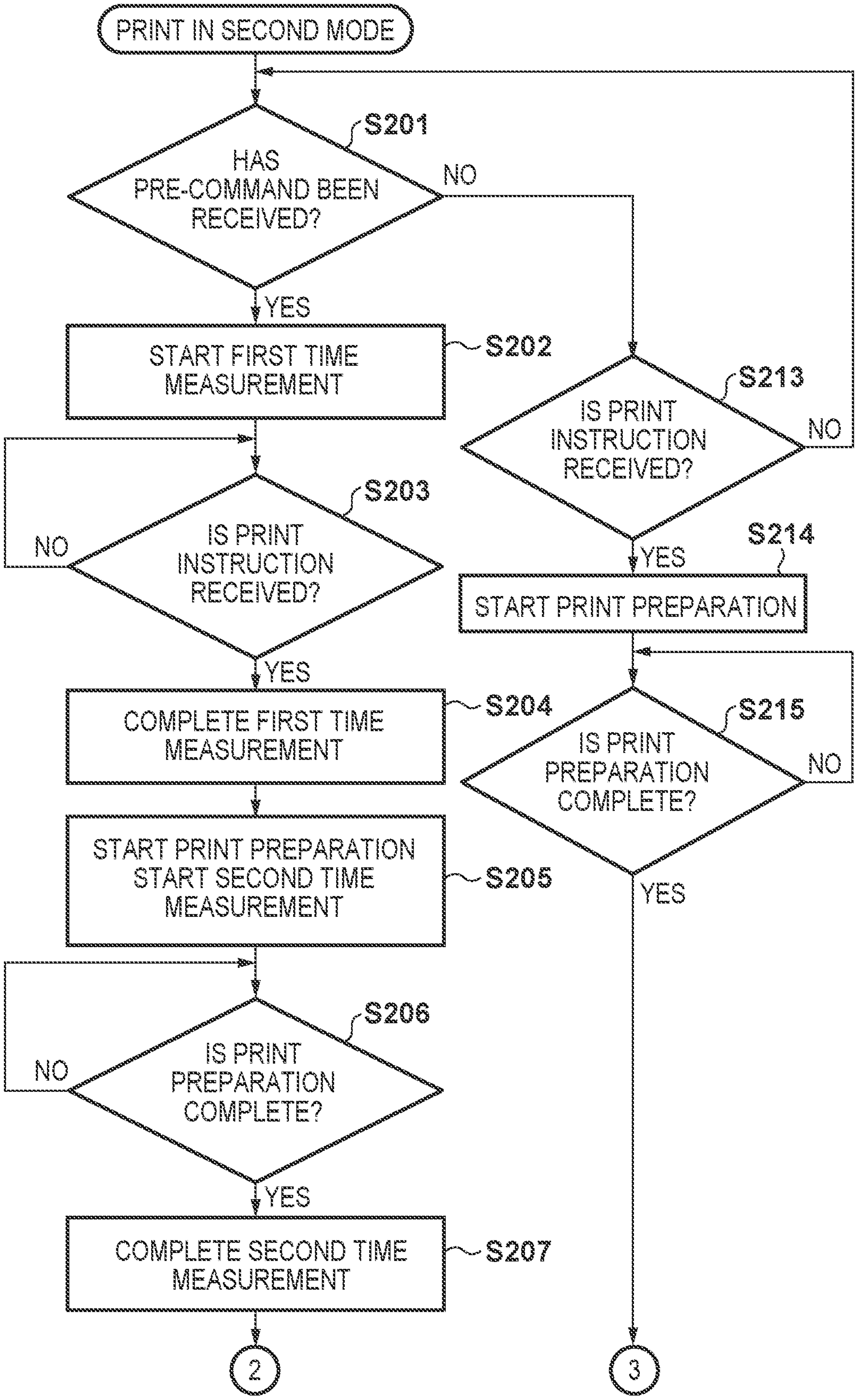
FIGS. 14A and 14B illustrate a flowchart illustrating a sequence of startup operations according to the third embodiment.
Figure 14B:
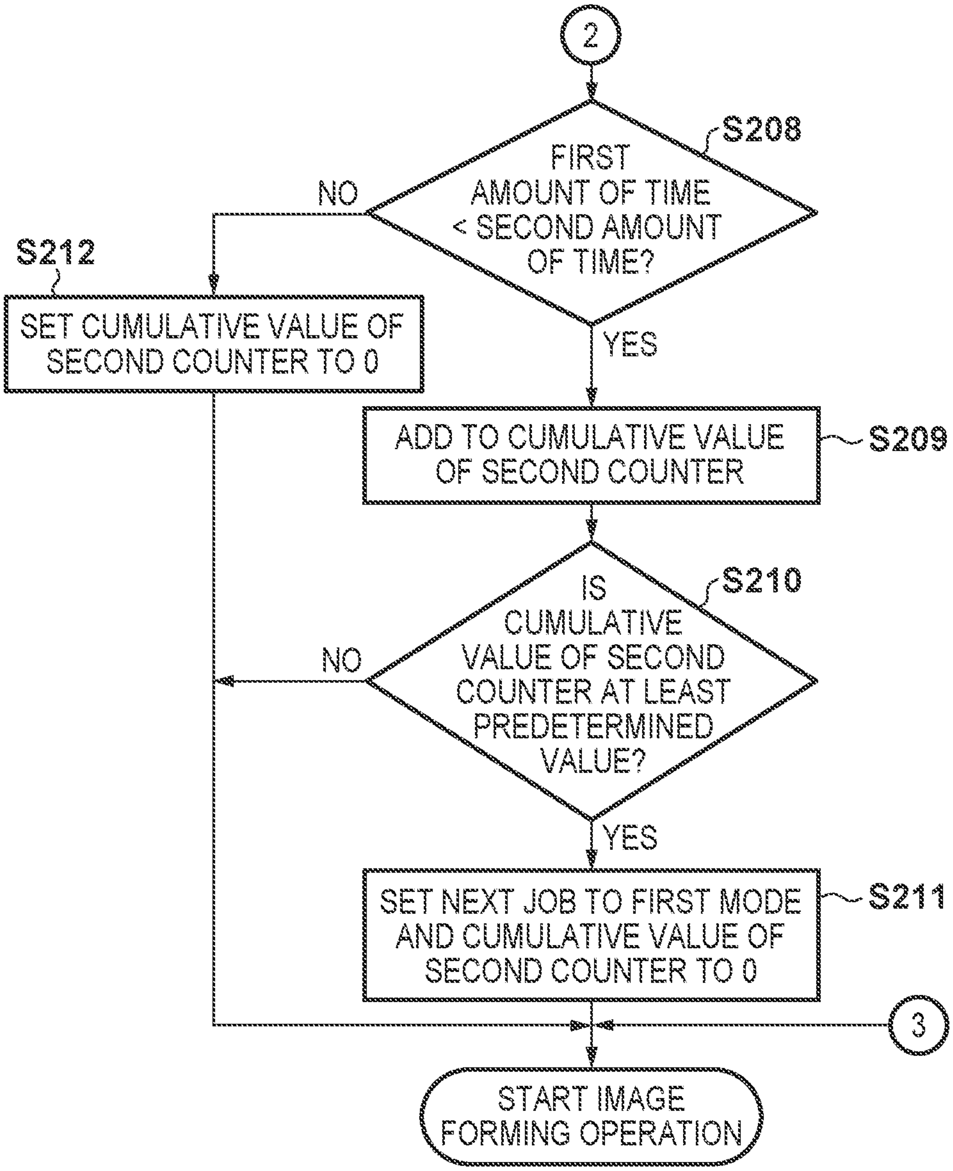
Figure 15:
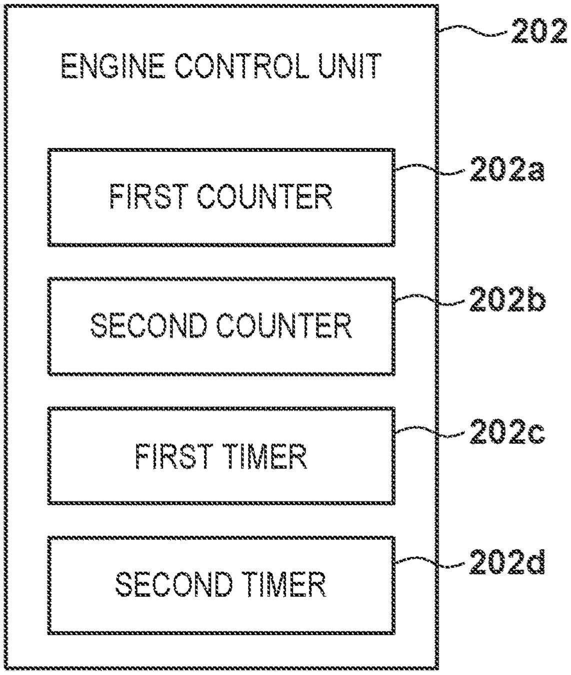
FIG. 15 is a schematic diagram illustrating function blocks of an engine control unit according to the third embodiment.

FIGS. 13 and 14 are flowcharts illustrating a sequence of startup operations from a standby state, in which the engine control unit 202 waits for an instruction from the controller unit 201, until image forming operations are started, according to the present embodiment. An operation mode in which the engine control unit 202 starts the preparatory operations by receiving the pre-command, i.e., an operation mode in which operations according to the timing chart illustrated in FIGS. 12B and 12C are executed, will be called a "first mode". An operation mode in which the engine control unit 202 does not start the preparatory operations despite receiving the pre-command, and rather starts the preparatory operations after receiving a print instruction, i.e., an operation mode in which operations according to the timing chart illustrated in FIG. 12D (described later) are executed, will be called a "second mode". FIG. 13 illustrates a sequence for making a decision to switch the operation mode from the first mode to the second mode while the engine control unit 202 is controlling the startup operations in the first mode. FIGS. 14A and 14B illustrate a sequence for making a decision to switch the operation mode from the second mode to the first mode while the engine control unit 202 is controlling the startup operations in the second mode. FIG. 15 is a schematic diagram illustrating function blocks of the engine control unit 202 according to the present embodiment. The engine control unit 202 is configured including a CPU serving as a computation processing unit, a memory (storage device) such as a ROM, a RAM, a non-volatile memory, or the like serving as a storage unit, an input/output circuit that inputs/outputs signals to/from devices outside the engine control unit 202, and the like. The CPU is the main entity that performs the control by the engine control unit 202. The ROM stores programs, data, and the like processed by the CPU. The RAM temporarily stores data related to control and the like. The non-volatile memory stores various types of settings information and the like. In the present embodiment, the engine control unit 202 includes a first counter 202*a* and a second counter 202*b* as counting units. In the present embodiment, the first counter 202*a* and the second counter 202*b* are realized by the CPU and the non-volatile memory (or the RAM), respectively. In the present embodiment, the engine control unit 202 includes a first timer 202*c* and a second timer 202*d* as time measurement units. In the present embodiment, the first timer 202*c* and the second timer 202*d* are realized by the CPU and the non-volatile memory (or the RAM), respectively.

It is assumed that in an initial state, the engine control unit 202 controls the startup operations in the first mode.

The sequence of the startup operations in the first mode will be described with reference to FIG. 13.

Once the pre-command is received from the controller unit 201 (step S101), the engine control unit 202 starts the preparatory operations (step S102), and waits until the preparatory operations are complete (step S103). If, at the point in time when the preparatory operations are complete, the print instruction has not yet been received from the controller unit 201 (step S104), the engine control unit 202 adds 1 to the cumulative value of the first counter 202*a* (step S105). A case where the print instruction has not yet been received at the point in time when the preparatory operations are complete is the case illustrated in the timing chart in FIG. 12C. The first counter 202*a* is a counter indicating the number of times a print instruction has been received after the completion of preparatory operations started by the engine control unit 202 after receiving a pre-command, i.e., the number of jobs in which excess rotation time has arisen.

In the initial state of the engine control unit 202, the cumulative value of the first counter 202*a* is 0 (an initial value).

Then, after receiving the print instruction from the controller unit 201 (step S106), the engine control unit 202 determines whether the cumulative value of the first counter 202*a* is at least a predetermined first threshold (step S107). If the cumulative value of the first counter 202*a* is at least the first threshold in the processing of step S107, the engine control unit 202 sets the operation mode for the next job to the second mode (stores the operation mode in the non-volatile memory), and resets the cumulative value of the first counter 202*a* to 0 (step S108). This ensures that the excess rotation time does not occur regularly. The engine control unit 202 then ends the sequence in FIG. 13 and starts image forming operations (sheet feed operations). On the other hand, if the cumulative value of the first counter 202*a* is less than the first threshold in the processing of step S107, the engine control unit 202 keeps the operation mode for the next job as the first mode (does not change the settings stored in the non-volatile memory), and does not change the cumulative value of the first counter 202*a*. The engine control unit 202 then ends the sequence in FIG. 13 and starts image forming operations (sheet feed operations). The first threshold is a value of at least 1, and should be determined in advance in accordance with the configuration of the image forming apparatus 100, taking into account the tradeoff between suppressing the occurrence of excess rotation time and shortening the FPOT. Lowering the first threshold makes it easier to switch the operation mode from the first mode to the second mode and suppress the occurrence of excess rotation time, but also reduces the number of cases in which the FPOT can be shortened. If the first threshold is 1, the operation mode switches from the first mode to the second mode even if excess rotation time has only occurred in a single job. Setting the first threshold to at least 2 and resetting the first counter 202*a* in step S109 may cause the operation mode to switch from the first mode to the second mode when excess rotation time has continuously occurred in a predetermined number of jobs that is at least 2.

If, at the point in time when the preparatory operations are complete, the print instruction has been received from the controller unit 201 (step S104), the engine control unit 202 resets the cumulative value of the first counter 202*a* to 0 (step S109). The engine control unit 202 then ends the sequence in FIG. 13 and starts image forming operations (sheet feed operations). A case where the print instruction has been received at the point in time when the preparatory operations are complete is the case illustrated in the timing chart in FIG. 12B.

In the present embodiment, the engine control unit 202 waits for the pre-command to be received from the controller unit 201 (step S101), and also waits for the print instruction to be received (step S110). A case where the controller unit 201 sends only the print instruction without sending the pre-command to the engine control unit 202 is the case illustrated in the timing chart in FIG. 12A. In this case, after receiving the print instruction without receiving the pre-command from the controller unit 201 (steps S101 and S110), the engine control unit 202 executes the preparatory operations (steps S111 and S112), ends the sequence in FIG. 13, and starts image forming operations (sheet feed operations). Note that the present embodiment assumes a case where the external device 200 does not send the preparation instruction to the controller unit 201, and the controller unit 201 does not send the pre-command to the engine control unit 202, depending on, for example, the configuration of the external device 200 (the application, the printer driver, or the like). However, if the controller unit 201 absolutely must send the pre-command to the engine control unit 202, the processing of steps S110 to S112 need not be provided, and the processing of steps S102 to S109 may be executed after waiting for the pre-command to be received in step S101.

The sequence of startup operations in the next job, after the engine control unit 202 has switched the operation mode from the first mode to the second mode in step S108 of FIG. 13, is the sequence illustrated in FIGS. 14A and 14B. The sequence of the startup operations in the second mode will be described with reference to FIGS. 14A and 14B.

Once the pre-command is received from the controller unit 201 (step S201), the engine control unit 202 uses the first timer 202*c* to start measuring a first time, which is the time from when the pre-command is received to when the print instruction is received (step S202). Once the print instruction is received from the controller unit 201 (step S203), the engine control unit 202 stops the measurement of the first time by the first timer 202*c* (step S204). The engine control unit 202 also uses the second timer 202*d* to start measuring a second time, which is the time required for the preparatory operations, and starts the preparatory operations (step S205). Once the preparatory operations are complete (step S206), the engine control unit 202 stops the measurement of the second time by the second timer 202*d* (step S207).

The engine control unit 202 then compares the measured first time and the second time, and determines whether the second time is longer than the first time (step S208). If the second time is longer than the first time in the processing of step S208, the engine control unit 202 adds 1 to the cumulative value of the second counter 202*b* (step S209). This means that the situation has changed from one in which excess rotation time will occur to one in which excess rotation time will not occur, when the first mode is used. The second counter 202*b* is a counter indicating the number of jobs in which the time required for the engine control unit 202 to perform the preparatory operations (the second time) is longer than the time from when the pre-command is received to when the print instruction is received by the engine control unit 202 (the first time). The cumulative value of the second counter 202*b* is 0 (an initial value) immediately after the engine control unit 202 switches the operation mode from the first mode to the second mode.

Next, the engine control unit 202 determines whether the cumulative value of the second counter 202*b* is at least a predetermined second threshold (step S210). If the cumulative value of the second counter 202*b* is at least the second threshold in the processing of step S210, the engine control unit 202 sets the operation mode for the next job to the first mode (stores the operation mode in the non-volatile memory), and resets the cumulative value of the second counter 202*b* to 0 (step S211). The engine control unit 202 then ends the sequence in FIGS. 14A and 14B and starts image forming operations (sheet feed operations). On the other hand, if the cumulative value of the second counter 202*b* is less than the second threshold in the processing of step S210, the engine control unit 202 keeps the operation mode for the next job as the second mode (does not change the settings stored in the non-volatile memory), and does not change the cumulative value of the second counter 202*b*. The engine control unit 202 then ends the sequence in FIGS.

14A and 14B and starts image forming operations (sheet feed operations). Like the first threshold described earlier, the second threshold is a value of at least 1, and should be determined in advance in accordance with the configuration of the image forming apparatus 100, taking into account the tradeoff between suppressing the occurrence of excess rotation time and shortening the FPOT. Raising the second threshold makes it more difficult to switch the operation mode from the second mode to the first mode and makes it easier to suppress the occurrence of excess rotation time, but also reduces the number of cases in which the FPOT can be shortened. If the second threshold is 1, the operation mode switches from the second mode to the first mode even if there is only one job in which the time required for the preparatory operations (the second time) is longer than the time from when the pre-command is received to when the print instruction is received (the first time). Setting the second threshold to at least 2 and resetting the second counter 202*b* in step S212 may cause the operation mode to switch from the second mode to the first mode when the second time is longer than the first time continuously in a predetermined number of jobs that is at least 2, as described above.

If the second time is not longer than the first time in the processing of step S208 (the first time is at least the second time), the engine control unit 202 resets the cumulative value of the second counter 202*b* to 0 (step S212). This means that the situation in which excess rotation time will occur will continue if the first mode is used. The engine control unit 202 then ends the sequence in FIGS. 14A and 14B and starts image forming operations (sheet feed operations).

In the present embodiment, the engine control unit 202 waits for the pre-command to be received from the controller unit 201 (step S201), and also waits for the print instruction to be received (step S213). After receiving the print instruction without receiving the pre-command from the controller unit 201 (steps S201 and S213), the engine control unit 202 executes the preparatory operations (steps S214 and S215), ends the sequence in FIGS. 14A and 14B, and starts image forming operations (sheet feed operations). If the controller unit 201 must send the pre-command to the engine control unit 202, the processing of steps S213 to S215 need not be provided, and the processing of steps S202 to S212 may be executed after waiting for the pre-command to be received in step S201.

FIG. 12D is a timing chart illustrating the timings of operations of various units in a job when the engine control unit 202 does not execute preparatory parallel operations despite receiving a pre-command. The operations of the various units illustrated in FIG. 12D correspond to the operations of the various units when the startup operations are executed in the second mode according to the sequence of steps S201 to S212 in FIGS. 14A and 14B. Note that FIG. 12D illustrates an example in which a single piece of the recording material P is printed onto. The external device 200 starts the image processing and communicates a preparation instruction to the controller unit 201 (t331), and once the image processing is complete (t332), communicates a print instruction to the controller unit 201 along with the image data. Once the preparation instruction is received, the controller unit 201 communicates a pre-command indicating the start of the preparatory operations (a first instruction) to the engine control unit 202 (t331). Additionally, once the print instruction is received, the controller unit 201 starts image expansion processing for expanding the image data into bitmap data (exposure data) (t332), and communicates a print instruction (the second instruction) to the engine control unit 202 at the point in time when the image expansion processing is complete (t333). At this time, the time required for the external device 200 to perform the image processing is represented by "Tsd" and the time required for the controller unit 201 to perform the image expansion processing is represented by "T0*d*", and in this case, Tsd is equal to Tsc (Tsd=Tsc) and T0*d* is equal to T0*c* (T0*d*=T0*c*) in the case of FIG. 12C. On the other hand, the engine control unit 202 does not start preparatory operations despite receiving the pre-command, and waits for the print instruction to be received (t331). After receiving the print instruction, the engine control unit 202 starts preparatory operations similar to those in the case of FIGS. 12A, 12B, and 12C (t333), and once the predetermined length of time T1 has passed, the preparatory operations are taken as being complete (t334). Once the preparatory operations are complete, the engine control unit 202 drives the sheet feed clutch 214 such that the recording material P is fed from the sheet feed tray 1140 (the image forming operations are started). Thereafter, the controller unit 201 sends the image data (exposure data) in the same manner as in FIGS. 12A, 12B, and 12C (t335 to t336). After the recording material P is discharged into the discharge tray 112, the engine control unit 202 stops driving the main motor 204 and ends the image forming operations (t337). At this time, the FPOT time is represented by T3*d* in the section from t331 to t337, and T3*d* is longer than T3*c* in the case of FIG. 12C (T3*d*>T3*c*). However, the driving time of the main motor 204 at this time is represented by T2*d* in the section from t333 to t317, and T2*d* is equal to T2*a* and T2*b* in the case of FIGS. 12A and 12B (T2*d*=T2*a*, T2*d*=T2*b*). In other words, the driving time T2*d* of the main motor 204 at this time is shorter than T2*c* in the case of FIG. 12C (T2*d*<T2*c*) by the amount by which the excess rotation time ((Tsc+T0*c*)−T1) does not arise in the case of FIG. 12C.

As described above, in the present embodiment, the engine control unit 202 can control the startup operations in the first mode, in which, when the pre-command has been received, the preparatory operations are started before the print instruction is received, and in the second mode, in which, when the pre-command is received, the preparatory operations are not started until the print instruction is received. In particular, in the present embodiment, the engine control unit 202 can control the startup operations in the first mode, in which the preparatory operations are started when the pre-command is received, and in the second mode, in which the preparatory operations are not started when the pre-command is received but are started when the print instruction is received. The engine control unit 202 then switches between the first mode and the second mode based on the number of jobs (a first number) in which the print instruction has been received after the completion of the preparatory operation in the first mode, and the number of jobs (a second number) in which the time from when the preparatory operations are started to when the preparatory operations are completed (the second time) is longer than the time from when the pre-command is received to when the print instruction is received (the first time) in the second mode. In the present embodiment, the engine control unit 202 switches the operation mode from the first mode to the second mode when the first number is at least the predetermined first threshold, and switches the operation mode from the second mode to the first mode when the second number is at least the predetermined second threshold. At this time, the engine control unit 202 may switch the operation mode from the first mode to the second mode when the first number has increased continuously and become at least the predetermined first threshold. Additionally, the engine control unit 202 may switch the operation mode from the second mode to the first mode when the second number has increased continuously and become at least the predetermined second threshold.

In other words, the engine control unit 202 switches the operation mode so that when the preparatory operations are completed after the print instruction is received, the startup operations are controlled in the first mode, and when such is not the case in the first mode, the startup operations are controlled in the second mode. As described above, the configuration of the external device 200, such as the OS, may change, and the time from when the controller unit 201 sends the pre-command to the engine control unit 202 to when the print instruction is sent may increase. According to the present embodiment, switching the operation mode from the first mode to the second mode in such a case makes it possible to suppress regularly-occurring excess rotation time. According to the present embodiment, control such as switching from the first mode to the second mode after waiting for the excess rotation time to build up to a predetermined value is not performed, and thus a situation where the excess rotation time increases with every job after the configuration of the external device 200 changes can be suppressed. Additionally, according to the present embodiment, whether a switch from the first mode to the second mode can be made is determined by counting the number of jobs. Accordingly, the control is simpler than control in which, for example, a difference between the time from when preparatory operations are started to when image forming operations are started and a predetermined time set in advance is totaled and that cumulative value is compared with the predetermined threshold each time a job is executed. Furthermore, the configuration of the external device 200, such as the OS, may change again thereafter, and the time from when the controller unit 201 sends the pre-command to the engine control unit 202 to when the print instruction is sent may decrease. According to the present embodiment, in such a case, the FPOT can be reduced by switching the operation mode from the second mode to the first mode.

Although the present embodiment has described a case where the engine control unit 202 makes the determination as to whether a switch from the first mode to the second mode can be made and whether a switch from the second mode to the first mode can be made, it should be noted that the present invention is not limited to such a configuration. Of the determination as to whether a switch from the first mode to the second mode can be made and whether a switch from the second mode to the first mode can be made, the engine control unit 202 may make only the determination as to whether a switch from the first mode to the second mode can be made. In this case, making the determination as to whether a switch from the first mode to the second mode can be made in the same manner as in the present embodiment makes it possible to achieve the same effect as when switching from the first mode to the second mode in the present embodiment. Additionally, in this case, the switch from the second mode to the first mode need not be performed, and the operation mode may instead be switched from the second mode to the first mode automatically in response to any desired condition, such as the main power of the image forming apparatus 100 being turned off or the like.

Additionally, although the present embodiment has described a case where the startup operations are controlled in the first mode while the engine control unit 202 is in the initial state, the present invention is not limited to this configuration, and the startup operations may be controlled in the second mode while the engine control unit 202 is in the initial state. In other words, the engine control unit 202 can switch from the second mode to the first mode after confirming that the time from when the pre-command is received to when the print instruction is received is sufficiently short. In this case, the determination as to whether the operation mode can be switched from the second mode to the first mode can be made in the same manner as in the present embodiment. This makes it possible to suppress the occurrence of excess rotation time to the greatest extent possible.

Thus according to the present embodiment, the image forming apparatus 100 executes a job for forming an image on the recording material P in response to an instruction from the controller unit 201, which processes the image data. In the present embodiment, the image forming apparatus 100 includes: the image forming unit 1110 for forming the image on the recording material P; and the control unit (the engine control unit) 202, which controls the image forming unit 1110 so that preparatory operations of the image forming unit 1110 start after a first instruction (a pre-command) is received from the controller unit 201, and image forming operations of the image forming unit 1110 start when the preparatory operations are complete and a second instruction (a print instruction) is received from the controller unit 201. In the present embodiment, the control unit 202 is capable of performing control so as to execute a job having switched the operation mode between the first mode, in which when the first instruction has been received, the preparatory operations are started before receiving the second instruction, and the second mode, in which when the first instruction has been received, the preparatory operations are not started until the second instruction is received. Then, in the present embodiment, in a case of execution in the first mode, the control unit 202 switches the operation mode from the first mode to the second mode based on information pertaining to the number of jobs in which the image forming operations have been started in response to the second instruction after the preparatory operations have been completed. At this time, in a case of execution in the first mode, the control unit 202 can switch the operation mode from the first mode to the second mode when the number of consecutive jobs, in which the image forming operations have been started in response to the second instruction after the preparatory operations have been completed, is at least a predetermined number. Here, the information pertaining to the number of jobs may be any information through which the number of jobs can be determined, and is not limited to the number of jobs itself. For example, the information pertaining to the number of jobs is not limited to a value that increases or decreases one-to-one with an increase or decrease in the number of jobs, and a value that increases or decreases with a predetermined correlation with the increase or decrease in the number of jobs can be used. For example, an index value may be increased by 2 for each increase in the number of jobs. Additionally, the information pertaining to the number of jobs in which the image forming operations are started in response to the second instruction after the preparatory operations are completed in a case of execution in the first mode is not limited to being obtained from the number of jobs for which the timing at which the second instruction was received was after the timing at which the preparatory operations were completed. For example, the control unit 202 may obtain the information pertaining to the number of jobs in which the image forming operations are started in response to the second instruction after the preparatory operations are completed in a case of execution in the first mode by measuring a first time, which is the time from when the first instruction is received to when the second instruction is received, and a second time, which is the time from when the preparatory operations are started to when the preparatory operations are completed, and obtain information based on the number of jobs for which the second time is shorter than the first time.

In addition, in the present embodiment, in a case of execution in the second mode, the control unit 202 switches the operation mode from the second mode to the first mode based on information pertaining to the number of jobs for which the second time, which is the time from when the preparatory operations are started to when the preparatory operations are completed, is longer than the first time, which is the time from when the first instruction is received to when the second instruction is received. At this time, in a case of execution in the second mode, the control unit 202 can switch the operation mode from the second mode to the first mode when the number of consecutive jobs for which the second time was longer than the first time is at least a predetermined number. Additionally, in the present embodiment, the image forming unit 1110 includes the drive source (the main motor) 204, and the preparatory operations may be operations for controlling the drive source 204 such that the image forming operations can be executed. The image forming unit 1110 also includes an image carrier (photosensitive drum) 1122 and application units 220 to 223 that apply voltages for forming an image on the image carrier 1122, and the preparatory operations may be operations for controlling the drive source 204 and the application units 220 to 223 so that an image can be formed on the image carrier 1122.

Additionally, the image forming unit 1110 includes the fixing unit (fixer) 1130 for fixing the image formed on the recording material P, and the preparatory operations may be operations for controlling the drive source 204 and the fixing unit 1130 so as to fix the image formed on the recording material P.

Additionally, according to the present embodiment, in a configuration in which preparatory parallel operations can be executed, a situation where the excess rotation time increases due to changes in the configuration of the external device 200 and the like can be suppressed. This makes it possible to suppress situations where the excess rotation time increases and the lifespan of components in the image forming apparatus 100, such as the components of the fixer 1130, shortens.

Fourth Embodiment

Another embodiment of the present invention will be described next. The basic configuration and operations of the image forming apparatus according to the present embodiment are the same as in the image forming apparatus according to the third embodiment. Accordingly, elements of the image forming apparatus according to the present embodiment that are the same, or have corresponding functions or configurations, as those in the image forming apparatus according to the third embodiment will be given the same reference signs as in the third embodiment, and will not be described in detail.

Overview of Present Embodiment

The third embodiment described control for switching the operation mode between the first mode, in which the preparatory operations are started upon receiving the pre-command, and the second mode, in which the preparatory operations are not started upon receiving the pre-command and are instead started upon receiving the print instruction. The present embodiment will describe control for switching the operation mode between the first mode, in which the preparatory operations are started upon receiving the pre-command, and a third mode, in which the preparatory operations are not started upon receiving the pre-command and are instead executed after delaying the start of the preparatory operations.

Switching Operation Modes

FIGS. 16 and 17 are flowcharts illustrating a sequence of startup operations from a standby state, in which the engine control unit 202 waits for an instruction from the controller unit 201, until image forming operations are started, according to the present embodiment. An operation mode in which the engine control unit 202 starts the preparatory operations in response to receiving a pre-command is the first mode. An operation mode in which the engine control unit 202 starts the preparatory operations after standing by for a predetermined length of time after receiving a pre-command is the third mode.

Figure 16A:
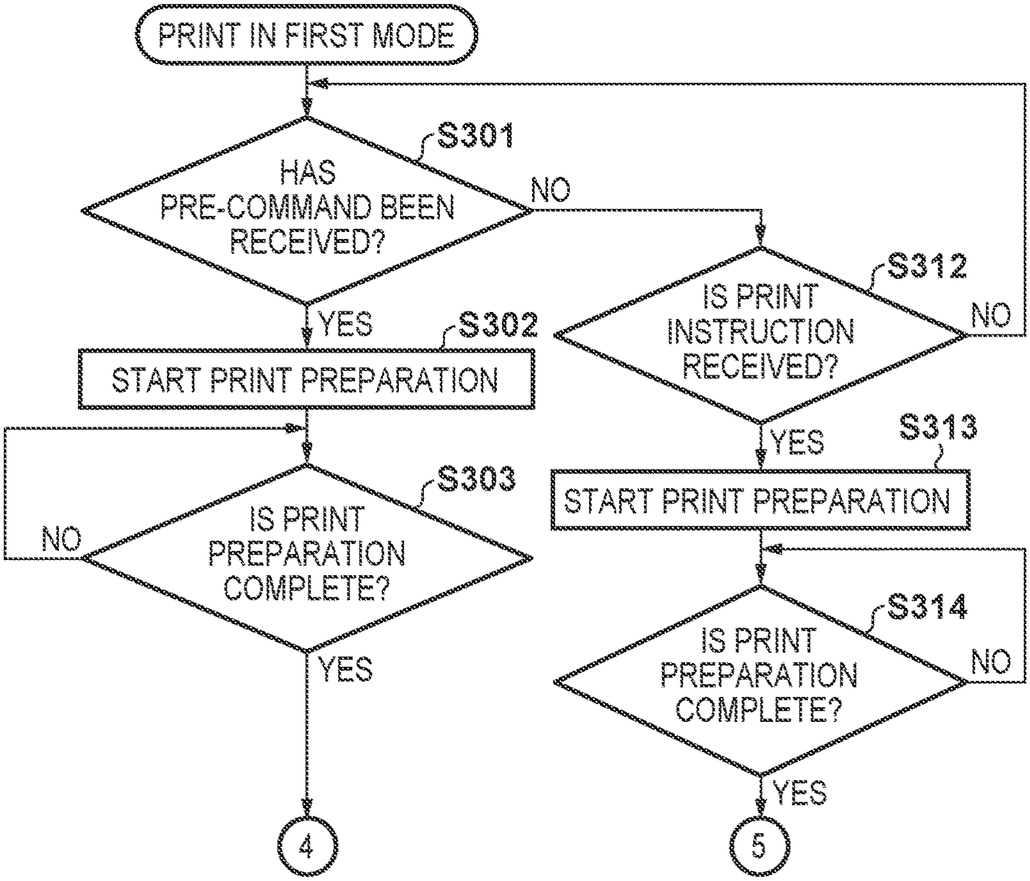
Figure 18:
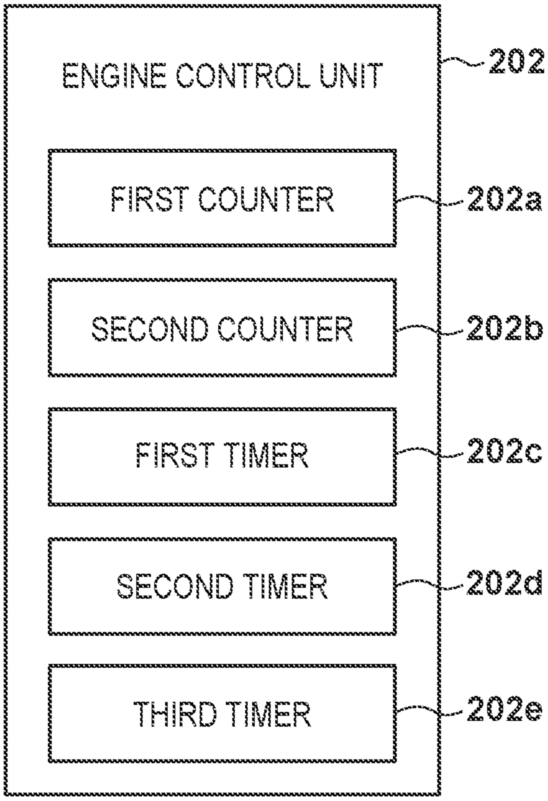
FIG. 18 is a schematic diagram illustrating function blocks of an engine control unit according to the fourth embodiment.

As will be described later, in the present embodiment, there are cases where the preparatory operations are started in response to receiving a print instruction, when the operation mode has been switched to the third mode. FIGS. 16A and 16B illustrate a sequence for making a decision to switch the operation mode from the first mode to the third mode while the engine control unit 202 is controlling the startup operations in the first mode. FIGS. 17A to 17C illustrate a sequence for making a decision to switch the operation mode from the third mode to the first mode while the engine control unit 202 is controlling the startup operations in the third mode. FIG. 18 is a schematic diagram illustrating function blocks of the engine control unit 202 according to the present embodiment. Although the function blocks of the engine control unit 202 according to the present embodiment are similar to those in the third embodiment, in the present embodiment, the engine control unit 202 includes the first timer 202*c*, the second timer 202*d*, and a third timer 202*e* as time measurement units. In the present embodiment, the first timer 202*c*, the second timer 202*d*, and the third timer 202*e* are realized by the CPU and the non-volatile memory (or the RAM), respectively.

It is assumed that in an initial state, the engine control unit 202 controls the startup operations in the first mode.

The sequence of the startup operations in the first mode will be described with reference to FIGS. 16A and 16B.

Once the pre-command is received from the controller unit 201 (step S301), the engine control unit 202 starts the preparatory operations (step S302), and waits until the preparatory operations are complete (step S303). If, at the point in time when the preparatory operations are complete, the print instruction has not yet been received from the controller unit 201 (step S304), the engine control unit 202 adds 1 to the cumulative value of the first counter 202*a* (step S305). Additionally, the engine control unit 202 uses the third timer 202*e* to start measuring a third time, which is a time from when the preparatory operations are complete to when the print instruction is received (step S306). Thereafter, upon receiving the print instruction from the controller unit 201 (step S307), the engine control unit 202 ends the measurement of the third time by the third timer 202*e* and updates a maximum value among the respective third times recorded on a job-by-job basis (step S308). The maximum value of the third time is 0 in the initial state of the engine control unit 202 (an initial value), and is updated by being compared to the previous maximum value in the processing of step S308 for each job, while the jobs are being executed with the first mode as the operation mode. The first counter 202_a_ is the same as in the third embodiment, and the cumulative value of the first counter 202_a_ is 0 (the initial value) when the engine control unit 202 is in the initial state.

Next, the engine control unit 202 determines whether the cumulative value of the first counter 202_a_ is at least a predetermined first threshold (step S309). If the cumulative value of the first counter 202_a_ in the processing of step S309 is at least the first threshold, the engine control unit 202 sets the operation mode for the next job to the third mode (stores the operation mode in the non-volatile memory), and resets the cumulative value of the first counter 202_a_ to 0 (step S310). The engine control unit 202 then ends the sequence in FIGS. 16A and 16B and starts image forming operations (sheet feed operations). On the other hand, if the cumulative value of the first counter 202_a_ is less than the first threshold in the processing of step S309, the engine control unit 202 keeps the operation mode for the next job as the first mode (does not change the settings stored in the non-volatile memory), and changes neither the cumulative value of the first counter 202_a_ nor the maximum value of the third time. The engine control unit 202 then ends the sequence in FIGS. 16A and 16B and starts image forming operations (sheet feed operations). Similar to the third embodiment, the first threshold is a value of at least 1, and should be determined in advance in accordance with the configuration of the image forming apparatus 100, taking into account the tradeoff between suppressing the occurrence of excess rotation time and shortening the FPOT. Lowering the first threshold makes it easier to switch the operation mode from the first mode to the third mode and suppress the occurrence of excess rotation time, but also reduces the number of cases in which the FPOT can be shortened.

If, at the point in time when the preparatory operations are complete, the print instruction has been received from the controller unit 201 (step S304), the engine control unit 202 resets the cumulative value of the first counter 202_a_ to 0 (step S311). The engine control unit 202 then ends the sequence in FIGS. 16A and 16B and starts image forming operations (sheet feed operations).

In the present embodiment, the engine control unit 202 waits for the pre-command to be received from the controller unit 201 (step S301), and also waits for the print instruction to be received (step S312). After receiving the print instruction without receiving the pre-command from the controller unit 201 (steps S301 and S312), the engine control unit 202 executes the preparatory operations (steps S313 and S314), ends the sequence in FIGS. 16A and 16B, and starts image forming operations (sheet feed operations). If the controller unit 201 must send the pre-command to the engine control unit 202, the processing of steps S312 to S314 need not be provided, and the processing of steps S302 to S311 may be executed after waiting for the pre-command to be received in step S301.

The sequence of startup operations in the next job, after the engine control unit 202 has switched the operation mode from the first mode to the third mode in step S310 of FIGS. 16A and 16B, is the sequence illustrated in FIGS. 17A and 17B. The sequence of the startup operations in the third mode will be described with reference to FIGS. 17A and 17B.

Upon receiving the pre-command from the controller unit 201 (step S401), the engine control unit 202 uses the first timer 202_c_ to start measuring the first time, which is the time from when the pre-command is received to when the print instruction is received (step S402). The engine control unit 202 executes the processing of step S402 in parallel with the subsequent processing in FIGS. 17A and 17B, as a sub-flow that follows the sequence illustrated in FIG. 17C. In the sequence illustrated in FIG. 17C, once the print instruction is received from the controller unit 201 (step S421), the engine control unit 202 stops the measurement of the first time by the first timer 202_c_. On the other hand, in the sequence in FIGS. 17A and 17B, the engine control unit 202 measures the time from when the pre-command was received in order to determine whether a time equivalent to the maximum value of the third time determined in the processing of step S308 in FIG. 16B (a "standby time", corresponding to the maximum value of the excess rotation time) has passed (step S403). The engine control unit 202 also waits for the stated standby time to pass, or for a print instruction to be received from the controller unit 201 (step S404). Once the stated standby time has passed or a print instruction has been received from the controller unit 201 (step S404), the engine control unit 202 uses the second timer 202_d_ to start measuring the second time, which is the time required for the preparatory operations, and also starts the preparatory operations (step S405). Once the preparatory operations are complete (step S406), the engine control unit 202 stops the measurement of the second time by the second timer 202_d_ (step S407). The engine control unit 202 then waits for the measurement of the first time according to the sequence illustrated in FIG. 17C to end (step S408). Then, once the measurement of the first time is complete (step S408), the engine control unit 202 compares the measured first time and second time, and determines whether the second time is longer than the first time (step S409).

If the second time is longer than the first time in the processing of step S409, the engine control unit 202 adds 1 to the cumulative value of the second counter 202_b_ (step S410). The second counter 202_b_ is similar to that in the third embodiment, and the cumulative value of the second counter 202_b_ is 0 (the initial value) immediately after the engine control unit 202 has switched the operation mode from the first mode to the third mode.

Next, the engine control unit 202 determines whether the cumulative value of the second counter 202_b_ is at least a predetermined second threshold (step S411). If the cumulative value of the second counter 202_b_ is at least the second threshold in the processing of step S411, the engine control unit 202 sets the operation mode for the next job to the first mode (stores the operation mode in the non-volatile memory), resets the cumulative value of the second counter 202_b_ to 0, and resets the maximum value of the third time to 0 (step S412). The engine control unit 202 then ends the sequence in FIGS. 17A and 17B and starts image forming operations (sheet feed operations). On the other hand, if the cumulative value of the second counter 202_b_ is less than the second threshold in the processing of step S411, the engine control unit 202 keeps the operation mode for the next job as the third mode (does not change the settings stored in the non-volatile memory), and does not change the cumulative value of the second counter 202_b_. The engine control unit 202 then ends the sequence in FIGS. 17A and 17B and starts image forming operations (sheet feed operations). Like the first threshold described earlier, the second threshold is a value of at least 1, and should be determined in advance in accordance with the configuration of the image forming apparatus 100, taking into account the tradeoff between suppressing the occurrence of excess rotation time and shortening the FPOT. Raising the second threshold makes it more difficult to switch the operation mode from the third mode to the first mode and makes it easier to suppress the occurrence of excess rotation time, but also reduces the number of cases in which the FPOT can be shortened.

If the second time is not longer than the first time in the processing of step S409 (the first time is at least the second time), the engine control unit 202 resets the cumulative value of the second counter 202*b* to 0 (step S413). The engine control unit 202 then ends the sequence in FIGS. 17A and 17B and starts image forming operations (sheet feed operations).

In the present embodiment, the engine control unit 202 waits for the pre-command to be received from the controller unit 201 (step S401), and also waits for the print instruction to be received (step S414). After receiving the print instruction without receiving the pre-command from the controller unit 201 (steps S401 and S414), the engine control unit 202 executes the preparatory operations (steps S415 and S416), ends the sequence in FIGS. 17A and 17B, and starts image forming operations (sheet feed operations). If the controller unit 201 must send the pre-command to the engine control unit 202, the processing of steps S414 to S416 need not be provided, and the processing of steps S402 to S413 may be executed after waiting for the pre-command to be received in step S401.

As described above, in the present embodiment, the engine control unit 202 can control startup operations in the first mode, in which when the pre-command has been received, the preparatory operations are started at a first timing before the print instruction is received (when the pre-command is received, in the present embodiment), and the third mode, in which when the pre-command has been received, the preparatory operations are started after a delay until a second timing which is after the first timing and before the reception of the print instruction. Then, the engine control unit 202 switches between the first mode and the third mode based on the number of jobs (the first number) for which a print instruction has been received after the completion of the preparatory operations in the first mode, and the number of jobs (the second number) for which the time from the start of the preparatory operations to the completion of the preparatory operations (the second time) is longer than the time from the reception of the pre-command to the reception of the print instruction in the third mode (the first time). In the present embodiment, the engine control unit 202 switches the operation mode from the first mode to the third mode when the first number is at least the predetermined first threshold, and switches the operation mode from the third mode to the first mode when the second number is at least the predetermined second threshold. At this time, the engine control unit 202 may switch the operation mode from the first mode to the second mode when the first number has increased continuously and become at least the predetermined first threshold. Additionally, the engine control unit 202 may switch the operation mode from the third mode to the first mode when the second number has increased continuously and become at least the predetermined second threshold. Additionally, in the present embodiment, the time by which the engine control unit 202 delays the start of the preparatory operations in the third mode (the standby time) is assumed to be the maximum value of the third time, corresponding to the maximum value of the excess rotation time measured in the first mode. Note that in the present embodiment, if a print instruction is received before the maximum value of the third time has passed, the engine control unit 202 starts the preparatory operations upon receiving the print instruction without waiting for the maximum value of the third time to pass. In the present embodiment, the time for which the start of the preparatory operations is delayed in the third mode (the standby time) is described as being the maximum value of the third time corresponding to the maximum value of the excess rotation time measured in the first mode. This makes it possible to suppress the occurrence of excess rotation time to the greatest extent possible in the third mode. However, the configuration is not limited thereto, and any desired representative value can be used for the measurement value of the third time. For example, the time by which the start of the preparatory operations is delayed in the third mode (the standby time) can be set to a minimum value of the third time corresponding to a minimum value of the excess rotation time measured in the first mode. This makes it possible to shorten the FPOT to the greatest extent possible in the third mode. Additionally, a value between the maximum value and the minimum value (an average, a median value, or the like) can also be used as the standby time. Additionally, the time from when the pre-command is received to when the print instruction is received in the first mode may be measured, and a difference (a minimum value, a maximum value, an average value, or the like) from a pre-determined time required for the preparatory operations (a minimum design value or the like) may be taken as the standby time. A predetermined value set in advance can also be used as the standby time.

In other words, the engine control unit 202 switches the operation mode so as to control the startup operations in the first mode when the preparatory operations will be complete after receiving the print instruction, and so as to control the startup operations in the third mode when such will not be the case in the first mode. According to the present embodiment, switching the operation mode from the first mode to the third mode makes it possible to suppress a situation where excess rotation time occurs regularly, in the same manner as in the third embodiment. Additionally, according to the present embodiment, switching the operation mode from the third mode to the first mode makes it possible to shorten the FPOT, in the same manner as in the third embodiment. Additionally, according to the present embodiment, the FPOT can be shortened in more cases than in the third embodiment by making it possible to start the preparatory operations before receiving the print instruction in the third mode, based on the excess rotation time measured in the first mode.

Although the present embodiment described a case in which the engine control unit 202 determines whether the operation mode can be switched from the first mode to the third mode, and determines whether the operation mode can be switched from the third mode to the first mode, it should be noted that the present invention is not limited to this configuration. Of the determination as to whether the operation mode can be switched from the first mode to the third mode and the determination as to whether the operation mode can be switched from the third mode to the first mode, the engine control unit 202 may only determine whether the operation mode can be switch from the first mode to the third mode. In this case, determining whether the operation mode can be switched from the first mode to the third mode in the same manner as in the present embodiment makes it possible to achieve the same effect as when switching from the first mode to the third mode in the present embodiment. Additionally, in this case, the switch from the third mode to the first mode need not be performed, or the operation mode be switched from the third mode to the first mode automatically in response to any desired condition, such as the main power of the image forming apparatus 100 being turned off or the like.

In this manner, in the present embodiment, the control unit (the engine control unit) 202 can perform control so as to execute a job while switching the operation mode between the first mode, in which when the first instruction (the pre-command) is received, the preparatory operations are started at a first timing before the second instruction (the print instruction) is received (when the pre-command is received, in the present embodiment), and the third mode, in which when the first instruction is received, the preparatory operations are started at a second timing, which is after the first timing but before receiving the second instruction and which is a timing after a predetermined length of time has passed following the first instruction being received. Then, in the present embodiment, in a case of execution in the first mode, the control unit 202 switches the operation mode from the first mode to the third mode based on information pertaining to the number of jobs in which the image forming operations have been started in response to the second instruction after the preparatory operations have been completed. At this time, in a case of execution in the first mode, the control unit 202 can switch the operation mode from the first mode to the third mode when the number of consecutive jobs in which the image forming operations have been started in response to the second instruction after the preparatory operations have been completed is at least a predetermined number. Additionally, in the present embodiment, in a case of execution in the third mode, the control unit 202 switches the operation mode from the third mode to the first mode based on information pertaining to the number of jobs for which the second time, which is the time from when the preparatory operations are started to when the preparatory operations are completed, is longer than the first time, which is the time from when the first instruction is received when the second instruction is received. In the present embodiment, the control unit 202 sets the predetermined length of time based on information pertaining to the time from when the preparatory operations are completed when the second instruction is received, obtained when executing a job in the first mode. In particular, in the present embodiment, the control unit 202 sets the predetermined length of time based on the maximum value of the time from when the preparatory operations are completed when the second instruction is received, obtained when executing a job in the first mode. Additionally, the control unit 202 can be configured to, in a case of execution in the third mode, switch the operation mode from the third mode to the first mode when the number of consecutive jobs for which the second time is longer than the first time is at least a predetermined number.

Furthermore, according to the present embodiment, the same effects as those of the third embodiment can be achieved, and the number of cases in which the FPOT can be shortened can be increased beyond that of the third embodiment.

Fifth Embodiment

Another embodiment of the present invention will be described next. The basic configuration and operations of the image forming apparatus according to the present embodiment are the same as in the image forming apparatus according to the third embodiment. Accordingly, elements of the image forming apparatus according to the present embodiment that are the same, or have corresponding functions or configurations, as those in the image forming apparatus according to the third embodiment will be given the same reference signs as in the third embodiment, and will not be described in detail.

Overview of Present Embodiment

The third embodiment described control for switching between the first mode and the second mode without including the content of the image data itself (a printing rate of the image or the like) as a factor in the determination. The present embodiment will describe control in a configuration in which the engine control unit 202 can obtain printing rate information of the image data as information on an index value correlated with an information amount of the image data, in which the determination to switch from the first mode to the second mode is made using the printing rate information. Specifically, if the time from when the controller unit 201 sends the pre-command to the engine control unit 202 to when the print instruction is sent is long in the first mode, whether the cause of that time being long is related to the image data is estimated. Through this, if the cause is estimated to be related to the image data, the occurrence of excess rotation time is determined not to be a regular occurrence, and the operation mode is not switched, with control in the first mode being continued so as to shorten the FPOT. Note that the "printing rate" is the ratio (percentage) of the surface area of a printed part (an image part, a part where toner is present) in an image forming region (a region where a toner image can be formed), with the printing ratio being 100% for a solid image in which the entire image forming region is the printed part, and 0% for a solid white image in which there is no printed part.

System Configuration of Image Forming Apparatus

Figure 19:
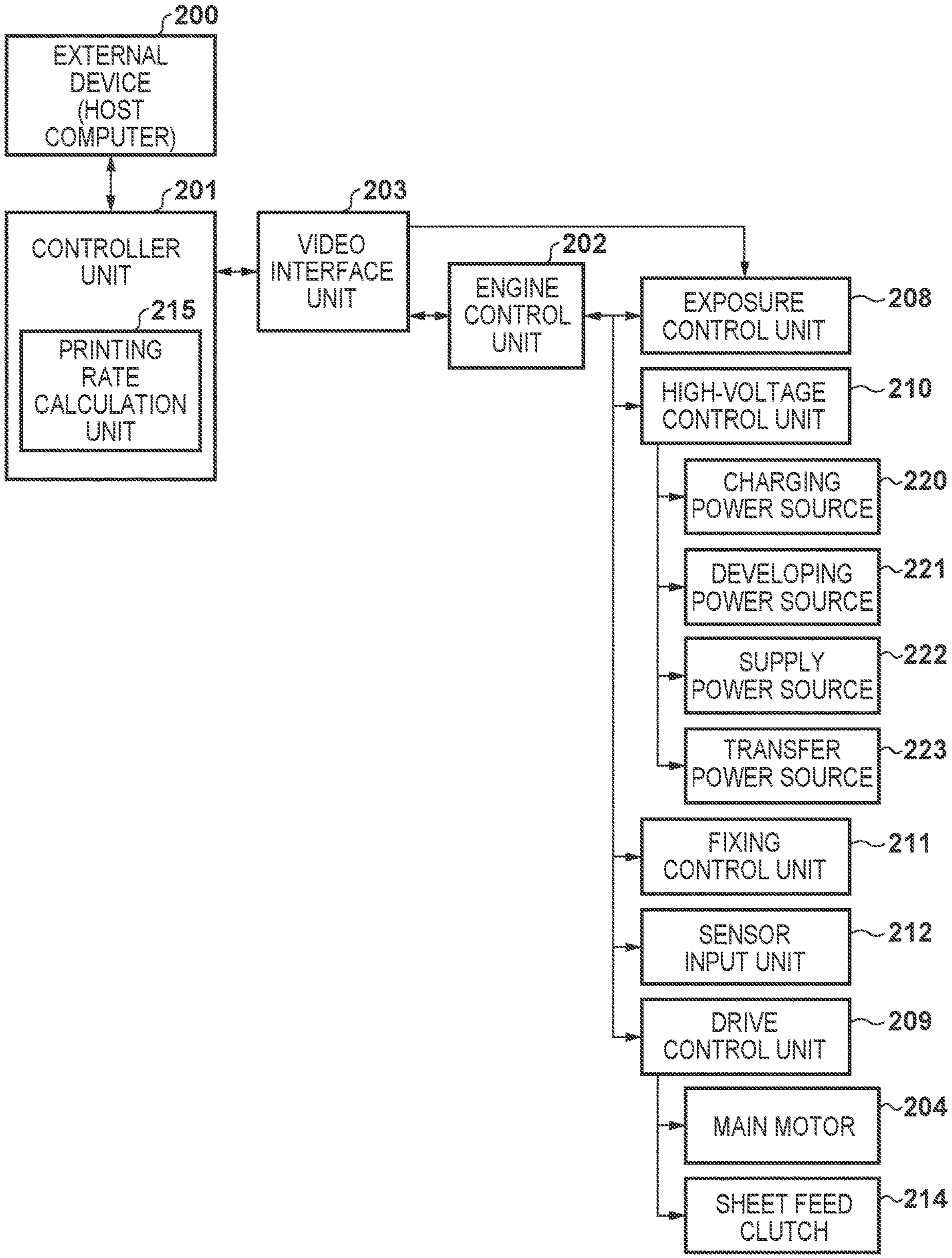
FIG. 19 is a block diagram illustrating the system configuration of an image forming apparatus according to a fifth embodiment.

FIG. 19 is a block diagram illustrating the system configuration of the image forming apparatus 100 according to the present embodiment. The system configuration of the image forming apparatus 100 according to the present embodiment, illustrated in FIG. 19, is similar to the system configuration of the image forming apparatus 100 according to the third embodiment, illustrated in FIG. 11, except that the controller unit 201 includes a printing rate calculation unit 215.

The printing rate calculation unit 215 takes image data received from the external device 200 as an input, counts the number of printed pixels per page that form a toner image, and calculates the printing rate of that page.

The controller unit 201 sends print reservation information including printing rate information of the page (any value from 0% to 100%) to the engine control unit 202 via the video interface unit 203. Then, once the conversion from image data to exposure data is complete, the controller unit 201 sends the print instruction to the engine control unit 202.

Switching Operation Modes

Figure 20A:
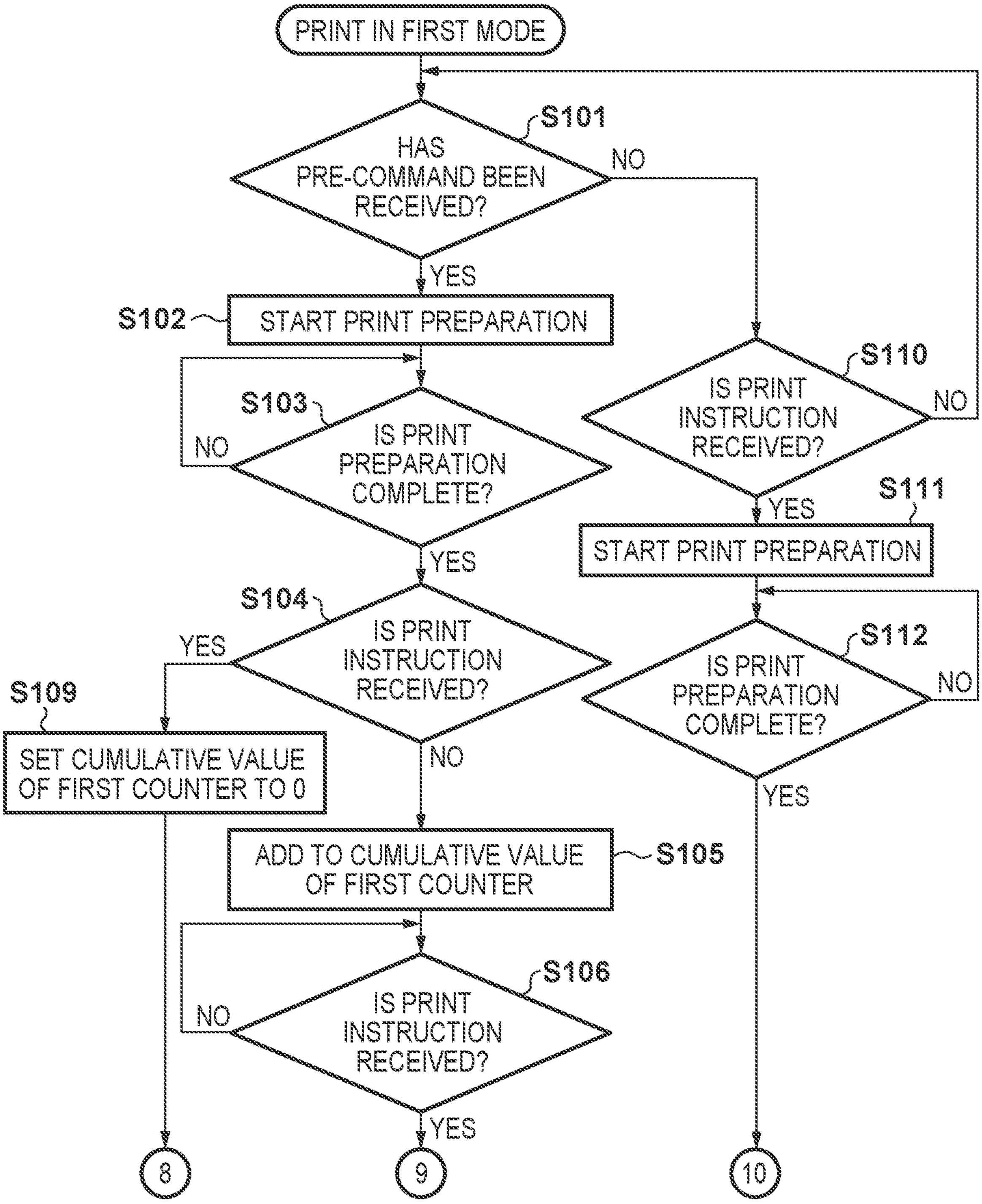

FIGS. 20A and 20B is a flowchart illustrating a sequence of startup operations from a standby state, in which the engine control unit 202 waits for an instruction from the controller unit 201, until image forming operations are started, according to the present embodiment. Similar to the third embodiment, an operation mode in which the engine control unit 202 starts the preparatory operations in response to receiving a pre-command is the first mode. Additionally, similar to the third embodiment, an operation mode in which the engine control unit 202 does not start the preparatory operations even after receiving a pre-command, and instead starts the preparatory operations after receiving a print instruction, is the second mode. FIGS. 20A and 20B illustrates a sequence for making a decision to switch the operation mode from the first mode to the second mode while the engine control unit 202 is controlling the startup operations in the first mode. The sequence through which the engine control unit 202 determines to switch the operation mode from the second mode to the first mode in a state where the startup operations are being controlled in the second mode is the same as the sequence illustrated in FIGS. 14A and 14B and described in the third embodiment, and will therefore not be described here. Additionally, the same processing, determinations, and the like as those of steps S101 to S112 indicated in FIG. 13 and described in the third embodiment will be given the same step numbers in FIGS. 20A and 20B. The sequence illustrated in FIGS. 20A and 20B and described in the present embodiment differs from the sequence illustrated in FIG. 13 and described in the third embodiment in that the processing, determinations, and the like of steps S501 and S502 have been added.

It is assumed that in an initial state, the engine control unit 202 controls the startup operations in the first mode.

The sequence of the startup operations in the first mode will be described with reference to FIGS. 20A and 20B. Once the pre-command is received from the controller unit 201 (step S101), the engine control unit 202 starts the preparatory operations (step S102), and waits until the preparatory operations are complete (step S103). If, at the point in time when the preparatory operations are complete, the print instruction has not yet been received from the controller unit 201 (step S104), the engine control unit 202 adds 1 to the cumulative value of the first counter 202*a* (step S105), and then waits until a print instruction is received (step S106). The first counter 202*a* is the same as in the third embodiment, and the cumulative value of the first counter 202*a* is 0 (the initial value) when the engine control unit 202 is in the initial state.

Then, once the print instruction is received from the controller unit 201 (step S106), the engine control unit 202 determines whether the printing rate, indicated by the printing rate information received from the controller unit 201, is no greater than a predetermined third threshold (step S501). If the printing rate indicated by the printing rate information is no greater than the third threshold in the processing of step S501, the engine control unit 202 determines whether the cumulative value of the first counter 202*a* is at least the predetermined first threshold (step S107). If the cumulative value of the first counter 202*a* is at least the first threshold in the processing of step S107, the engine control unit 202 sets the operation mode for the next job to the second mode (stores the operation mode in the non-volatile memory), and resets the cumulative value of the first counter 202*a* to 0 (step S108). The engine control unit 202 then ends the sequence in FIGS. 20A and 20B and starts image forming operations (sheet feed operations). On the other hand, if the cumulative value of the first counter 202*a* is less than the first threshold in the processing of step S107, the engine control unit 202 keeps the operation mode for the next job as the first mode (does not change the settings stored in the non-volatile memory), and does not change the cumulative value of the first counter 202*a*. The engine control unit 202 then ends the sequence in FIGS. 20A and 20B and starts image forming operations (sheet feed operations). The stated third threshold is a value determined based on whether the image expansion processing by the controller unit 201 takes a long time, i.e., whether the value of T0*c* in FIG. 12C affects the occurrence of excess rotation time. The third threshold is a value that should be determined in advance according to the configuration of the image forming apparatus 100 and the like. The third threshold is 10% in the present embodiment. Accordingly, a case where the printing rate is determined to be no greater than the third threshold in step S501 and the processing has moved to step S107 is a case where it can be determined, based on the obtained printing rate information, that the time for the image expansion processing by the controller unit 201 does not affect the occurrence of excess rotation time. The stated first threshold is the same as in the third embodiment.

However, if the printing rate indicated by the printing rate information in the processing of step S501 is greater than the third threshold, the engine control unit 202 subtracts one from the cumulative value of the first counter 202*a* (step S502). The engine control unit 202 then ends the sequence in FIGS. 20A and 20B and starts image forming operations (sheet feed operations). A case where the printing rate is determined to be greater than the third threshold in step S501 is a case where it can be determined, based on the obtained printing rate information, that the time for the image expansion processing by the controller unit 201 has affected the occurrence of excess rotation time. Accordingly, in this case, the cumulative value of the first counter 202*a* is subtracted such that the job is not included in the number of jobs for which excess rotation time has occurred due to causes aside from the content of the image data.

If, at the point in time when the preparatory operations are complete, the print instruction has been received from the controller unit 201 (step S104), the engine control unit 202 resets the cumulative value of the first counter 202*a* to 0 (step S109). The engine control unit 202 then ends the sequence in FIGS. 20A and 20B and starts image forming operations (sheet feed operations).

In the present embodiment, the engine control unit 202 waits for the pre-command to be received from the controller unit 201 (step S101), and also waits for the print instruction to be received (step S110). If the print instruction has been received without receiving the pre-command from the controller unit 201 (steps S101 and S110), the engine control unit 202 executes the preparatory operations (steps S111 and S112), ends the sequence in FIGS. 20A and 20B, and starts image forming operations (sheet feed operations).

The sequence of startup operations in the next job, after the engine control unit 202 has switched the operation mode from the first mode to the second mode in step S108 of FIGS. 20A and 20B, is the same as the sequence illustrated in FIGS. 14A and 14B and described in the third embodiment, and will therefore not be described here.

As described above, according to the present embodiment, the printing rate information sent from the controller unit 201 to the engine control unit 202 is added to the factors for determining to switch from the first mode to the second mode. Using the printing rate information makes it possible to estimate whether the content of the image data has contributed to the occurrence of excess rotation time, and if so, to avoid switching from the first mode to the second mode under the assumption that excess rotation time will not occur regularly. This makes it possible to increase the number of cases in which the FPOT can be shortened, compared to the third embodiment.

In this manner, according to the present embodiment, the control unit (the engine control unit) 202 determines whether to switch the operation mode from the first mode to the second mode based on the image data. In the present embodiment, the control unit 202 sets the operation mode to the first mode when a value correlated with the information amount of the image data is greater than a predetermined value, even in a case where the operation mode would be set to the second mode based on information pertaining to the number of jobs in which the image forming operations have been started in response to the second instruction (the pre-command) after the completion of the preparatory operations. Although the present embodiment describes combining the determination to switch the operation mode based on the image data with the control described in the third embodiment, the determination may instead be combined with the control described in the fourth embodiment. In this case, the control unit 202 can determine whether to switch the operation mode from the first mode to the third mode based on the image data. At this time, the control unit 202 can set the operation mode to the first mode when a value correlated with the information amount of the image data is greater than a predetermined value, even in a case where the operation mode would be set to the third mode based on information pertaining to the number of jobs in which the image forming operations have been started in response to the second instruction (the pre-command) after the completion of the preparatory operations.

Furthermore, according to the present embodiment, the same effects as those of the third and second embodiments can be achieved, and the number of cases in which the FPOT can be shortened can be increased beyond those in the third and second embodiments.

Other

The present invention has been described thus far in terms of specific embodiments, but the present invention is not intended to be limited to the foregoing embodiments.

The foregoing embodiments described the controller unit as sending the print instruction to the engine control unit as the second instruction at the point in time when the image expansion processing is complete, but the configuration is not limited thereto. The controller unit may send the print instruction to the engine control unit as the second instruction at the point in time when it is clear that the image expansion processing is about to end. The engine control unit may then start the image forming operations (sheet feed operations and the like) in response to the print instruction.

Additionally, although the foregoing embodiments described the image forming apparatus as a monochromatic image forming apparatus, the present invention can also be applied in a color image forming apparatus. For example, there is a color image forming apparatus that forms full-color images and the like by transferring toner images from a plurality of photosensitive drums (photosensitive members) onto an intermediate transfer belt (an intermediate transfer member) and then transfers the toner images onto a recording material. The present invention can be applied in such an image forming apparatus as well, and the same effects as those described in the foregoing embodiments can be achieved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2023-017829, filed Feb. 8, 2023 and No. 2023-063782, filed Apr. 10, 2023, which are hereby incorporated by reference herein in their entirety.

What is claimed is:

1. An image forming apparatus configured to receive input data including device data and settings data from an external device and form an image on a recording medium, the image forming apparatus comprising:

a processing device configured to perform a print operation including conveying the recording medium and forming an image on the recording medium; and a control unit configured to control the processing device so that (i) a first preparatory operation of the processing device is executed after analysis of the input data starts and before analysis of the settings data ends, (ii) a second preparatory operation of the processing device is executed after the analysis of the settings data ends, and (iii) the print operation is executed after the second preparatory operation ends, wherein the control unit is configured to determine a timing at which the first preparatory operation is to be executed based on the device data.

2. The image forming apparatus according to claim 1, wherein the device data includes software data pertaining to software of the external device, and the control unit is configured to determine the timing based on the software data.

3. The image forming apparatus according to claim 2, wherein the software data includes information pertaining to at least one of a type of the software and a version of the software.

4. The image forming apparatus according to claim 1, wherein the control unit stores a processing time and a reference time according to the device data, and the control unit is configured to control the processing device so that the first preparatory operation of the processing device is executed at a timing at which a time equivalent to a difference between the processing time and the reference time has passed after the analysis of the input data has started.

5. The image forming apparatus according to claim 4, wherein the control unit is configured to generate image data based on the input data, and the print operation is executed based on the image data, the device data includes software data pertaining to software of the external device, the processing time is a time required to analyze the input data and generate the image data in accordance with the software, and the reference time is a selected one of processing times according to the software.

6. The image forming apparatus according to claim 5, wherein the software data includes information pertaining to at least one of a type of the software and a version of the software, and the processing time is a time required to analyze the input data and generate the image data in accordance with the information.

7. The image forming apparatus according to claim 5, wherein the processing time according to the software is obtained from outside the image forming apparatus and stored.

8. The image forming apparatus according to claim 7, wherein when the processing time according to the software is not stored, the control unit further measures a time from when the first preparatory operation is instructed to when the print operation starts, and stores the measured time as the processing time according to the software.

9. The image forming apparatus according to claim 5, wherein the time required to analyze the input data and generate the image data is a time in units of pages.

10. The image forming apparatus according to claim 5, wherein the time required to analyze the input data and generate the image data is a time in units of pages with respect to analyzing the input data, and a time in units of bands into which a page is divided with respect to generating the image data.

11. The image forming apparatus according to claim 1, wherein the control unit is configured to determine a condition of the second preparatory operation in accordance with the settings data.

12. The image forming apparatus according to claim 1, wherein the control unit includes a controller and an engine control unit, the controller is configured to analyze the input data, and the engine control unit is configured to control the processing device based on an instruction from the controller.

13. The image forming apparatus according to claim 1, wherein in the first preparatory operation and the second preparatory operation, at least one of a conveyance device that conveys the recording medium, a fixing device that heats the recording medium, an image forming unit that forms an image on the recording medium, and an exposure device that exposes a photosensitive member is started up.

* * * * *